US008495202B2

(12) United States Patent
Kawai

(10) Patent No.: US 8,495,202 B2
(45) Date of Patent: Jul. 23, 2013

(54) IMAGING DEVICE INFORMATION MANAGEMENT SYSTEM

(75) Inventor: Sunao Kawai, Toyoake (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 1944 days.

(21) Appl. No.: 10/900,366

(22) Filed: Jul. 28, 2004

(65) Prior Publication Data

US 2005/0111856 A1    May 26, 2005

(30) Foreign Application Priority Data

Oct. 24, 2003    (JP) ................... 2003-365154
Jan. 30, 2004    (JP) ................... 2004-024090

(51) Int. Cl.
*G06F 15/173*    (2006.01)

(52) U.S. Cl.
USPC ........................ 709/224; 709/223

(58) Field of Classification Search
USPC .............. 709/223–229, 217–219; 358/402, 358/1.15; 715/733–737
See application file for complete search history.

(56) References Cited

U.S. PATENT DOCUMENTS

| | | | | |
|---|---|---|---|---|
| 4,654,656 A * | 3/1987 | Deaver et al. | ................. | 370/449 |
| 5,583,615 A | 12/1996 | Hashimoto et al. | | |
| 5,692,111 A * | 11/1997 | Marbry et al. | ................. | 358/1.15 |
| 5,796,951 A * | 8/1998 | Hamner et al. | ................. | 709/223 |
| 5,812,900 A | 9/1998 | Hashimoto et al. | | |
| 5,897,236 A | 4/1999 | Hashimoto et al. | | |
| 6,041,347 A * | 3/2000 | Harsham et al. | ................. | 709/220 |
| 6,101,528 A * | 8/2000 | Butt | ................. | 709/203 |
| 6,295,527 B1 * | 9/2001 | McCormack et al. | ................. | 1/1 |
| 6,314,460 B1 * | 11/2001 | Knight et al. | ................. | 709/220 |
| 6,640,241 B1 * | 10/2003 | Ozzie et al. | ................. | 709/204 |
| 6,766,165 B2 * | 7/2004 | Sharma et al. | ................. | 455/423 |
| 6,947,154 B2 * | 9/2005 | Kikuchi | ................. | 358/1.1 |
| 6,999,191 B2 | 2/2006 | Yamada et al. | | |
| 7,028,228 B1 * | 4/2006 | Lovy et al. | ................. | 714/57 |
| 7,075,536 B1 * | 7/2006 | Goldschmidt | ................. | 345/440 |
| 7,253,915 B2 * | 8/2007 | Kemp et al. | ................. | 358/1.15 |
| 7,260,787 B2 * | 8/2007 | Nara | ................. | 715/805 |
| 7,340,536 B2 * | 3/2008 | Valentine et al. | ................. | 709/252 |
| 7,395,333 B1 * | 7/2008 | Saulpaugh et al. | ................. | 709/225 |
| 7,461,158 B2 * | 12/2008 | Rider et al. | ................. | 709/229 |
| 2001/0028473 A1 | 10/2001 | Yamasaki et al. | | |
| 2001/0052995 A1 | 12/2001 | Idehara | | |
| 2001/0055125 A1 | 12/2001 | Yamada et al. | | |
| 2002/0054321 A1 | 5/2002 | Kikuchi | | |
| 2002/0138612 A1 * | 9/2002 | Sekizawa | ................. | 709/224 |
| 2003/0033451 A1 | 2/2003 | Yoshida et al. | | |
| 2004/0111730 A1 * | 6/2004 | Apte | ................. | 719/330 |
| 2004/0158780 A1 * | 8/2004 | Conrad | ................. | 714/100 |
| 2004/0160631 A1 * | 8/2004 | Schlonski et al. | ................. | 358/1.15 |

FOREIGN PATENT DOCUMENTS

| | | |
|---|---|---|
| EP | 0 598 504 A2 | 5/1994 |
| JP | A-5-103079 | 4/1993 |

(Continued)

OTHER PUBLICATIONS

Okawa et al, "Automation and Intelligence of Device by Integrated Equipment," Keiso-Kogyogijutsusha Ltd., Sep. 1, 2008, pp. 28-33, vol. 46, No. 12. (with partial translation).

*Primary Examiner* — Brendan Higa
(74) *Attorney, Agent, or Firm* — Oliff & Berridge, PLC

(57) ABSTRACT

An imaging device information management system includes a plurality of computers interconnected through a network. A managed computer includes a primary imaging device information obtaining system that obtains imaging device information from the imaging device. A managing computer includes a computer information obtaining system that obtains computer information from the managed computer, a secondary imaging device information obtaining system that obtains the imaging device information obtained by the primary imaging device information obtaining system from the managed computer, and an information storing system that creates correspondence information representing a correspondence between the managed computer and the imaging device in accordance with the computer information obtained by the computer information obtaining system and the imaging device information obtained by the secondary imaging device information obtaining system, and stores the correspondence information in a storage.

17 Claims, 37 Drawing Sheets

FOREIGN PATENT DOCUMENTS

| | | |
|---|---|---|
| JP | 10-269039 A | 10/1998 |
| JP | 10-320344 A | 12/1998 |
| JP | 2000-284933 A | 10/2000 |
| JP | A 2000-293324 | 10/2000 |
| JP | A 2000-293466 | 10/2000 |
| JP | A 2001-243159 | 9/2001 |
| JP | A-2001-256129 | 9/2001 |
| JP | 2002-082792 A | 3/2002 |
| JP | A-2002-175200 | 6/2002 |
| JP | B2 3339921 | 8/2002 |
| JP | A-2002-358377 | 12/2002 |
| JP | A-2003-76580 | 3/2003 |
| JP | A 2003-131585 | 5/2003 |
| JP | A 2003-131858 | 5/2003 |
| JP | A-2003-216699 | 7/2003 |

\* cited by examiner

| Home | Preference | Column/Filter Settings | Discovery Setting | Notification Settings | Client Setting | About |

Discovered Devices : 46

| Search Names | Get Device Status | Add Device 0.0.0.0 | Add | Group Filter All Filters ▼ Go | Filter All Devices ▼ Go | Enable Auto Refresh | Column Default Go | Save Layout |

Last Update : Wed. Oct 15 10:51:56 2003

| Print Server | Model Name | Device Status | IP Address | Log | Location | Contact | Serial No. |
|---|---|---|---|---|---|---|---|
| BRN 22D09E | OCP-B025J | Magnification :100% | 192.168.0.79 | | | | 0012345678990 |
| BRN 31BFBF | HL-1850 1870N series | LJ SLEEP 001P T1 | 192.168.0.41 | ● | | | 000000000 |
| BRN 31D6EC | HL-1850 1870N series | SLEEP | 192.168.0.5 | | | | 258741369 |
| BRN 32E02D | HL-1850 1870N series | SLEEP | 192.168.0.48 | | | | 987456321 |
| BRN 3345F | HL-1850 1870N series | AVAILABLE | 192.168.0.59 | | WHERE? | | C2J127018 |
| BRN 334591 | HL-1850 1870N series | READY | 192.168.0.96 | | K1 | | 000000000 |
| BRN 3345CC | HL-1850 1870N series | READY | 192.168.0.66 | | Ksm1 | | G2J150545 |
| BRN 3345DC | HL-1850 1870N series | READY | 192.168.0.97 | | | | H1J187932 |
| DD0 12 480033 | HL-2700CN series | Connection Error | 192.168.0.92 | | 12 2700cn | | 0 |
| BRN 480006 | HL-2700CN series | SLEEP | 192.168.0.52 | | | | 0 |
| BRN 480007 | HL-2700CN series | Connection Error | 192.168.0.7 | | NET G | | 0 |
| BRN 4001E | HL-2700CN series | READY | 192.168.0.13 | ● | | kojima | 0 |
| BRN 480032 | HL-2700CN series | Connection Error | 192.168.0.9 | | | | 0 |
| BRN 480035 | HL-2700CN series | READY | 192.168.0.32 | ● | | | 0 |
| BRN 480044 | HL-2700CN series | READY | 192.168.0.4 | | | | 0 |
| BRN 31D69E | HL-3260N series | Connection Error | 192.168.0.231 | | K1.HL3260N | | E52839HCV600 |
| BRN 40162A | HL-4200CN | Ready standby | 192.168.0.220 | | | | 0 |
| BRN 33C0F1 | HL-5050 series | CHANGE DRUMSOON | 192.168.0.67 | | | | 110000100 |
| BRN 35AC27 | HL-6050D CN series | SLEEP | 192.168.0.93 | | | | 0 |

| All Device ▼ | | Open | Deselect | Select All | Delete | Log — 49 | Device Home Page |

Log Settings

View Print Log     Logged Devices 7 [Device list]
Local Printer Log     [Local Print Admin]

Last Update:    Thu Sep 18 18:33:24 2003
[Get Log@]

Schedule Setting    Every Week (Fri.)(18:00)   [Add]
    Every Month (On the 1.) (09:00)   [Edit]
    [Delete]

☐ Send Log Report Mail   Send Mail Address: [admin@example.com]
    SMTP Server Address [smtp.serv.com]
    From Address [printadmin@example.com]

Log Type   ☑ Meintenance Info
    ☐ Job Print Log
    ☐ Error Log
    ☐ Total Job Print Log File Type   ⊙ HTML ○ CSV ○ TXT Log Style   ○ All Data
    ⊙ Latest Data Only Log File   File Max Size [1024] Kbytes

[Cancel] [Submit]

FIG. 4

| IP address | PC name | Number of Printers | Version | Date&Time | Printer. No | Printer Name | Port Name | ROM Vers | Ser.No | Drum Life | Page count |
|---|---|---|---|---|---|---|---|---|---|---|---|
| 192.168.0.1 | ORANGE | 3 | 1 | 2003/9/1 11:00 | 0 | HL-1450 | USB001 | 1.04 | G23456 | 1281 | 22273 |
| 192.168.0.1 | ORANGE | 3 | 1 | 2003/9/1 11:00 | 1 | HL-2600C | USB002 | 1.35 | P88765 | 10023 | 1446 |
| 192.168.0.1 | ORANGE | 3 | 1 | 2003/9/1 11:00 | 2 | MFC-8820D | Parallel | 1.1 | Z22436 | 5368 | 5260 |
| 192.168.0.2 | GRAPE | 1 | 1 | 2003/9/2 0:00 | 0 | HL-7050 | USB001 | 1.01 | G24357 | 7881 | 14273 |
| 192.168.0.3 | APPLE | 2 | 1 | 2003/9/1 10:00 | 0 | HL-5050 | USB001 | 1.03 | G22561 | 23456 | 5635 |
| 192.168.0.3 | APPLE | 2 | 1 | 2003/9/1 10:00 | 1 | MFC-5200 | USB002 | 1.01 | Z88765 | 8513 | 6254 |

FIG.23

```
<Client PC>
IP Address. "192. 168. 0. 1"
PC Name, "ORANGE"
Number of Printers. "3"
Version, "1.00"
Date &Time, "2003/9/1 11:0:0"

<Printer>
Printer. No. 0
Printer Name, "HL - 1450"
Port Name, "USB001"
ROM Version, "1. 04"
Ser. No, "G23456"
Drum Life, 1281
Page count, 22273

<Printer>
Printer. No. 1
Printer Name, "HL - 2600C"
Port Name, "USB002"
ROM Version, "1. 35"
Ser. No, "P88765"
Drum Life, 10023
Page count, 1446

<Printer>
Printer. No. 2
Printer Name, "MFC - 8820D"
Port Name, "Parallel"
ROM Version, "1. 10"
Ser. No, "Z22438"
Drum Life, 5368
Page count, 5260
```

FIG.24

```
<Client PC>
Client PC Name, "ORANGE"
IP Address, "192. 168. 0. 1
Location, "5F"
Contact, "2477"
```

FIG.26

| Printer. No | Printer. Name | Port Name | ROM Version | Ser. No | Drum Life | Page count | Jam count | Toner Change |
|---|---|---|---|---|---|---|---|---|
| 01 | L – 1000 | USB001 | 1.04 | G23456 | 1281 | 22273 | 3 | 1 |
| 1 | L – 2000 | USB002 | 1.35 | P88765 | 10023 | 1446 | 0 | 0 |
| 2 | C – 8000 | Parallel | 1.1 | Z22438 | 5368 | 5260 | 0 | 0 |

FIG.27

| IP address | PC name | Location | Contact | Note |
|---|---|---|---|---|
| 192. 168. 0. 151 | ORANGE | Factory 5F | XXX – 8554 | Windows |

FIG.29

Send Log Mail

View Print Log      Logged Devices :1 — 101

Mail Type
- ● CSV(MIME)
- ○ Plain Text

---

Client Information    Name:ORANGE   Address:192.168.0.151

Location [Factory 5F] — 103
     Contact [XXX − 8554] — 105
     Note [Windows] — 107

---

111 — ☐ Send Mail    Send Mail Address [admin@localnet.com] — 113
     SMTP Server Address [smtp.localnet.com] — 115
     From Address [?? admin@example.com] — 117

Leat Update:   Wed Oct 29 16:24:58 2003
     [Send Log Status] — 121

Sehedule Setting   [Everyday (18:00)]   [Add] — 125
123      [Edit] — 127
131      [Delete] — 129

133 — ☐ Auto Send (Latest Date & Time)
     ☐ Auto Send (Latest Date)

---

135 — ☐ Recieve Satting Mail   Pop Server Address [Pop.localnet.com] — 137
     Mail Account Name [IdZ446] — 139
     Account Password [●●●●●●●] — 141

[Cancel] [Submit]
   151    153

```
Received: from ORANGE ([192. 168. 0. 151])
    by smtp. localnet. com (8. 8. 8/3. 7W)with ESMTP id KAA23066
    for <wbradmin@example. com>; Wed, 22 Sep 2003 10:43:02 +0900 (JST)
To: admin@localnet. com
Subject: Local Printer Information
From: wbradmin@example. com
Message - id: <200309221043, ABG40797. BTJLOPXB, VB@localnet. com>
X - Mailer: Winmailer [Version 2. 42 PL6]
X - Accept - Language; cn
Data: Wed, 22 Sep 2003 10:43:05 +0900
Mime - Version; 1.0
Content - Type: multipart/mlxed:boundary="---------1072230184 - 9797046"
X - UIDL: 7e26646546232b4f4184be06b72f15ac8d9c6b
X - winbiff - received - account: pop
X - winbiff - flags: @S----------@

---------1072230184 - 9797046
Content - Transfer - Encoding: Base64
Content - Type: application/octet - stream:
    name="LocalPrinterInformation.csv"
Content - Disposition: attachment:filename="LocalPrinterInformation. csv"

<AuditorMaller. csv>
----------1072230184 - 9797046--
```

FIG.33A

```
<PC Information>
IP address. PC name, Location, Contact, Note
192. 168. 0. 151, ORANGE, Factory 5F, XXX - 8554, Windows <Printer Information>
Printer. No, Printer Name, Port Name, ROM Version, Ser. No, Drum Life, Page count, Jam count, Toner Chang
0. L - 1000, USB001, 1.04, G23456, 1281, 22273, 3,1
1, L - 2000, USB002, 1.36, P88765, 10023, 1446,0, 0
2, C - 8000, Parallel, 1. 1, Z22438, 5368, 5260, 0, 0
```

FIG.33B

```
Received: from ORANGE ([192. 168. 0. 151])
    by smtp. localnet com (8. 8. 8/3. 7W)with ESMTP id KAA23066
    for <wbradmin@example. com>; Wed, 22 Sep 2003 10:43:02 +0900 (JST)
To: admin@localnet, com
Subject: Local Printer Information
From: wbradmin@example. com
Message – id: <200309221043, ABG40797. BTJLOPXB, VB@localnet. com>
X – Mailer: Winmailer [Version 2. 42 PL6]
X – Accept – Language; en
Data: Wed, 22 Sep 2003 10:43:05 +0900
Mime – Version; 1.0
Content – Type: text/plain; charset=us – ascii
X – UIDL: 860dad4b3042de3afb2f6babfcb65e6b
X – winbiff – received – account: pop
X – winbiff – flags: @S-----------@
<PC Information>
IP address, 192. 168. 0. 151
PC name. ORANGE
Location, Factory 5F
Contact. XXX – 8554
Note, Windows
<Printer Information>
Printer. No, 0
Printer Name, L – 1000
Port Name, USB001
ROM Version, 1. 04
Ser. No, G23456
Drum Life, 1281
Page count, 22273
Jam count, 3
Toner Change, 1
<Printer Information>
Printer. No, 1
Printer Name, L – 2000
Port Name, USB002
ROM Version, 1. 35
Ser. No, P88765
Drum Life, 10023
Page count, 1446
Jam count, 0
Toner Change, 0
<Printer Information>
Printer. No, 2
Printer Name, C – 8000
Port Name, Parallel
ROM Version, 1. 1
Ser. No, Z22438
Drum Life, 5368
Page count, 526D
Jam count, 0
Toner Change, 0
```

```
Received: from AdminPC ([11. 22. 33. 44])
    by smtp. remotenet com (8. 8. 8/3. 7W – 020304) with ESMTP id IAA70066
    for <wbradmin@example. com>; Wed, 22 Sep 2003 10:43:02 +0900 (JST)
To: wbradmin@example. com
Subject: Log Mail Setting
From: admin@;ocalnet. com
Message – id; <200309221043, A4097. BTJL. VB@remotenet. com>
X – Mailer: Winmailer [Version 2. 42 PL6]
X – Accept – Language; en
Data: Mon, 2 Sep 2003 11:33:20 +0900
Mime – Version; 1.0
Content – Type: text/plain; charset=us – ascii
X – UIDL: 860dad4b3042de3alb2f6babfcb6
X – winbift – received – account: pop
X – WINBIFT – flags: @S-----------@

<Mall Type Setting>
CSV

<Client Information Satting>
Location, Factory 5F
Contact. XXX – 8554
Note, Windows <Send Mail Setting>

Send Mail Address, admin@localet. com
SMTP Server Address, snmp. localnet. com
From Address, wbradmin@example. com <Schedule Setting>
Spectied Time, Starting Time 00:00, Everyday
```

FIG. 39

| Type | Log | IP address | PC name/Print Server | Device Status | Number of Printers | Version | Date&Time | Printer No. |
|---|---|---|---|---|---|---|---|---|
| Local | ● | 192.168.0.1 | ORANGE | OK | 3 | 1 | 2003/9/1 11:00 | 0 |
| Local | ● | 192.168.0.1 | ORANGE | OK | 3 | 1 | 2003/9/1 11:00 | 1 |
| Local | ● | 192.168.0.1 | ORANGE | OK | 3 | 1 | 2003/9/1 11:00 | 2 |
| Local | ● | 192.168.0.2 | GRAPE | OK | 1 | 1 | 2003/9/2 0:00 | 0 |
| Local | ● | 192.168.0.3 | APPLE | OK | 2 | 1 | 2003/9/1 10:00 | 0 |
| Local | ● | 192.168.0.3 | APPLE | OK | 2 | 1 | 2003/9/1 10:00 | 1 |
| Network |  | 192.168.0.79 | BRN 22009E | SCALE:100%QUALITY | - | - | - | - |
| Network | ● | 192.168.0.41 | BRN 31BFBF | LJ SLEEP 001:PT1 | - | - | - | - |
| Network |  | 192.168.0.5 | BRN 31D6EC | SLEEP | - | - | - | - |
| Network |  | 192.168.0.48 | BRN 32E02D | SLEEP | - | - | - | - |
| Network |  | 192.168.0.59 | BRN 33458F | READY | - | - | - | - |
| Network |  | 192.168.0.96 | BRN 334591 | READY | - | - | - | - |

| Printer Name | Port Name | ROM Version | Ser.No. | Drum Life | Page count | Jam count | Toner Change | Location | Contact |
|---|---|---|---|---|---|---|---|---|---|
| HL-1450 | USB001 | 1.04 | G23456 | 1281 | 22273 | 3 | 1 | 5F | 2477 |
| HL-2600C | USB002 | 1.35 | P88765 | 10023 | 1446 | 0 | 0 | 5F | 2477 |
| MFC-8820D | Parallel | 1.1 | Z22438 | 5368 | 5260 | 0 | 0 | 5F | 2477 |
| HL-7050 | USB001 | 1.01 | G24357 | 7881 | 14273 | 0 | 0 | 5F | 2361 |
| HL-5050 | USB001 | 1.03 | G22561 | 23456 | 5635 | 1 | 0 | 5F | 1452 |
| MFC-5200 | USB002 | 1.01 | Z88765 | 8513 | 6254 | 3 | 0 | 5F | 1452 |
| DCP8025J | Network | 1.01 | G01234567890 | 1234 | 11132 | 0 | 0 |  |  |
| HL-1470N series | Network | 1.15 | 000000000 | 10345 | 3423 | 5 | 0 |  |  |
| HL-1650 1670N series | Network | 1.3 | 258741369 | 5431 | 4321 | 2 | 0 |  |  |
| HL-1850 1870N series | Network | 1.00 | 987456321 | 4563 | 11143 | 0 | 0 |  |  |
| HL-1850 1870N series | Network | 1.03 | C2J127018 | 3324 | 5465 | 0 | 0 | WHERE ? |  |
| HL-1850 1870N series | Network | 1.01 | 000000000 | 12345 | 1253 | 1 | 1 | K1 |  |

IMAGING DEVICE INFORMATION MANAGEMENT SYSTEM

BACKGROUND OF THE INVENTION

The present invention relates to an imaging device information management system that manages information of imaging devices which are locally connected to terminals connected to a network.

Conventionally, there has been known a program called as a status monitor, which is executed on a computer to investigate and/or manage the status (e.g., on-line/off-line, busy, error, etc.) of devices (e.g., a printer or an MFP (multi-function peripheral) having a printer function) locally connected to the computer. There has also been known a program called as a maintenance tool, which is executed on a computer to manage maintenance information (e.g., remaining amount of toner or ink, remaining amount of a recording sheet, a term for exchanging a photosensitive drum, etc.) of imaging devices locally connected to the computer.

The conventional status monitor and maintenance tool have been executed locally. Recently, however, a plurality of computers are interconnected through a network, and therefore, it is desirable that the status and/or maintenance information of devices connected to respective computers are managed at a particular computer (e.g., one used by a system administrator).

In response to the above-described desire, a central management system has been suggested in Japanese Patent Provisional Publication No. P2000-293324A. In this publication, each computer on a network obtains status/maintenance information of locally connected imaging devices, and transmits the thus obtained information to another computer on the network.

Specifically, according to the publication, in each of the computers, an operational status of each imaging device connected to the computer is monitored, and when the operational status is changed, the computer obtains the changed status, and transmits the status to another computer which is connected to the network. Such a procedure is called as a trapping procedure in the publication. The publication also suggests a response-to-request procedure which obtains the status of the imaging device immediately when a request for such information is received from another computer through the network, and provides the obtained status information to the computer from which the request was received.

In the conventional information management system as exemplified above, the imaging devices locally connected to the computers on the network are regarded as devices connected to the network. Therefore, from the managed information, it is impossible to know to which computer each imaging device is locally connected.

Therefore, the conventional imaging device information management system is unable to output information indicative of the relationship between each computer and the imaging devices locally connected thereto as a displayed image, a printed image of a file. Therefore, the user of the system cannot know, using such a system, the relationship between the computers and locally connected imaging devices. Further, in such a system, it is impossible for a computer to request another computer for such information or to transmit such information to another computer.

Furthermore, in such a system, the computer attempts to obtain the latest status/maintenance information from the local imaging device when the trapping procedure or the response-to-request procedure is executed. According to such a system, if the response is not provided by the imaging device immediately, the computer is unable to transmit the information immediately. Therefore, the information of the imaging devices, the imaging devices, the computers to which the imaging devices are locally connected, and a managing computer should operate when the information is obtained.

For another example, in Japanese Patent Provisional Publication No. P2003-131858A discloses an imaging device which transmits an e-mail to a user upon occurrence of an error condition. However, according to the publication, the imaging device only transmits the information regarding the imaging device itself, and no information regarding the computer to which the imaging device is connected. Therefore, when receives the e-mail message from the imaging device, the user cannot identify the computer connected with the imaging device.

SUMMARY OF THE INVENTION

The present invention is advantageous in that the above-described deficiencies of the conventional system can be resolved, and the information representing the relationship between the imaging device and the computers to which the imaging devices are locally connected can be provided. The present invention is also advantageous in that, even if all the imaging devices and the computers to which the imaging devices are connected are not simultaneously operating, the managing computer can obtain the information regarding the imaging devices.

According to an aspect of the invention, there is provided a computer program product for an imaging device information management system including a plurality of computers interconnected through a network, at least one of the plurality of computers being a managing computer, at least one of the plurality of computers being a managed computer, at least one imaging device being connected to the managed computer. The computer program product may have a first program product including computer readable instructions that cause the managed computer to realize a function of a primary imaging device information obtaining system that obtains imaging device information from the imaging device. Further, the computer program product may have a second program product including computer readable instructions that cause the managing computer to realize functions of a computer information obtaining system that obtains computer information regarding the managed computer from the managed computer, a secondary imaging device information obtaining system that obtains the imaging device information obtained by the primary imaging device information obtaining system from the managed computer, and an information storing system that creates correspondence information representing a correspondence between the managed computer and the imaging device in accordance with the computer information obtained by the computer information obtaining system and the imaging device information obtained by the secondary imaging device information obtaining system, and stores the correspondence information in a storage.

Optionally, the computer information may include one of a name and a network address of the managed computer, and the imaging device information may include one of a name and a network address of the managed computer to which the imaging device is locally connected. Further, the correspondence information may indicate that the computer information obtained by the computer information obtaining system corresponds to the imaging device information obtained by the secondary imaging device information obtaining system including one of the computer name and the network address same as one of the computer name and the network address included in the computer information obtained by the computer information obtaining system.

Still optionally, the managed computer may be connected to the network, and the first computer program product may include further instructions that cause the managed computer to include a computer name storing system that stores a computer name to be used to identify the managed computer on the network, and a computer name transmitting system that retrieves the computer name from the computer name storing system and transmits the computer name to the managing computer. Further, the second computer program product may include instructions that cause the managing computer to obtain the computer name transmitted from the computer name transmitting system as part of the computer information.

Further optionally, the managed computer may be connected to the network, and the first computer program product may include further instructions that cause the managed computer to include an address information storing system that stores address information of the managed computer to be used to communicate with another node on the network, and an address information transmitting system that retrieves the address information from the address information storing system and transmits the computer name to the managing computer. Further, the second computer program product may include instructions that cause the managing computer to obtain the address information transmitted from the address information transmitting system as part of the computer information.

Furthermore, the first computer program product may include further instructions that cause the managed computer to include a computer information input system that allows a user to input information to be uses at least part of the computer information to input therethrough, and an input computer information transmitting system that transmits at least part of the computer information input through the computer information input system to the managing computer, Further, the second computer program product may include instructions that cause the managing computer to obtain the at least part of the computer information transmitted from the input computer information transmitting system.

In a particular case, the computer information input system may allow the user to input location information regarding a location where the managed computer is placed.

Optionally or alternatively, the computer information input system may be configured to allow the user to input user information regarding the user of the managed computer.

Still optionally, the information storing system may be configured to store the correspondence information including the correspondence of the location information of the managed computer and the imaging device.

Optionally or alternatively, the information storing system may be configured to store the correspondence information including the correspondence of the user information of the managed computer and the imaging device.

Further optionally or alternatively, the information storing system may be configured to store the correspondence information including the correspondence of the port name of the managed computer used for local connection with the imaging device and the imaging device.

Furthermore, the information storing system may be configured to store the correspondence information including the correspondence of the name assigned to the managed computer and the imaging device.

In a particular case, the computer information input system may be configured to allow the user to input a name assigned to the managed computer.

Optionally, the second computer program product may further include instructions that cause the managing computer to realize a function of a display information creating system that creates display information including a correspondence between the managed computer and the imaging device in accordance with the correspondence information stored in the storage by the information storing system.

In a particular case, the second computer program product may further include instructions that cause the managing computer to realize a function of a display information outputting system that outputs the display information created by the display information creating system as a file which can be displayed.

Further, at least one of the plurality of computers may be an information displaying computer, and the second computer program product may further include instructions that cause the managing computer to realize a display information transmitting system that transmits the display information output by the display information outputting system as a file to the information displaying computer. In this case, the information displaying computer may include a transmission requesting system that requests the managing computer to transmit the display information, and an information displaying system that outputs the display information transmitted from the managing computer in response to a request by the transmission requesting system to a display device provided to the information displaying computer.

In a specific case, the information displaying computer may be implemented with a web browser that functions as the transmission requesting system and the information displaying system, the information displaying computer requesting the managing computer to transmit the display information, the information displaying device transmitting the display information transmitted from the managing computer in response to the request to the display device provided to the information displaying computer using the web browser.

Alternatively or optionally, the second computer program product may further include instructions that cause the managing computer to realize, as the display information creating system, functions of a first display information creating system that displays the computer information related to all the managed computers on the network, and a second display information creating system that displays the correspondence information regarding the correspondence of one or more managed computer selected on the information displaying computer and the imaging device. Further, the second computer program product may further include instructions that cause the managing computer to realize, as the display information outputting system, functions of a first display information outputting system that outputs the first display information created by the first display information creating system as a displayable file, and a second display information outputting system that outputs the second display information created by the second display information creating system as a displayable file. Furthermore, the second computer program product may further include instructions that cause the managing computer to realize, as the display information transmitting system, functions of a first display information transmitting system that transmits the first display information output, as a file, by the first display information outputting system to the information displaying computer, and a second display information transmitting system that transmits the second display information output, as a file, by the second display information outputting system to the information displaying compute. Still further, the information displaying computer may include, as the transmission requesting system, a first transmission requesting system that request the managing computer to transmit the first display information, and a second transmission requesting system that requests the managing computer to transmit the second display information. Furthermore, the information displaying computer may include, as the information displaying system, a first information displaying system that displays the first display information transmitted from the managing computer on a displaying device provided to the information displaying computer in response to a request by the first transmission requesting system, a second information displaying system that displays the second display information transmitted from the managing computer on a displaying device provided to the information displaying computer in response to a request by the second transmission requesting system, and a managed computer selecting system that allows a user to select one or more managed computers from among managed computers displayed in the first display information when the first information displaying system displays the first display information on the displaying device. Furthermore, the second transmission requesting system may be configured to request the managing computer to transmit the second display information for displaying the correspondence information representing the correspondence between one or more managed computers selected by the user through the managed computer selecting system.

Optionally, the second display information outputting system is capable of outputting the second display information in accordance with a plurality of data formats.

In a particular case, the second program product may further include instructions that cause the managing computer to realize a function of a data format designating system which allows the user to designate the data format when the second display information is output, and the second display information outputting system may output the second display information in accordance with the format designated by the user through the data format designating system.

Further, when the secondary imaging device information obtaining system obtains the imaging device information, the second display information outputting system may output the second display information in accordance with a currently designated data format.

Still optionally, the first display information outputting system may output first display information which includes link information for providing a link to a file of the second display information every time when the output data format of the second display information is changed, the link information being changed to link information corresponding to the changed data format.

Optionally, the first display information output by the first display information outputting system may include link information for providing a link to the file of the second display information.

Further optionally, the second program product may include instructions that cause the managing computer to realize an information display system that displays display information including correspondence between the managed computer and the imaging device on the display device provided to the managing computer based on the correspondence information stored in the storing system.

In this case, the second program product may optionally include instructions that cause the managing computer to realize, as the information display system, functions of a first information display system that displays computer information of all the managed computer on the network, a managed computer selecting system that allows a user to select one or more computers from among the managed computer displayed in the computer information when the first information display system displays the computer information, and a second information display system that displays a correspondence between the one or more managed computers selected by the managed computer selecting system and the imaging devices.

Still optionally, the second program product may further include instructions that cause the managing computer to further include a function of a network imaging device information obtaining system that obtains information regarding one or more network imaging device on the network, and the display information creating system may create the display information with the network imaging device information being included.

Furthermore optionally, the second program product further includes instructions that cause the managing computer to further include a function of a network imaging device information obtaining system that obtains information regarding one or more network imaging device on the network, and the display information creating system may create second display information including the network device information, the second display information being different from the display information created by the display information creating system.

Yet optionally, the first program product may include instructions that cause the managed computer to further realize a function of a primary obtaining schedule setting system that sets a first schedule for the managed computer to obtain the imaging device information from the imaging device, the primary imaging device information obtaining system obtaining the imaging device information in accordance with the first schedule set by the primary obtaining schedule setting system. Further, the second program product may further include instructions that cause the managing computer to realize a function of a secondary obtaining schedule setting system that sets a second schedule for the managing computer to obtain the imaging device information from the managed computer. Furthermore, the imaging device information secondary obtaining system may be configured to obtain the imaging device information from the managed computer in accordance with the second schedule set by the secondary obtaining schedule setting system, and the primary obtaining schedule setting system and the secondary obtaining schedule setting system are configured to set different schedules having different timings as the first and second schedules, respectively.

Still optionally, the second program product may include instructions that cause the managing computer to realize a function of a secondary obtaining schedule setting system that sets a schedule for the managing computer to obtain the imaging device information from the managed computer. The secondary imaging device information obtaining system may be configured to obtain the imaging device information from the managed computer in accordance with the schedule set by the secondary obtaining schedule setting system, and, when the secondary imaging device information obtaining system fails to obtain the imaging device information, at least one attempt to obtain the imaging device information is made independent from the schedule.

Further optionally, the display information outputting system is capable of outputting the display information in one of a plurality of data formats.

In particular, the managing computer may include a data format designating system that allowing a user to designate a data format when the display information is output, and the display information outputting system may output the display information in accordance with the data format designated by the user through the data format designating system.

Optionally, the display information outputting system may output the display information in accordance with the data format that is designated when the secondary imaging device information obtaining system obtains the imaging device information.

Optionally, the second program product may further include instructions that cause the managing computer to realize a port number transmitting system that transmits setting information of a port number, which is used for data communication between the managed computer and the managing computer, to the managed computers simultaneously. In this case, the first program product may further include instructions that causes the managed computer to realize a port number setting system that sets a port number used for communication with the managing computer in accordance with the setting information transmitted from the port number transmitting system.

In a particular case, the port number transmitting system may transmit the setting information used for data communication between the managed computer and the managing computer to a plurality of managed computers at a time.

Still optionally, the first program product may further include instructions that cause the managed computer to realize an imaging device information transmitting system that transmits the imaging device information obtained by the imaging device information primary obtaining system. In this case, the managed computer may execute a plurality of procedures in parallel, the third program product causing the managed computer to execute, in parallel with the information transmitting procedure executed by an imaging device information transmitting system, an imaging device information obtaining procedure that is executed by an imaging device information primary obtaining system for obtaining imaging device information from the imaging device. Further, the second program product may include instructions that cause the managing computer to realize a function of an imaging device information secondary obtaining system that obtains the imaging device information transmitted by the imaging device information transmitting system.

In a particular case, the imaging device information primary obtaining system may include an imaging device information storing system that stores the obtained imaging device information in a storage, and the imaging device information transmitting system may obtain, from the storage, the imaging device information that is stored by the imaging device information storing system and transmits the obtained imaging device information to the managing computer.

Further, the managed computer may be configured such that the imaging device information storing system deletes, prior to storing of the imaging device information, the imaging device information having been stored in the storage.

Furthermore, the imaging device information primary obtaining system may partially obtain the imaging device information from the imaging device at a time, and the imaging device information storing system may store the imaging device information in the storage after the imaging device information primary obtaining system has completed obtaining the imaging device information from the imaging device.

In a particular case, the imaging device information primary obtaining system may partially obtain the imaging device information from the imaging device at a time, the imaging device information storing system may store the imaging device information in the storage every time when the imaging device information primary obtaining system partially obtains the imaging device information, and the imaging device information transmitting system may transmit the imaging device information with including information indicating that the imaging device information is incomplete when the imaging device information having been stored in the storage is incomplete.

Further optionally, the imaging device information primary obtaining system may partially obtain the imaging device information from the imaging device at a time, the imaging device information storing system may store the imaging device information in the storage every time when the imaging device information primary obtaining system partially obtains the imaging device information, the imaging device information storing system setting a storing condition to a condition indicating that the entire imaging device information has been stored, and the imaging device information transmitting system may transmit the imaging device information with including information indicating that the imaging device information is incomplete when the entire imaging device information has not been stored in the storage.

Still optionally, the managed computer may be provided with an interpreter that converts a program code independent of types of computers into a machine code executable by the managed computer and/or similar computers, and the imaging device information transmitting system may be realized by a program which is given to the interpreter as a program code, converted into the machine code by the interpreter, and executed by the managed computer.

Further optionally, the imaging device information may include amount of usage of an exchangeable member of the imaging device.

In a particular case, the imaging device information may include consumed amount of a consumable member of the imaging device.

Optionally or alternatively, the imaging device information may include occurrence of an unusual condition.

Further, the second program product may include instructions that cause the managing computer to realize a function of a list memorizing system that memorizes a list of the managed computer, the computer information obtaining system may be configured to recognize presence of the managed computer by referring to the list memorized in the list memorizing system, and the second imaging device information obtaining system may be configured to obtain the imaging device information from the managed computer whose presence is recognized by the computer information obtaining system.

In a particular case, the second program product may include instructions that causes the managing computer to further include a list storing system that stores a list of managed computers, and the presence of the manage computer may be determined based on valid/invalid information of each of the managed computers stored in the list storing system.

Alternatively, the second program product may include instructions that causes the managing computer to further include a list storing system that stores a list of managed computers, and the presence of the manage computer may be determined based on whether it is possible to communicate with each of the manage computers stored in the list storing system.

Still optionally, the first program product may include instructions that cause the managed computer to realize functions of an identification information storing system that stores identification information for identifying the managing computer, a determining system that determines, when a request for the imaging device information is received from an other computer through the network, whether the other computer is the managing computer based on the identification information stored in the identification information storing system, and an imaging device information transmitting system that transmits the imaging device information to the managing computer when the determining system determines that the other computer is determined as the managing computer.

Alternatively, the first program product may include instructions that cause the managed computer to include a function of a primary obtaining schedule setting system that sets first schedule for the managed computer to obtain the imaging device information from the imaging device, the primary imaging device information obtaining system obtaining the imaging device information in accordance with the first schedule set by the primary obtaining schedule setting system, and the second program product may include instructions that cause the managing computer to include a function of a secondary obtaining schedule setting system that sets second schedule for the managing computer to obtain the imaging device information from the managed computer. In this case, the secondary imaging device information secondary obtaining system may be configured to obtain the imaging device information from the managed computer in accordance with the second schedule set by the secondary obtaining schedule setting system, and the primary obtaining schedule setting system and the secondary obtaining schedule setting system may be configured to set first and second schedules, respectively, the second schedule being later than the first schedule by a predetermined interval.

Further optionally, the second program product may include instructions that cause the managing computer to further include a primary obtaining schedule transmitting system that transmits setting information used for setting a schedule for the managed computer to obtain the imaging device information from the imaging device to a plurality of computers functioning as the managed computer simultaneously. Further, the first program product may include instructions that cause the managed computer to further include a function of a primary obtaining schedule setting system that sets a schedule for the managed computer to obtain the imaging device information from the imaging device in accordance with the setting information transmitted from the primary obtaining schedule transmitting system, and the primary imaging device information obtaining system may obtain the imaging device information from the imaging device in accordance with the schedule set by the primary obtaining schedule setting system.

In a particular case, the imaging device information management system may include a plurality of managed computers, and the primary obtaining schedule transmitting system may transmit the setting information used for setting a schedule for the managed computer to obtain the imaging device information from each of the imaging device to the plurality of managed computer simultaneously.

According to another aspect of the invention, there is provided a computer program product for an imaging device information management system including a plurality of computers interconnected through a network, at least one of the plurality of computers being a managing computer, at least one of the plurality of computers being a managed computer, at least one imaging device being connected to the managed computer. The computer program product may include a first program product including computer readable instructions that cause the managed computer to realize a function of a primary imaging device information obtaining system that obtains imaging device information from the imaging device. The computer program product may further include a second program product including computer readable instructions that cause the managing computer to realize functions of a reply requesting system that requests a node in the network to transmit a reply, a computer information obtaining system that detects the managed computer based on the reply to the request, and obtains the computer information from the managed computer, a secondary imaging device information obtaining system that requests the managed computer to transmit the imaging device information obtained by the primary imaging device information obtaining system, and receives the imaging device information, which is transmitted by the managed computer in reply to the request, and an information storing system that creates information regarding the imaging device based on the imaging device information obtained by the secondary imaging device information, and stores the information in a storage area.

In a particular case, the secondary imaging device information may obtain the network address of the managed computer from the reply which is returned in response to the request from the reply requesting system.

Optionally, the information storing system may create correspondence information representing the correspondence between the managed computer and the imaging device, based on the computer information obtained by the computer information obtaining system and the secondary imaging device obtaining system.

Further optionally, the computer information may include one of name and network address of the managed computer. The imaging device information may include one of the name and network address of the managed computer to which the imaging device is locally connected, and the correspondence information is information indicating that the imaging device information obtained by the computer information obtaining system corresponds to the imaging device information obtained by the secondary imaging device information obtaining system, one of the computer name and the network address included in the computer information being the same as one of the computer name and the network address included in the imaging device information obtained by the secondary imaging device information obtaining system.

In a particular case, the first program product may include instructions that cause the managing computer to include a function of a display information creating system that creates display information including correspondence between the managed computer and the imaging device based on the correspondence information stored in the storage by the storing system.

Further, the second program product may include instructions that cause the managing computer to include a function of a display information outputting system that outputs the display information created by the display information creating system as a displayable file.

Furthermore, at least one of the plurality of computers may be an information display computer, the second program product may include instructions that cause the managing computer to include a function of a display information transmitting system that transmits the display information which was output as a file by the display information outputting system, and the information display computer is provided with a transmission requesting system that requests the managing computer to transmit the display information and an information displaying system that displays the display information transmitted from the managing computer, in response to the request from the transmission requesting system, on a display device provided to the information display computer.

Further optionally, the computer program product realizes a function of a browser which functions as the transmission requesting system and the information displaying system, the imaging device information management system requesting the managing computer to transmit the display information using the web browser, the display information transmitted from the managing computer in response to the request being displayed on a display device of the information display computer.

According to a further aspect of the invention, there is provided a computer program product for an imaging device information management system including a plurality of computers interconnected through a network, at least one of the plurality of computers being a managing computer, at least one of the plurality of computers being a managed computer, at least one imaging device being connected to the managed computer. The computer program product may include a first program product including computer readable instructions that cause the managed computer to realize functions of a primary imaging device information obtaining system that obtains imaging device information from the imaging device in accordance with a first schedule, the obtained imaging device information being stored in a non-volatile storage, and an imaging device information transmitting system that retrieves the imaging device information from the non-volatile storage and transmits the retrieved information to the managing computer when a request for transmission of the imaging device information is received from the managing computer. Further, the computer program product may include a second program product including computer readable instructions that cause the managing computer to realize functions of a secondary imaging device information obtaining system that request the managed computer to transmit the imaging device information and obtains the imaging device information transmitted from the managed computer in accordance with a second schedule, and an information storing system that creates information related to the imaging device based on the imaging device information obtained by the secondary imaging device information obtaining system, and stores the information in a storage area.

Optionally, the second program product may include instructions that cause the managing computer to include a function of a computer information obtaining system the obtains the computer information from the managed computer.

In a particular case, the information storing system may create correspondence information indicating correspondence between the managed computer and the imaging device based on the computer information obtained by the computer information obtaining system and the imaging device information obtained by the secondary imaging device information obtaining system.

Further optionally, the computer information may include one of the computer name and the network address of the managed computer, the imaging device information may include one of the computer name and the network address of the managed computer to which the imaging device is locally connected, and, in the managing computer, the correspondence information indicates that the computer information obtained by the computer information obtaining system corresponds to the imaging device information obtained by the secondary imaging device information obtaining system, one of the computer name and the network address included in the computer information being the same as one of the computer name and the network address included in the imaging device information obtained by the secondary imaging device information obtaining system.

In a particular case, the second program product may include instructions that cause the managing computer to include a function of a display information creating system that creates display information including correspondence between the managed computer and the imaging device based on the correspondence information stored in the storage by the storing system.

Further, the second program product may include instructions that cause the managing computer to include a function of a display information outputting system that outputs the display information created by the display information creating system as a displayable file.

Furthermore, at least one of the plurality of computers may be an information display computer, and the second program product may include instructions that cause the managing computer include a function of a display information transmitting system that transmits the display information which was output as a file by the display information outputting system. In this case, the information display computer may be provided with a transmission requesting system that requests the managing computer to transmit the display information, and an information displaying system that displays the display information transmitted from the managing computer, in response to the request from the transmission requesting system, on a display device provided to the information display computer.

Furthermore, the computer program product may include a browser which functions as the transmission requesting system and the information displaying system, the imaging device information management system requesting the managing computer to transmit the display information using the web browser, the display information transmitted from the managing computer in response to the request being displayed on a display device of the information display computer.

In a particular case, the primary imaging device information obtaining system and the imaging device information transmitting system are different modules.

Additionally, the imaging device information transmitting system may include an intermediate program language code and an execution system that executes the intermediate program language code.

According to a further aspect of the invention, there is provided a computer program product having computer readable instructions that cause a computer of an information transmitting system to execute an information transmitting procedure, the information transmitting system including the computer and an imaging device connected to the computer, the information transmitting procedure includes a computer information obtaining step that obtains computer information related to the computer, an imaging device information obtaining step that obtains imaging device information related to the imaging device, an e-mail message creating step that creates an e-mail message including correspondence information indicative of correspondence between the computer and the imaging device based on the computer information obtained by the computer information step and the imaging device information obtained by the imaging device information obtaining step, and a transmission step that transmits the e-mail message created by the e-mail message creating step to a destination.

Optionally, the e-mail message creating step may create an e-mail message containing the correspondence information in a body of the e-mail message.

Further optionally, the e-mail message creating step may create an e-mail message having an attached file containing the correspondence information.

Still optionally, the information transmitting step may include an input step that requests a user to input data which is used at least a part of the computer information, and the computer information obtaining step may obtain the data input by the user through the input step.

In a particular case, the input step may request the user to input data regarding a location of the computer.

Optionally or alternatively, the input step may request the user to input data regarding an administrator of the computer.

Further optionally or alternatively, the information transmitting procedure may include an input information storing step that stores the data input in the input step in a computer information storage, the input information storing step overwriting older information stored in the computer information storage with new information input by the user every time when the information is input in the inputting step, and the computer information obtaining step may be configured to obtain the computer information including information stored in the computer information storage in the input information storing step.

Optionally, the computer may be connected to a network, the computer having a name memorizing system that memorizes a name of the computer which is used for identifying the computer. The information transmitting procedure may include a computer name storing step that stores the name of the computer retrieved from the computer name storage in a computer information storage provided to the computer, the computer name storing step overwrites the computer name stored in the computer information storage with a new computer name read out of the computer name storage prior to execution of the computer information obtaining step, and the computer information obtaining step includes a step of obtaining the computer information including the computer name stored in the computer information storage.

Still optionally, the computer may be connected to a network, the computer having an address information storage that stores address information which is used when communicating with another node. The information transmitting procedure may include an address information storing step in which the address information read out from the address information storage, the address information storing step may overwrite the old address information stored in the computer information storage with a new address information read out from the address information storage prior to execution of the computer information obtaining step, and the computer information obtaining step includes the computer information including the address information stored in the computer information storage in the address information storing step.

Further optionally, the computer may be configured such that a plurality of procedures can be executed in parallel, the computer executing, in parallel with the information transmitting procedure, an imaging device information storing procedure in which the imaging device information is obtained from the imaging device and stored in the imaging device information storage provided to the computer, and the imaging device information obtaining step may obtain the imaging device information from the imaging device information storage.

In a particular case, the managed computer is configured such that the imaging device information storing system deletes, prior to storing of the imaging device information, the imaging device information having been stored in the storage.

Further, the imaging device information primary obtaining system may partially obtain the imaging device information from the imaging device at a time, and the imaging device information storing system may store the imaging device information in the storage after the imaging device information primary obtaining system has completed obtaining the imaging device information from the imaging device.

Particularly, the imaging device information primary obtaining system may partially obtain the imaging device information from the imaging device at a time, the imaging device information storing system may store the imaging device information in the storage every time when the imaging device information primary obtaining system partially obtains the imaging device information, and the imaging device information transmitting system may transmit the imaging device information with including information indicating that the imaging device information is incomplete when the imaging device information having been stored in the storage is incomplete.

In particular, the imaging device information primary obtaining system may partially obtain the imaging device information from the imaging device at a time, the imaging device information storing system may store the imaging device information in the storage every time when the imaging device information primary obtaining system partially obtains the imaging device information, the imaging device information storing system setting a storing condition to a condition indicating that the entire imaging device information has been stored, and the imaging device information transmitting system may transmit the imaging device information with including information indicating that the imaging device information is incomplete when the entire imaging device information has not been stored in the storage.

Furthermore, the managed computer may be provided with an interpreter that converts a program code independent of types of computers into a machine code executable by the managed computer and/or similar computers, and the imaging device information transmitting system may be realized by a program which is given to the interpreter as a program code, converted into the machine code by the interpreter, and executed by the managed computer.

Still optionally, the information transmission procedure may include a computer information update determining step that determines whether the computer information is updated, and the e-mail message creating step may create the e-mail message when the computer information update determining step determines that the computer information has been updated.

In a particular case, the information transmitting procedure may include an old computer information storing step in which the computer information used for creating the e-mail message in the e-mail creating step is stored as old computer information, and the computer information update determining step may compare the old computer information with the computer information obtained in the computer information obtaining step, the computer information update determining step determining that the computer information is updated when contents of the old computer information and new computer information are different.

Optionally, the information transmitting procedure may include an imaging device information update determining step that determines whether the imaging device information has been updated, and the e-mail message creating step may create the e-mail message when the imaging device information update determining step determines that the imaging device information is updated.

In a particular case, the information transmitting procedure may include an old imaging device information storing step which stores the imaging device information used in creating the e-mail message as an old imaging device information, and the imaging device information update determining step may compare the old imaging device information stored by the old imaging device information storing step with the imaging device information obtained by the imaging device information obtaining step, the imaging device information update determining step determining that the imaging device information is updated when contents of the old imaging device information and the imaging device information obtained by the imaging device information obtaining step are different.

Alternatively or optionally, the information transmitting procedure may include an old imaging device information updated date and time information storing step which stores the updated date and time of the imaging device information used in creating the e-mail message as an old imaging device information updated date and time information, and the imaging device information update determining step may compare the updated date and time of the old imaging device information stored by the old imaging device information updated date and time storing step with the updated date and time of the imaging device information obtained by the imaging device information obtaining step, the imaging device information update determining step determining the imaging device information is updated when the updated dates and times of the old and the imaging device information updated date and time obtained by the imaging device information obtaining step are different.

Further optionally, the information transmitting procedure may include a term expiration determining step that determines whether a predetermined period has elapsed since the e-mail message was one of created and transmitted, and the e-mail message creating step may create the e-mail message when the term expiration determining step determines that the predetermined period has elapsed.

Furthermore optionally, the information transmitting procedure may include a transmission schedule information input step that request a user to input a transmission schedule for setting a transmitting timing of the e-mail message, and the e-mail message creating step may create the e-mail message when the transmitting time has come.

Still optionally, the information transmitting procedure may include transmission instruction input step that requests a user to input a transmission instruction of the e-mail message, and the e-mail message creating step may create the e-mail message when the transmission instruction is input.

According to a further aspect of the invention, there is provided an imaging device information management system including a plurality of computers interconnected through a network, at least one of the plurality of computers being a managing computer, at least one of the plurality of computers being a managed computer, at least one imaging device being connected to the managed computer. The managed computer may include a primary imaging device information obtaining system that obtains imaging device information from the imaging device. The managing computer may include a computer information obtaining system that obtains computer information regarding the managed computer from the managed computer, a secondary imaging device information obtaining system that obtains the imaging device information obtained by the primary imaging device information obtaining system from the managed computer, and an information storing system that creates correspondence information representing a correspondence between the managed computer and the imaging device in accordance with the computer information obtained by the computer information obtaining system and the imaging device information obtained by the secondary imaging device information obtaining system, and stores the correspondence information in a storage.

Optionally, the managing computer may be provided with a display information creating system that creates display information including a correspondence between the managed computer and the imaging device in accordance with the correspondence information stored in the storage by the information storing system.

In a particular case, the managing computer may be provided with a display information outputting system that outputs the display information created by the display information creating system as a file which can be displayed.

Further, at least one of the plurality of computers may be an information displaying computer, the managing computer may be provided with a display information transmitting system that transmits the display information output by the display information outputting system as a file to the information displaying computer, and the information displaying computer may include a transmission requesting system that requests the managing computer to transmit the display information, and an information displaying system that outputs the display information transmitted from the managing computer in response to a request by the transmission requesting system to a display device provided to the information displaying computer.

Furthermore, the information displaying computer may be implemented with a web browser that functions as the transmission requesting system and the information displaying system, the information displaying computer requesting the managing computer to transmit the display information, the information displaying device transmitting the display information transmitted from the managing computer in response to the request to the display device provided to the information displaying computer using the web browser.

Still optionally, the managed computer may include a primary obtaining schedule setting system that sets a schedule for the managed computer to obtain the imaging device information from the imaging device, the primary imaging device information obtaining system obtaining the imaging device information in accordance with a first schedule set by the primary obtaining schedule. The managing computer may include a secondary obtaining schedule setting system that sets a schedule for the managing computer to obtain the imaging device information from the managed computer, the imaging device information secondary obtaining schedule setting system may obtain the imaging device information from the managed computer in accordance with the second schedule set by the secondary obtaining schedule setting system, and the primary obtaining schedule setting system and the secondary obtaining schedule setting system may be configured to set different schedules having different timings as the first and second schedules, respectively.

According to another aspect of the invention, there is provided an imaging device information management system including a plurality of computers interconnected through a network, at least one of the plurality of computers being a managing computer, at least one of the plurality of computers being a managed computer, at least one imaging device being connected to the managed computer. The managed computer may include a primary imaging device information obtaining system that obtains imaging device information from the imaging device. The managing computer may include a reply requesting system that requests a node in the network to transmit a reply, a computer information obtaining system that detects the managed computer based on the reply to the request, and obtains the computer information from the managed computer, a secondary imaging device information obtaining system that requests the managed computer to transmit the imaging device information obtained by the primary imaging device information obtaining system, and receives the imaging device information, which is transmitted by the managed computer in reply to the request, and an information storing system that creates information regarding the imaging device based on the imaging device information obtained by the secondary imaging device information, and stores the information in a storage area.

Further, the information storing system may create correspondence information representing the correspondence between the managed computer and the imaging device, based on the computer information obtained by the computer information obtaining system and the secondary imaging device obtaining system.

Furthermore, the computer information may include one of name and network address of the managed computer. The imaging device information may include one of the name and network address of the managed computer to which the imaging device is locally connected, and the correspondence information may be information indicating that the imaging device information obtained by the computer information obtaining system corresponds to the imaging device information obtained by the secondary imaging device information obtaining system, one of the computer name and the network address included in the computer information being the same as one of the computer name and the network address included in the imaging device information obtained by the secondary imaging device information obtaining system.

Further optionally, the managing computer may be provided with a display information creating system that creates display information including correspondence between the managed computer and the imaging device based on the correspondence information stored in the storage by the storing system.

In a particular case, the managing computer may be provided with a display information outputting system that outputs the display information created by the display information creating system as a displayable file.

Optionally, at least one of the plurality of computers may be an information display computer, and the managing computer may be provided with a display information transmitting system that transmits the display information which was output as a file by the display information outputting system. Further, the information display computer may be provided with a transmission requesting system that requests the managing computer to transmit the display information, and an information displaying system that displays the display information transmitted from the managing computer, in response to the request from the transmission requesting system, on a display device provided to the information display computer.

According to a furthermore aspect of the invention, there is provided an imaging device information management system including a plurality of computers interconnected through a network, at least one of the plurality of computers being a managing computer, at least one of the plurality of computers being a managed computer, at least one imaging device being connected to the managed computer. The managed computer may include a primary imaging device information obtaining system that obtains imaging device information from the imaging device in accordance with a first schedule, the obtained imaging device information being stored in a non-volatile storage, and a imaging device information transmitting system that retrieves the imaging device information from the non-volatile storage and transmits the retrieved information to the managing computer when a request for transmission of the imaging device information is received from the managing computer. While the managing computer may include a secondary imaging device information obtaining system that request the managed computer to transmit the imaging device information and obtains the imaging device information transmitted from the managed computer in accordance with a second schedule, and an information storing system that creates information related to the imaging device based on the imaging device information obtained by the secondary imaging device information obtaining system, and stores the information in a storage area.

Optionally, the managing computer may be provided with a computer information obtaining system the obtains the computer information from the managed computer.

Further optionally, the information storing system may create correspondence information indicating correspondence between the managed computer and the imaging device based on the computer information obtained by the computer information obtaining system and the imaging device information obtained by the secondary imaging device information obtaining system.

Furthermore, the managing computer may be provided with a display information creating system that creates display information including correspondence between the managed computer and the imaging device based on the correspondence information stored in the storage by the storing system.

In a particular case, the managing computer may be provided with a display information outputting system that outputs the display information created by the display information creating system as a displayable file.

Further optionally, at least one of the plurality of computers may be an information display computer, and the managing computer may be provided with a display information transmitting system that transmits the display information which was output as a file by the display information outputting system. Further, the information display computer may be provided with a transmission requesting system that requests the managing computer to transmit the display information, and an information displaying system that displays the display information transmitted from the managing computer, in response to the request from the transmission requesting system, on a display device provided to the information display computer.

In a particular case, the imaging device information management system may further include a browser which functions as the transmission requesting system and the information displaying system, the imaging device information management system requesting the managing computer to transmit the display information using the web browser, the display information transmitted from the managing computer in response to the request being displayed on a display device of the information display computer.

According to another aspect of the invention, there is provided a computer connected with an imaging device, which computer is provided with a computer information obtaining system that obtains computer information related to the computer, an imaging device information obtaining system that obtains imaging device information related to the imaging device, an e-mail message creating system that creates an e-mail message including correspondence information indicative of correspondence between the computer and the imaging device based on the computer information obtained by the computer information system and the imaging device information obtained by the imaging device information obtaining system, and a transmission system that transmits the e-mail message created by the e-mail message creating system to a destination.

According to a further aspect of the invention, there is provided an information transmitting system including a computer connected with an imaging device. The computer may include a computer information obtaining system that obtains computer information related to the computer, an imaging device information obtaining system that obtains imaging device information related to the imaging device, an e-mail message creating system that creates an e-mail message including correspondence information indicative of correspondence between the computer and the imaging device based on the computer information obtained by the computer information system and the imaging device information obtained by the imaging device information obtaining system, and a transmission system that transmits the e-mail message created by the e-mail message creating system to a destination.

BRIEF DESCRIPTION OF THE ACCOMPANYING DRAWINGS

FIG. 1 schematically shows a configuration of an imaging device information management system;

FIG. 2 shows a top page shown on a browser;

FIG. 3 shows a log setting page shown on the browser;

FIG. 4 shows a log display page shown on the browser;

FIG. 23 shows an example of printer information;

FIG. 24 shows an example of PC information;

Figure 28:
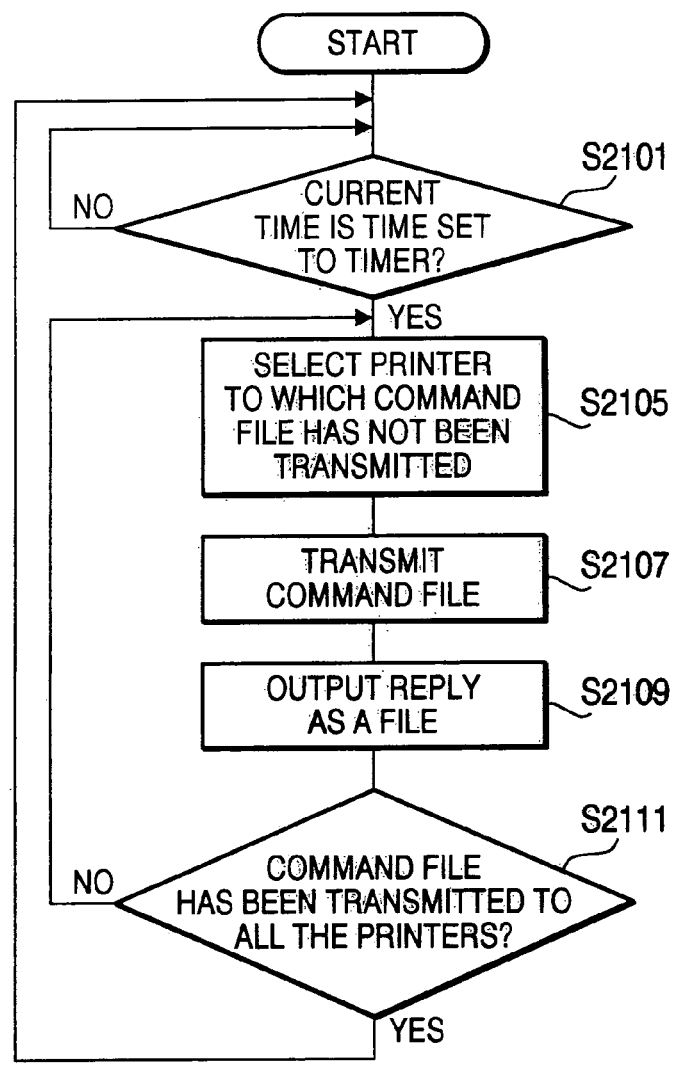
Figure 30:
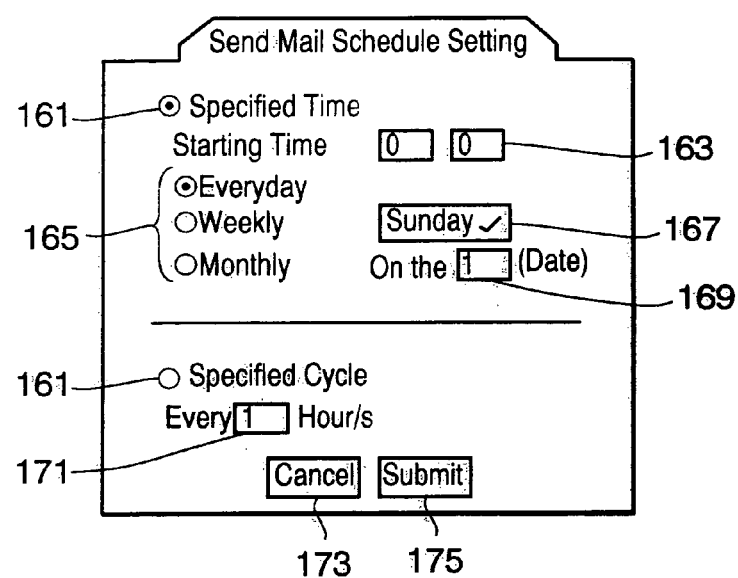
Figure 31:
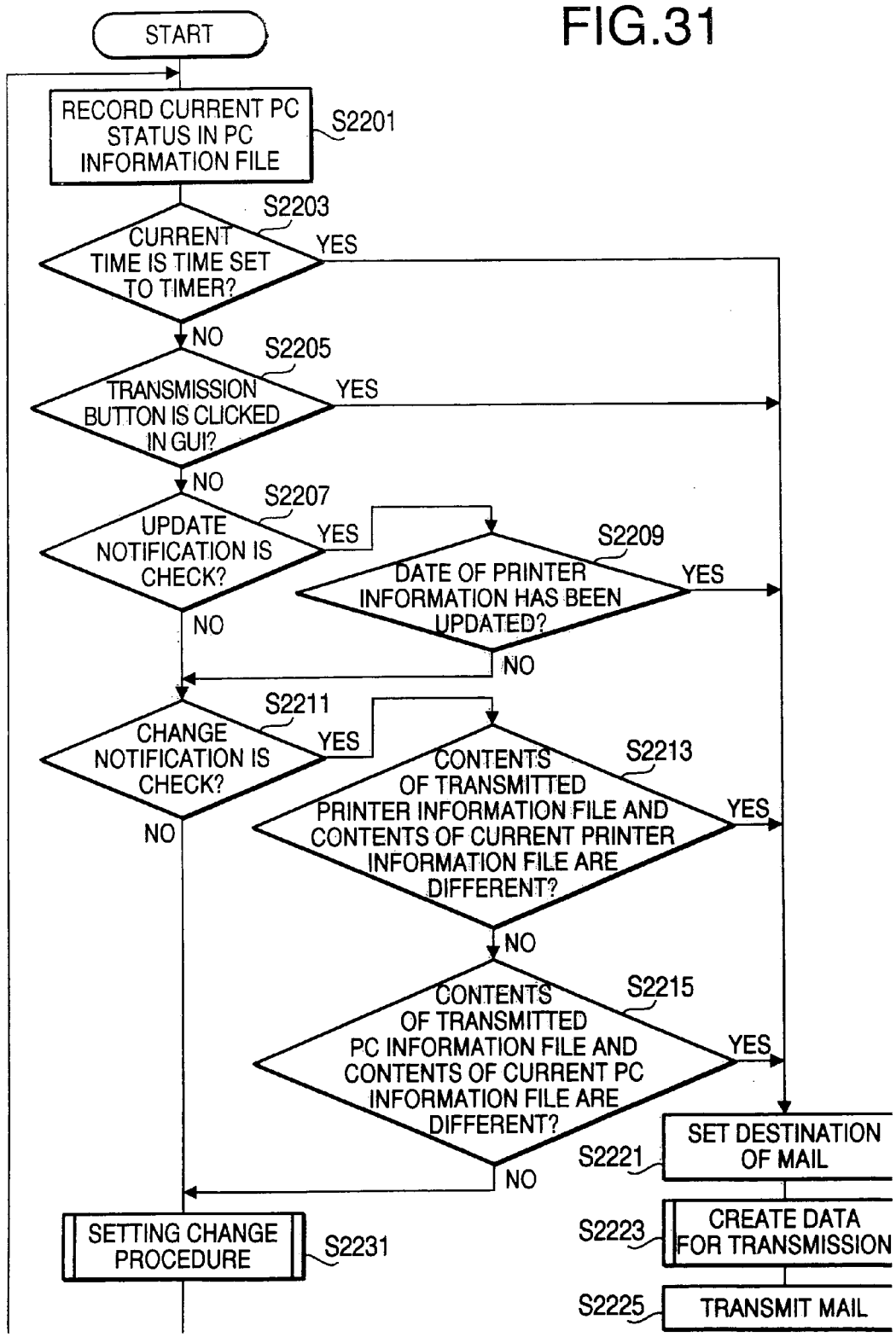
Figure 32:
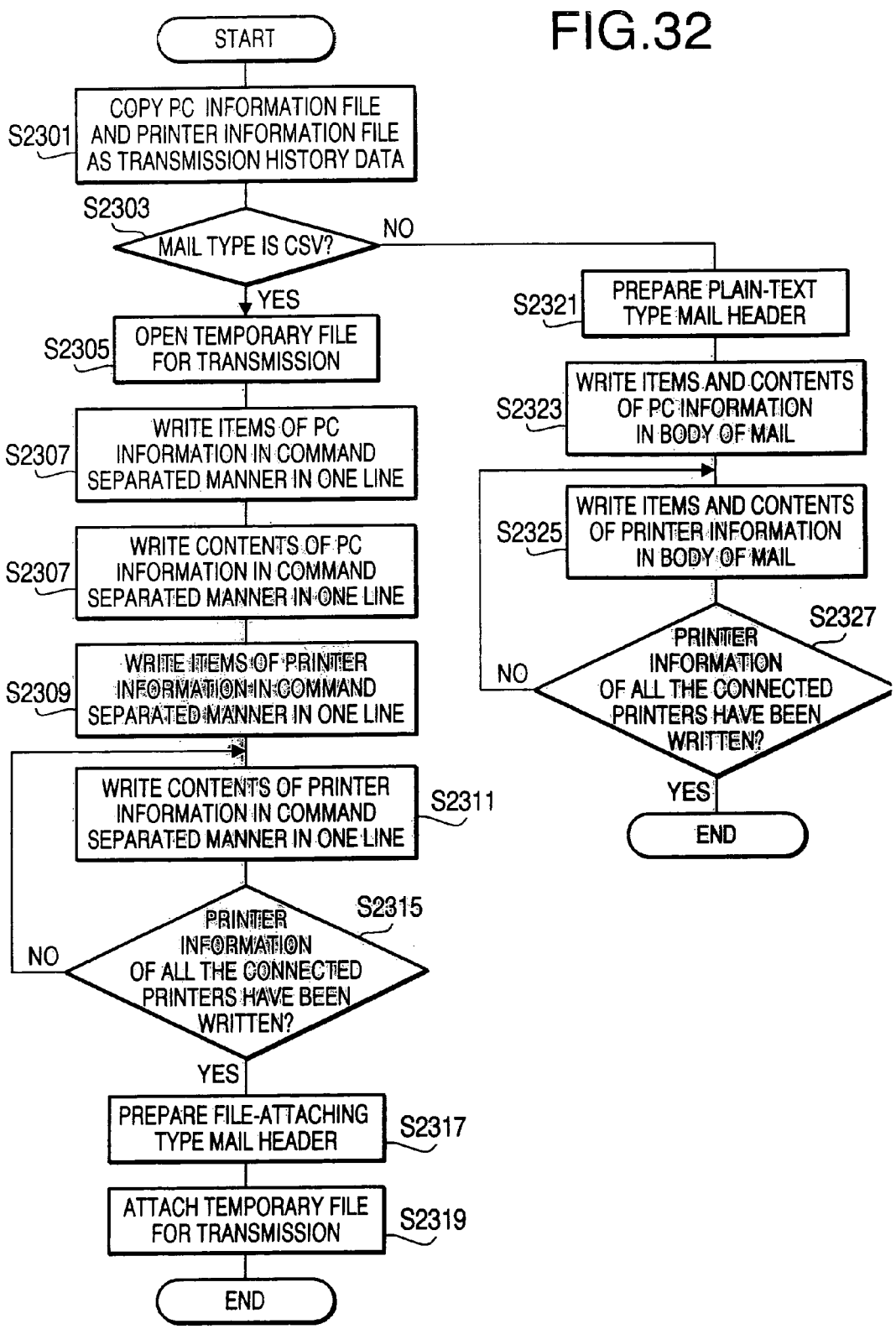
Figure 35:
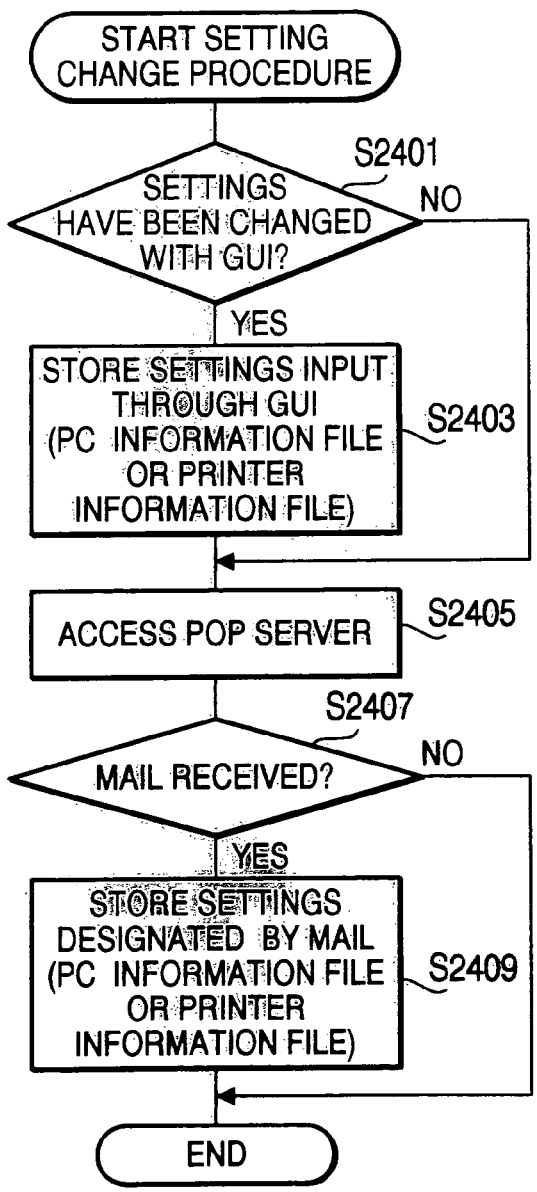
Figure 36:
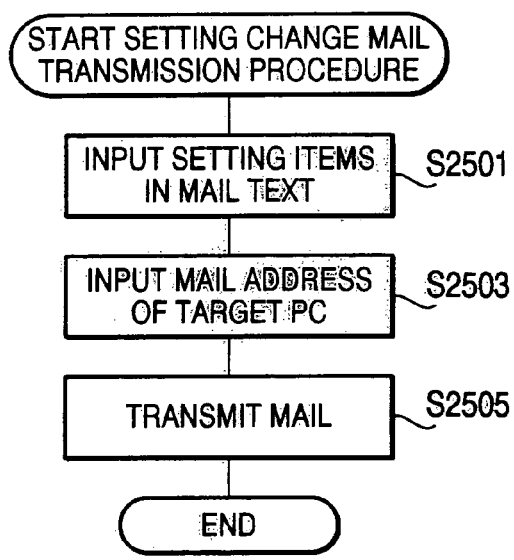
Figure 38A:
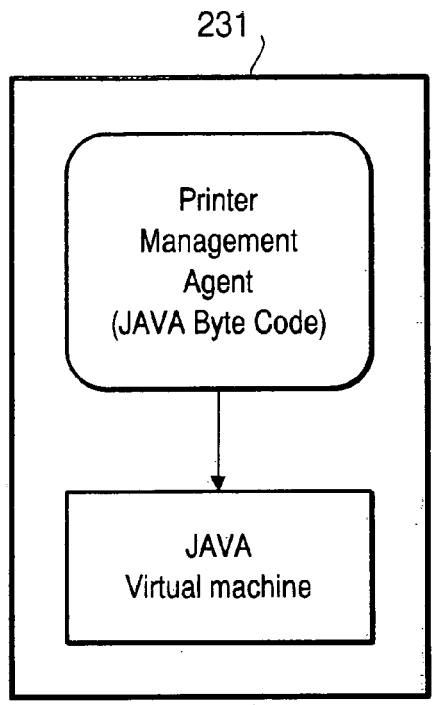
Figure 38B:
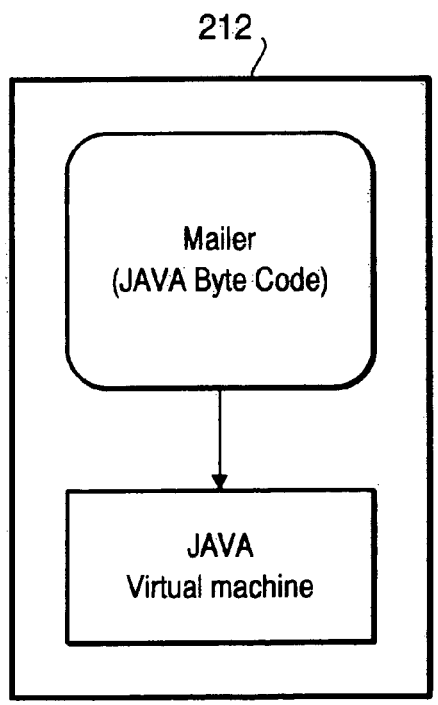

FIG. 26 schematically shows contents of a printer information file according to the second embodiment;

FIG. 27 schematically shows contents of a PC information file;

FIG. 28 is a flowchart illustrating a printer investigating procedure;

FIG. 29 shows a setting image for the mail transmission;

FIG. 30 shows a schedule setting image for the mail transmission;

FIG. 31 is a flowchart illustrating an information transmitting procedure of a mailer;

FIG. 32 is a flowchart illustrating a transmission data creating procedure;

FIG. 33A shows an example of a body of an e-mail message;

FIG. 33B shows an example of an attached file of the e-mail message;

FIG. 34 shows an example of a body of an e-mail message containing the PC and printer information;

FIG. 35 is a flowchart illustrating a setting change procedure;

FIG. 36 is a flowchart illustrating a setting change mail transmission procedure;

FIG. 37 is an example of the setting change mail;

FIGS. 38A and 38B show a printer management agent and a mailer realized by JAVA virtual machines; and FIG. 39 shows an example of a screen image showing both the network printer information and the local printer information according to a modification of the embodiments.

DETAILED DESCRIPTION OF THE EMBODIMENTS

Referring to accompanying drawings, imaging device information managements systems according to embodiments of the invention will be described.

Figure 1:
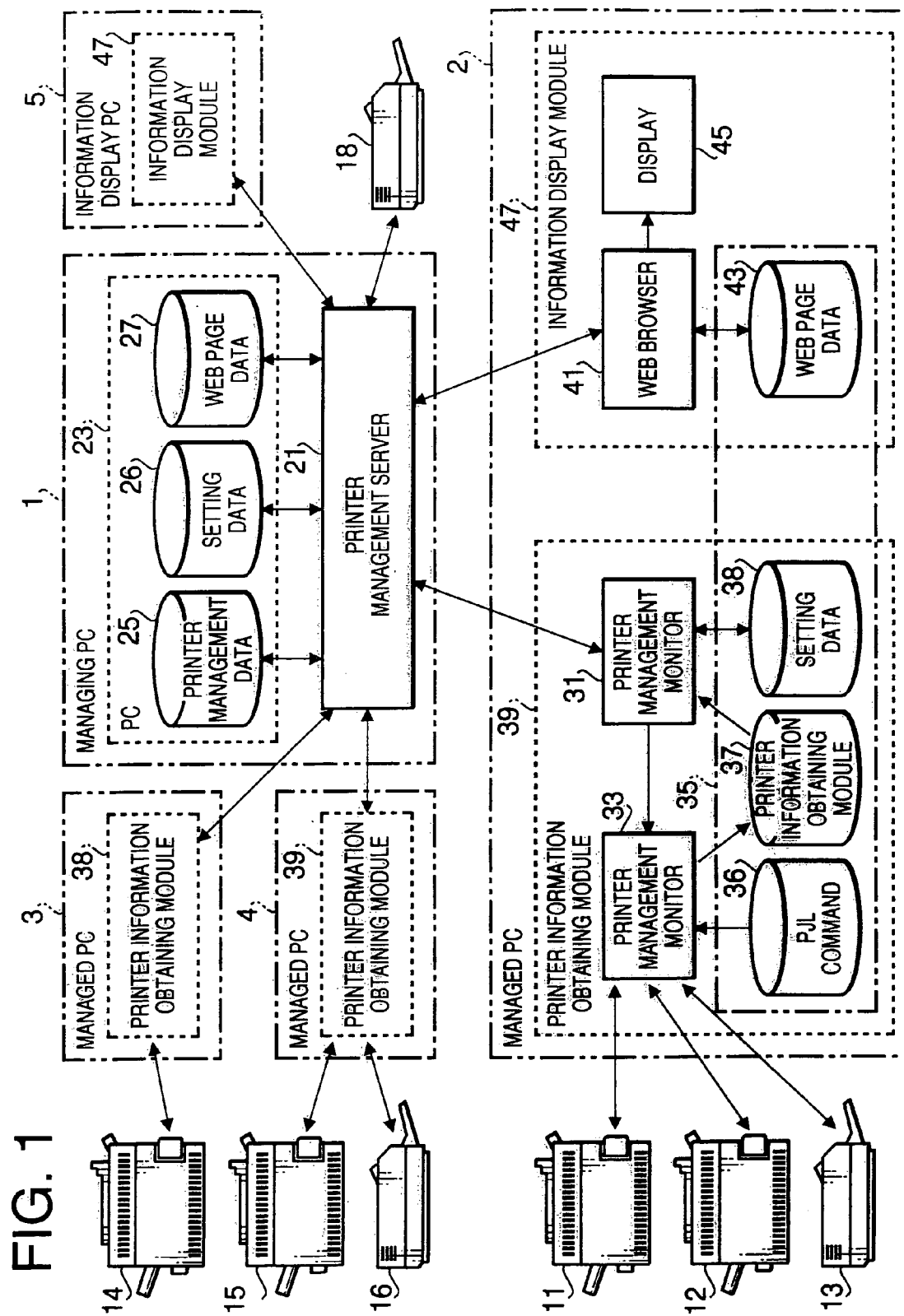

FIG. 1 schematically shows a configuration of an imaging device information management system (hereinafter, simply referred to as the information management system) 1000 according to a first embodiment of the invention.

The information management system 1000 includes a plurality of personal computers (hereinafter referred to as PCs) 1-5 and a plurality of printers 11-16 locally connected to one PCs 2-4. The PCs 1-5 are interconnected through a LAN (Local Area Network).

Each of the PCs 1-5 is, as is well known, provided with a control unit having a CPU (Central Processing Unit), a ROM (Read Only Memory) and a RAM (Random Access Memory), an input unit having a keyboard and pointing device, an output unit having a display, and an auxiliary storage unit having a non-volatile data storage such as a hard disk.

The PCs 1-5 are implemented with Windows®, Linux® or MacOS® as an OS (Operating System). A basic functions such as an input function using the keyboard, an output function using the display, a management of a memory (i.e., a main memory unit) and a management of the hard disk (i.e., the auxiliary data storage) are provided by the OS. Since various functions provide by the OS area well known, description thereof is omitted herein. For the purpose of brevity, the following description will be provided on assumption that each of the PCs 1-5 is implemented with Windows® as its OS.

According to the embodiment, each of the printers 11-16 is compliant with a PJL (Printer Job Language) which has been developed by Hewlett-Packard, Co. and is now widely used. The technical manual of the PJL can be found at http://www.lprng.com/DISTRIB/RESOURCES/DOCS/pjltkref.pdf.

Specifically, the printers 11 and 12 are locally connected to USB (universal serial bus) ports of the PC 2, the printer 13 is locally connected to a parallel port of the PC 3, the printer 14 is locally connected to a USB port of the PC 3, and the printers 15 and 16 are locally connected to USB ports of the PC 4.

In the information management system 1000 configured as above, the PC 1 is configured to function as a managing computer, which is capable of obtaining information of the PCs 2-4 (such information will be referred to as PC information hereinafter), information (hereinafter referred to as printer information) of the printers 11-16 locally connected to the PCs 2-4 through a network (i.e., the LAN), and manage the thus obtained information (i.e., the PC information and the printer information).

The PCs 2-4 function as managed computers, which provide the PC information and printer information to the managing PC 1 through the network. Further to the above, the PCs 2 and 5 are configured to function as information displaying computers, which receives display information from the managing PC 1 and displays the same.

In the following description, in order to clarify the functions of the PCs 1-5, respectively, they are referred to as the managing PC 1, managed PCs 2-4 and display PC 5. As described above, the managed PC 2 also functions as the display PC. However, for the sake of brevity, the PC 2 will be described as the managed PC.

As shown in FIG. 1, the managing PC 1 is implemented with a printer management server 21 as one of application programs. The printer management server 21 is a program module that executes an operation of obtaining the PC information and the printer information from the managed PCs 2-4, storing the obtained information in a hard disk drive (hereinafter referred to as HDD) 23 of the managing PC 1 and managing the stored information, and an operation of creating the display information based on the PC information and printer information stored in the HDD 23, and outputs the display information as a web page data file 27, which is stored in the HDD 23.

It should be noted that a timing at which the printer managing server 21 obtains the PC information and printer information from the PCs 2-4, setting data defining operational condition of the printer management server 21 are contained in a setting data file 26 stored in the HDD 23.

The printer management server 21 has GUI (Graphical User Interface) consisting of a plurality of images (e.g., images shown in FIGS. 2-7). The images for displaying the above-described display information and input screens for inputting various settings for the printer management server 21 are configured as a web page data file 27. The web page data file 27 is provided, by use of a web page server function of the printer management server 21, to the managed PC 2 and/or the display PC 5, and displayed thereby.

By running the printer management server 21 on the managing PC 2, the managing PC 1 functions as the managing computer.

The managed PC 2 is installed with a printer management agent 31, which is one of application programs, and a printer management monitor 33 which is also one of the application programs.

The print management monitor 33 is a program module that retrieves a PJL command from a PJL command file 36 stored in an HDD 33, provides the retrieved PJL command to the printer 11-13, obtains the printer information from the printers 11-13, and stores the printer information in a printer data file 37. The printer management agent 31 is a program module that retrieves the printer information which has been stored in the printer data file 37 by the printer management monitor 33, and transmits the retrieved printer information to the managing PC 1. The setting data that defines the operational condition of the printer management agent 31 and the printer management monitor 33 is contained in a setting data file 38, which is stored in the HDD 35.

The printer management agent 31 and the printer management monitor 33 are main elements of a printer data obtaining module 39. By operating the printer management agent 31 and the printer management monitor 39 on the managed PC 2, the PC 2 functions as the managed computer.

It should be noted that, in each of the managed PCs 3 and 4, the similar printer data obtaining module 39 is provided, and the managed PCs 3 and 4 function as managed computers.

In the managed PC 2, a web browser 41, which is one of the application programs, is installed.

The web browser 41 is a program module that receives the display information transmitted from the managing PC 2, stores the received display information in the HDD as a web page data file 43, and retrieves the web page data file 43 from the HDD 33 and displays an image of the display information on a display 45 of the managed PC 2.

The web browser 41 is a main element of an information display module 47. By operating the web browser 41 on the managed PC 2, the managed PC 2 function as a information display computer.

It should be noted that the information display PC 5 is also provided with the information display module 47 similar to that of the managed PC 2, so that the PC 5 functions as the information display computer.

As understood from the above, the managed computer and the information display computer can be implemented in a single computer as the managed PC 2, in different computers as the managed PCs 3 and 4, and the information display PC 5.

The managed PC 2 (and the information display PC 5) provided with the information display module 47 functions as an operation terminal using the GUI of the printer management server 21 implemented in the managing PC 1. That is, a user who intends to use the GUI of the printer management module 21 can operate the managed PC 2 to display the GUI of the printer management server 21 on the screen of the web browser 41 by inputting a URL (Uniform Resource Locators) of a top page (shown in FIG. 2) from among the GUIs of the printer management server 21, i.e., the web pages (shown in FIGS. 2-7) using the web browser 41, and then following the links therein.

Firstly, the user input the URL of the top page to display the top page (see FIG. 2) on the screen. It should be noted that the printer management server 21 directly communicates with a network printer (e.g., the network printer 18 shown in FIG. 1) beside the managed PCs (e.g., managed PCs 2-4) to obtain the printer information, and mange the same. As shown in FIG. 2, on the top page, the printer information of the network printer is displayed.

When the top page is displayed, the user can click a "Log" button 49 displayed on the top page (at lower right position in the example shown in FIG. 2). Specifically, the user points the "Log" button 49 with a cursor by operating the pointing device, and depresses the button of the pointing device. Such an operation will be occasionally referred to, in the following description, as to "depress a button" or "click a button". By clicking the "Log" button 49, the user can follow the link to a log setting page shown in FIG. 3, and the log setting page is displayed on the screen. In the log setting page, the user can set a schedule for the printer management server 21 to obtain the printer information from the managed PCs 2-4, and set the output format of the printer information, which will be described in detail later.

Figure 5:
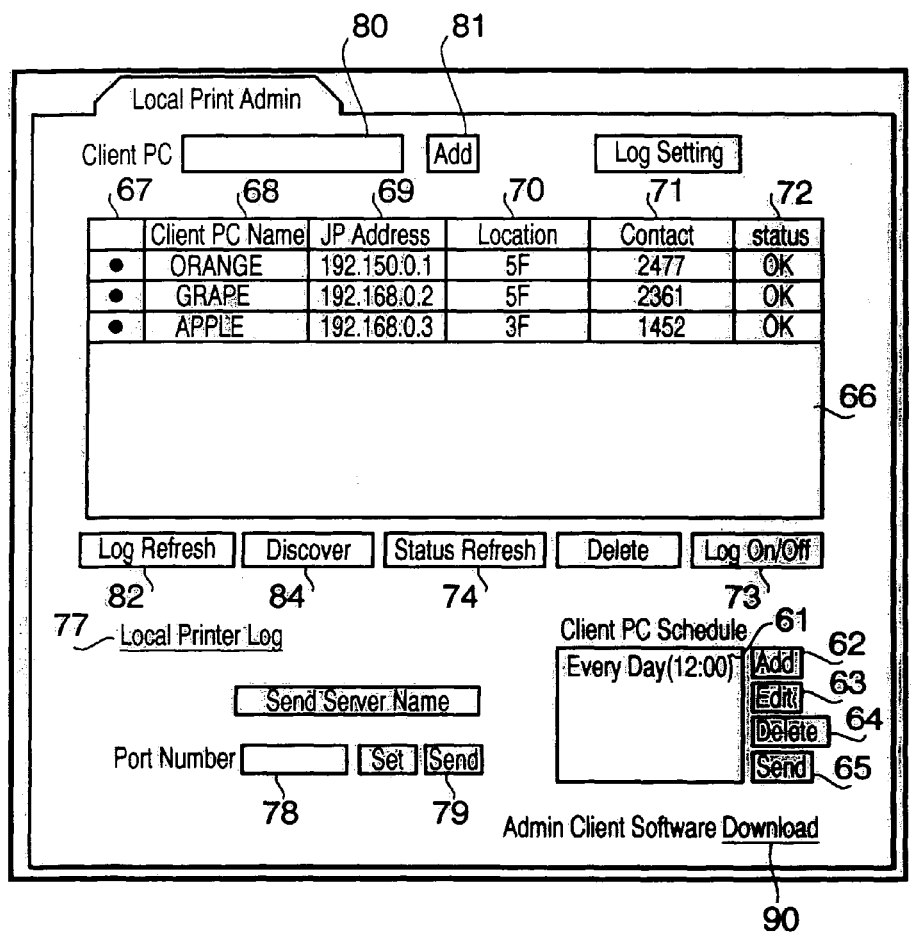
FIG. 5 shows a PC information display page shown on the browser.

Next, by depressing a "LocalPrintAdmin" button 50 in the log setting page (shown in FIG. 3), the user can follow a link to a PC information display page, which is shown in FIG. 5, and the PC information display page appears on the screen. In the PC information display page, the user can check a list of the managed PCs, and setting of the schedule of obtaining the printer information from individual managed PCs.

By clicking a character string of "Local Printer Log" 76 shown in FIG. 3, or a character string of "Local Printer Log" 77 shown in the PC information display page shown in FIG. 5, the user can follow a link to the log display page shown in FIG. 4. The user can confirm the printer information by viewing the log display page (FIG. 4).

As above, the user can display the GUI of the printer management server 21 on the screen of the web browser 41. With the above configuration, the user can confirm the information of the network printer and the printer information of the locally connected printers, which are connected to the managed PCs, separately. Further, the user follow the links to either of the page for the network printers or the page for the local printers from the same top page.

It is of course possible, when the user does not need the printer information of the network printers, to display necessary page directly by inputting the URL of the log setting page shown in FIG. 3 or the PC information display page directly. Alternatively or optionally, the top page of the printer management server 21 may include the contents corresponding to the log setting page.

Upon operation of the user through the managed PC 2 (or the information display PC 5) using the GUI, the information is transmitted to the managing PC 1 through the network, and operation according to the transmitted information is executed by the printer server 21, on the managing PC 1.

Figure 8:
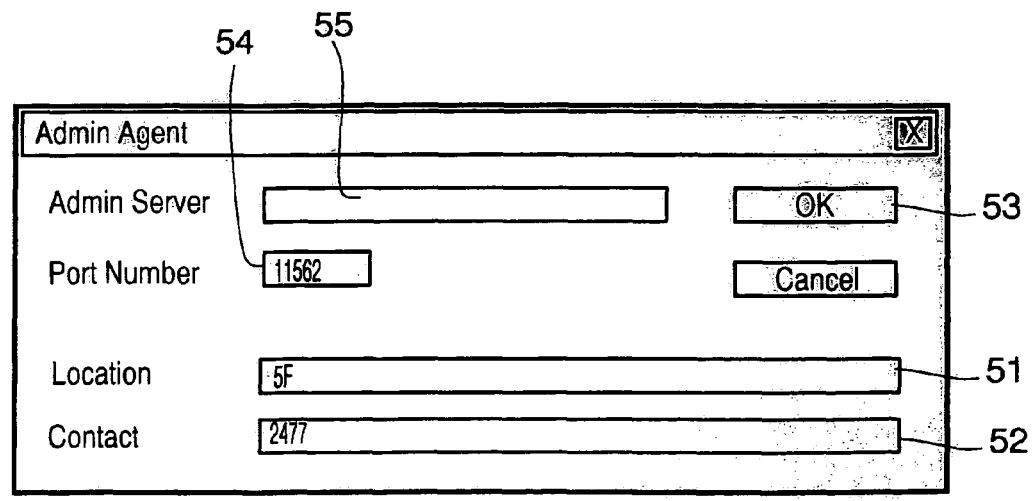
FIG. 8 shows a printer management agent setting dialog shown on the browser.

The printer management agent 31 also has a GUI for inputting various information (see FIG. 8). The image shown in FIG. 8 is displayed on the display provided to the managed PCs 2-4, on which the printer management agent 31 operates.

Next, the operation of the information management system 1000 will be described in detail.

First, a procedure executed by the printer management monitor 33 which is executed on the managed PCs 2-4 will be described with reference to FIG. 9.

Figure 9:
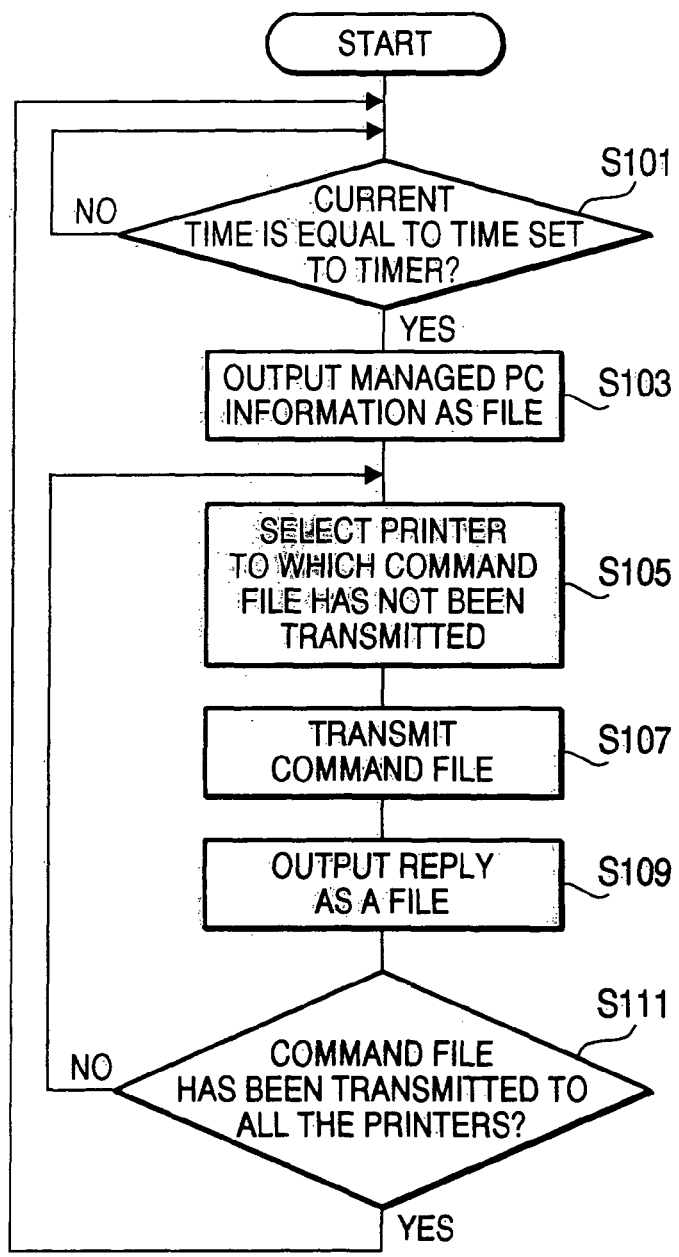
FIG. 9 is a flowchart illustrating an operation of a printer management monitor.

FIG. 9 is a flowchart illustrating the procedure executed by the printer management monitor 33. The operation shown in FIG. 9 is initiated on each of the managed PCs 2-4, when they are powered ON. Thereafter, the procedure is kept repeated until the managed PCs 2-4 are powered OFF. In the following description, it is described that the process is executed in the managed PC 2. The same procedure is executed in each of the managed PCs 3 and 4.

When the procedure shown in FIG. 9 is started, the managed PC 2 awaits until a time point set to the timer (S101: NO). When the current time is equal to the time point set to the timer (S101: YES), process outputs the information of the managed PC 2, which is a part of the printer information, as a file (i.e., the printer data file 37) in S103.

Items of the information output in S103 include "IP address", "PC name", "Number of Printers", "Version", and "Date & Time". The "IP address" is a logical network address assigned to the managed PC 2, "PC name" represents a name assigned to the managed PC 2, "Number of Printers" represents the total number of the printers locally connected to the managed PC 2, "Version" represent a version number of the printer management monitor 33 running on the managed PC 2 and "Date & Time" represent the date and time when the managed PC 2 obtains the printer information from the locally connected printers (i.e., the date and time when the current procedure is executed).

Next, process selects, from among the locally connected printers 11-13, to which a command file has not been transmitted (S105), and transmits a PJL command retrieved from the PJL command file 36 (S107). Then, process receives (read back) the reply from the printer, and save the same, which is a part of the printer information, in the file (i.e., printer data file 37).

Items output in S109 include "Printer No.", "Printer Name", "Port Name", "ROMVers", "Ser. No.", "Drum Life" and "Page count". "Printer No." represents a serial number assigned to the locally connected printers 11-13, "Printer Name" represents a device name of each of the locally connected printers 11-13, "Port Name" represents the I/O ports to which the printers 11-13 are connected, "ROM Vers" represent version numbers of the ROMs provided to the printers 11-13, "Ser. No." represents serial numbers of the printers 11-13, "Drum Life" represent the remaining usage counts of the drums provided to the printers 11-13, and "Page count" represent the numbers of sheets consumed in the printers 11-13.

It should be noted that, in the PJL command file 36, a plurality of PJL commands are written, all of which are provide to each of the printers 11-13. However, depending on the type of the printer, reply man not be made for some of the PJL commands. That is, some printers may not transmits corresponding replies to some PJL commands. Therefore, the contents of the printer information may vary depending on the type of the printers. In other words, items corresponding to the PJL commands, which are written in the PJL command file 36 and to which the printer can reply, are output as the printer information from each printer.

Steps S105-S109 are repeated for all the printers 11-13. When the command file has not been transmitted to all the printers 11-13 (S111: NO), process returns to S105 and steps S105-S109 are executed for the next printer. When the command file has been transmitted to all the printers 11-13 (S111: YES), process returns to S101, and waits until the time point set to the timer.

With the procedure described above, the printer information including the information of all the printers 11-13 and the managed PC 2 is stored in the printer data file 37 of the managed PC 2 substantially periodically. FIG. 23 shows an example of the printer information, which is output as text data.

Next, a procedure executed by the printer management agent 31 of the managed PCs 2-4 will be described referring to FIG. 10. The procedure is initiated in each of the managed PCs 2-4 when powered ON, and repeatedly executed until powered OFF. In the description below, the procedure executed in the managed PC 2 will be explained, although the same procedure is executed in each of the managed PCs 3 and 4.

Figure 10:
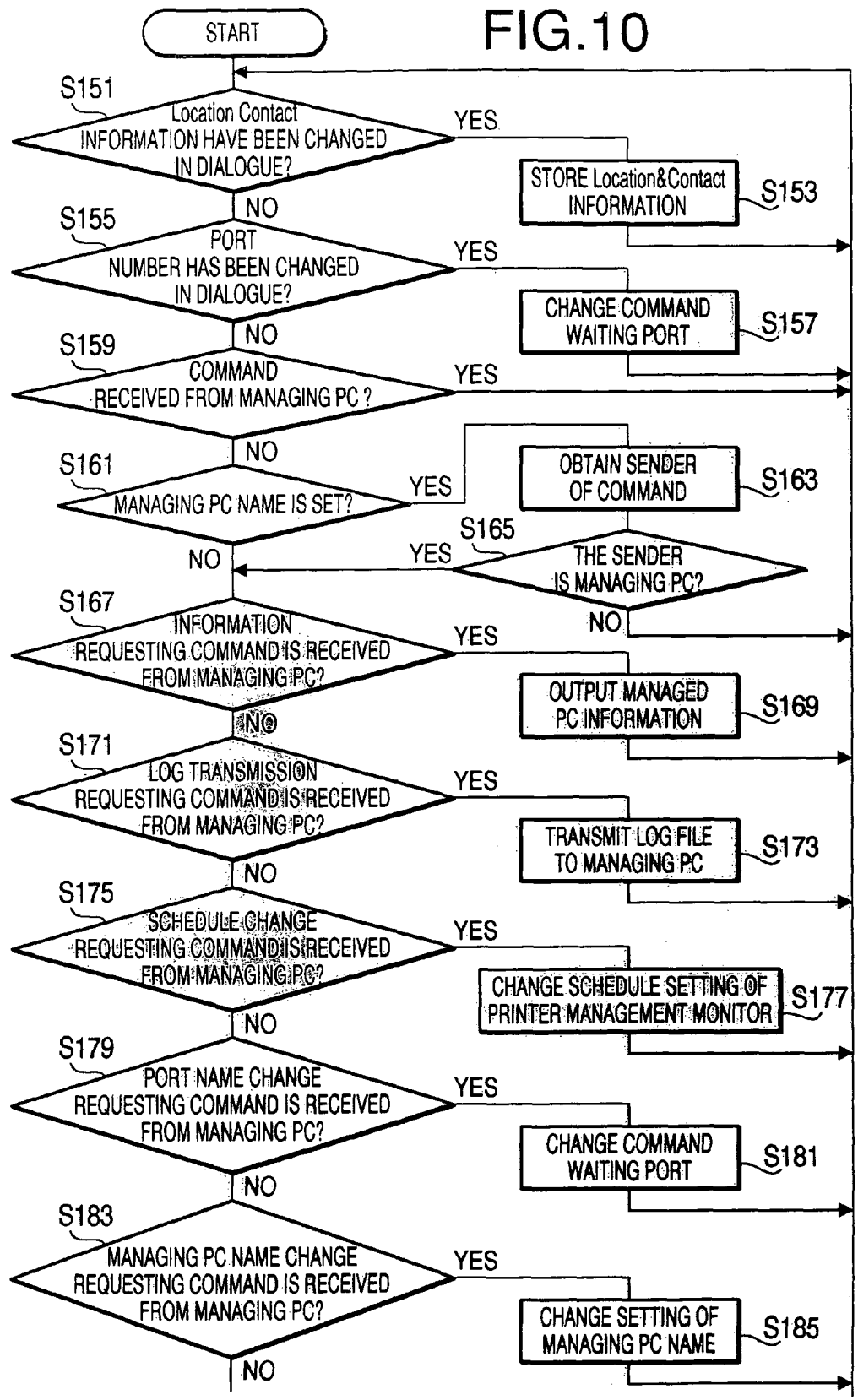
FIG. 10 is a flowchart illustrating an operation of a printer management agent.

When the procedure shown in FIG. 10 is initiated, the managed PC 2 determines whether Location information and Contact information have been changed in a printer management agent setting dialogue shown in FIG. 8 (S151). The Location information is a character string representing a location of the managed PC 2 (in the embodiment, a floor of a building), and the Contact information is a characters string representing user information (in the embodiment, a telephone extension number). In the printer management agent setting dialogue, a "Location" box 51, a "Contact" box 52 are provided. When the user has input new Location information and/or new Contact information and clicked an OK button 53 provided in the dialogue, process determines in S151 that the Location and/or Contact information has been changed.

When the Location and/or Contact information has been changed (S151: YES), process stores the Location/Contact information (S153), and returns to S151. It should be noted that, in S153, the Location/Contact information is stored in the setting data file 38 of the managed PC 2.

When the Location and Contact information has not been changed (S151: NO), process checks whether the port number has been changed through the printer management agent setting dialogue (S1551). The port number is a number assigned to an I/O port which the managed PC 2 uses data communication with the managing PC 1. In the printer management agent setting dialogue shown in FIG. 8 has a "Port Number" box 54. When the user has input a new port number and clicked the OK button 53 in the dialogue, process determines in S153 that the port number has been changed.

When the port number has been changed (S155: YES), process changes the port number waiting for the command (S157), and returns to S151. After step S157 is executed, the data communication is execute through the I/O port of the new port number.

When the port number has not been changed (S155: NO), determines checks whether a command has been received from the managing PC 1 (S159). When no command has been received (S159: NO), process returns to S151.

When a command has been received (S159: YES), process determines whether a name of the acceptable managing PC, commands from which are to be accepted, is set (S161). The name of the acceptable managing PC is stored in the setting data file 38 of the managed PC 2. The name of the acceptable managing PC is set when there are a plurality of managing PCs on the network and commands transmitted from only a predetermined managing PC should be accepted.

Specifically, according to the first embodiment, there is only one managing PC 1 on the network shown in FIG. 1. However, the system 1000 is allowed to have a plurality of managing PCs. Therefore, depending on a system configuration, a plurality of managing PCs may simultaneously exist on the network, and each managed PC may receive commands from the plurality of managing PCs. If the managed PC is to respond to all the commands from the plurality of managing PCs, it is unnecessary to set the name of the acceptable managing PC. However, for some management reason, there maybe a case in which responses are made to the commands transmitted only from a predetermined managing PC. In such a case, the name of the acceptable managing PC is set.

Incidentally, the name of the acceptable managing PC can be set in the printer management agent setting dialogue shown in FIG. 8, by inputting the name of the PC in the "Auditor Server" box 55 and clicking the OK button 53. The name of the acceptable managing PC may also be set, as will be described in detail, from the managing PC by clicking a "Send Server Name" button 56 on a PC information display page shown in FIG. 5.

When the name of the acceptable managing PC has been set (S161: YES), process obtains an IP address of a sender of the command (S163), and determines whether the sender of the command is the managing PC 1 by comparing the IP addresses thereof (S165). When the sender is not the managing PC 1 (S165: NO), process returns to S151.

When the sender of the command is the managing PC 1 (S165: YES), process determines whether the command is the information requesting command (S167). When the information requesting command is received (S167: YES), process outputs the PC information of the managed PC 2 (S169), and returns to S151. Items of the PC information of the managed PC include "Client PC Name", "IP Address", "Location" and "Contact". Among these items, "Client PC Name" represents a device name assigned to each of the managed PCs 2-4 and "IP address" represents a numerical character string indicative of a logical address assigned to each of the managed PCs 2-4. Further, "Location" and "Contact" represent the aforementioned Location information and Contact information (the information stored in step S15). It should be noted that the PC information is output, for example, as text data shown in FIG. 24.

When the information requesting command has not been received (S167: NO), process determines whether a log transmission requesting command is received from the managing PC 1 (S171). When the log transmission requesting command is received (S171: YES), process transmits the log file (i.e., the printer data file 37: the printer information output in steps S103 and S109) to the managing PC 1 (S173), and returns to S151.

When the log transmission requesting command is not received (S171: NO), process determines whether a schedule change requesting command is received from the managing PC 1 (S175). When the schedule change requesting command is received (S175: YES), process changes the schedule setting of the printer management monitor 33 (S177), and returns to S151. When step S177 is executed, the changed schedule is stored in the setting data file 38, and in the procedure by printer management monitor 33, the time points at which the information is obtained from the printers 11-13 are changed.

When the schedule change requesting command is not received (S175: NO), process determines whether a port name change requesting command is received from the managing PC 1 (S179). When the port name change requesting command is received (S179: YES), process changes the port waiting for the command (S181), and returns to S151. When step S181 is executed, similarly to a case of S157, data communication with the managing PC is performed using the I/O port corresponding to the changed port number.

When the port name change requesting command is not received (S179: NO), process determines whether a managing PC name change requesting command is received from the managing PC 1 (S183). When the managing PC name change requesting command is received (S183: YES), process changes the setting of the name of the managing PC (S185), and returns to S151. In S185, the name of the acceptable managing PC, which is described in relation with step S161, is changed.

When the managing PC name change requesting command is not received (S183: NO), process returns to S151.

As above, by executing the above-described procedure, the managed PC 2 waits for a request from the managing PC 1, and when a request is received from the managing PC 1, operation corresponding to the request is performed.

Next, procedures of the printer management server, which are executed in the managing PC 1, will be described, referring to flowcharts shown in FIGS. 11-22.

Figure 11:
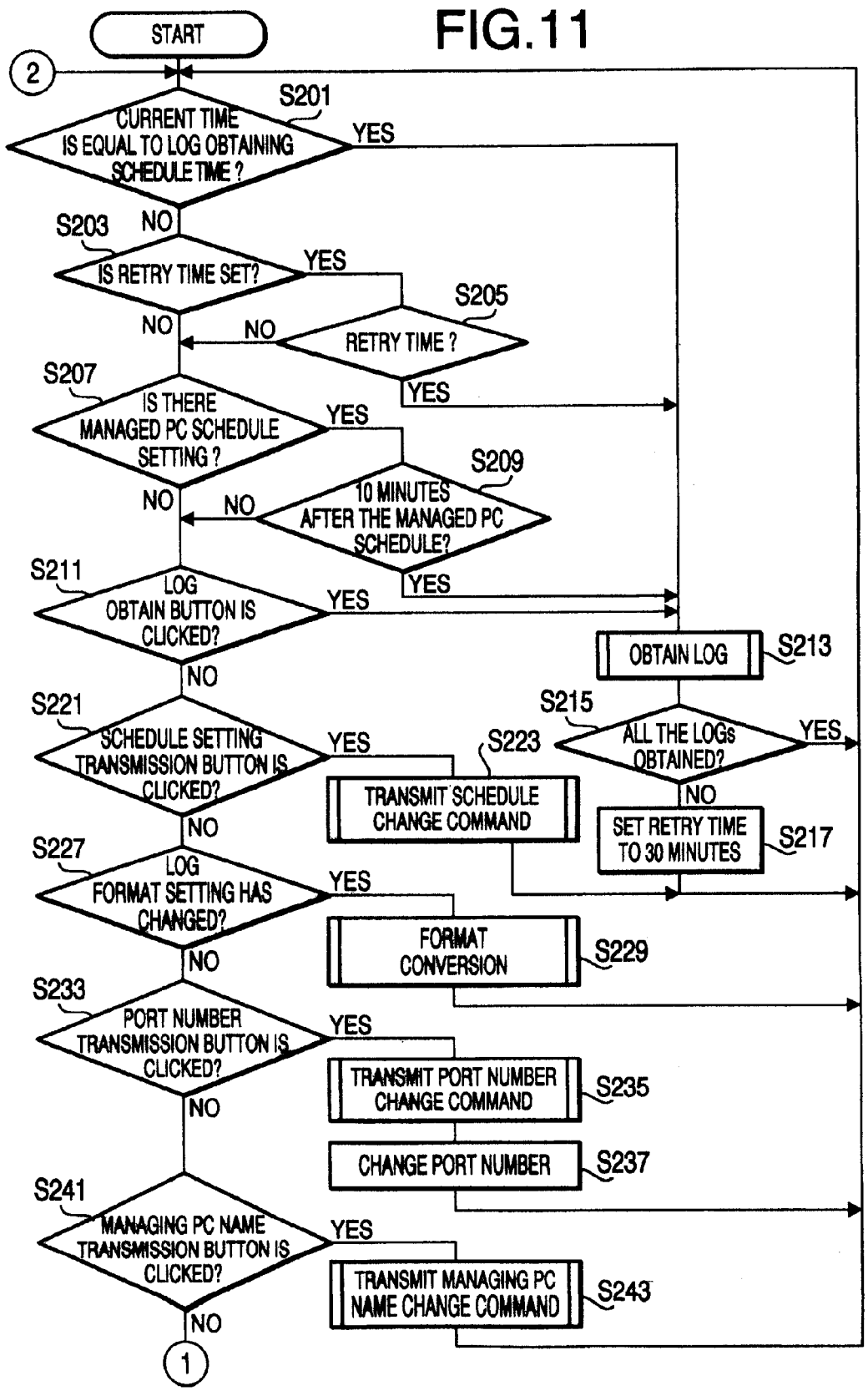
FIGS. 11 and 12 show a flowchart illustrating a main procedure executed by a printer management agent server.
Figure 12:
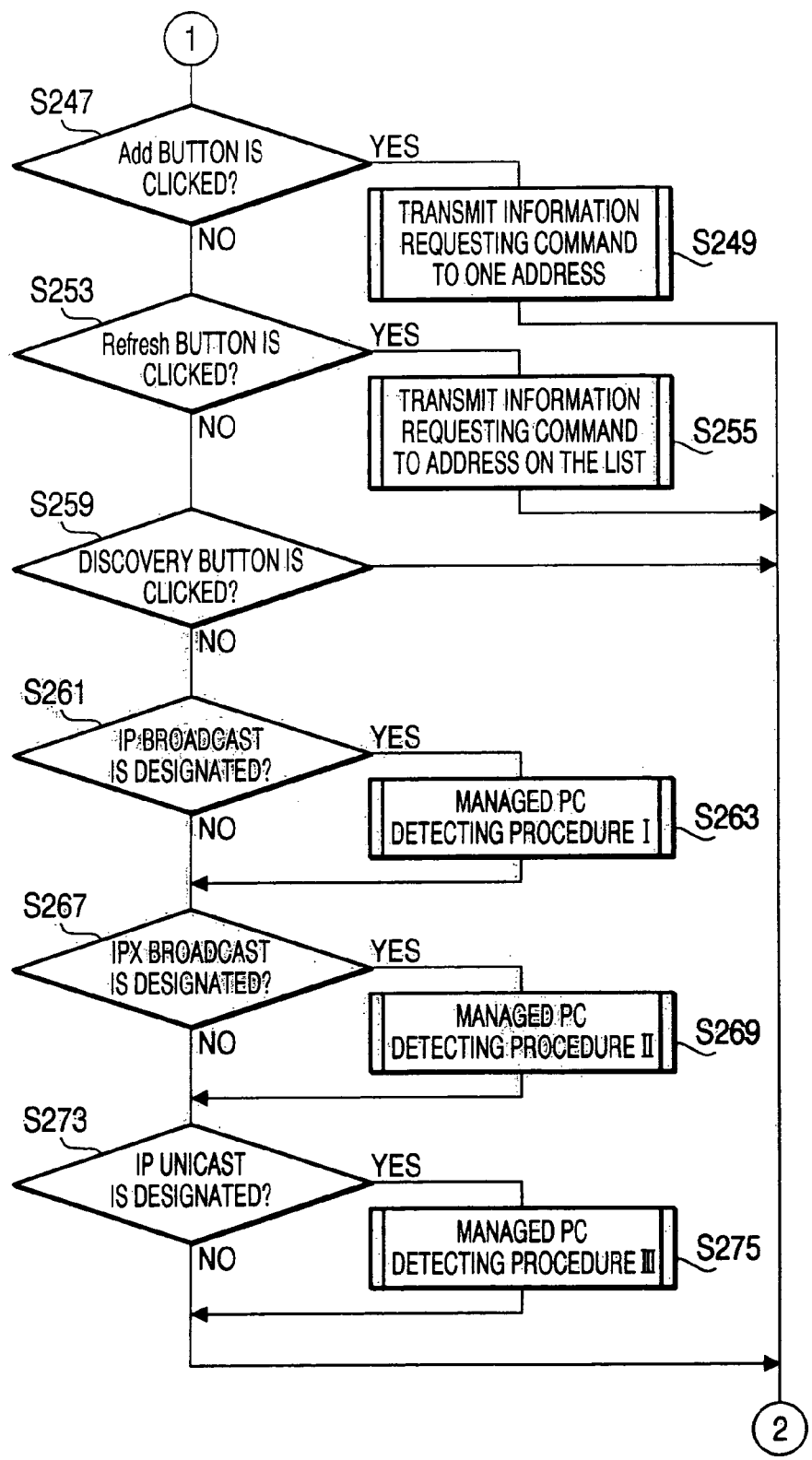

When a procedure shown in FIGS. 11 and 12 is initiated, the managing PC 1 executes a log obtaining procedure in S213 when: (1) the current time is a log obtaining schedule time (S201: YES); (2) there is a retry setting (S203: YES), and the current time is a retry set time (S205: YES); (3) there is a managed PC schedule setting (S207: YES) and 10 minutes have passed since the PC schedule setting time (S209: YES); or (4) a log obtaining button is clicked (S211: YES). Otherwise, process proceeds to S221.

The log obtaining schedule time (see S201) is a periodical schedule setting of time points having a day or more interval. The schedule setting is indicated in the "Schedule Setting" box 57 of the log setting page shown in FIG. 3. The date/time for the setting can be added by clicking the "Add" button 58 located close to the "Schedule Setting" box 57, can be changed by clicking the "Edit" button 59, and can be deleted by clicking the "Delete" button 60. The date/time is stored in the setting data file 26, and is managed using the timer provided to the managing PC 1.

The retry time (see S203) is the time set in S217. The retry time is also stored in the setting data file 26, and is managed using the timer of the managing PC 1.

The managed PC schedule (see S207) is a periodical schedule setting of time points having a day or more interval. The PC schedule is indicated in the "Client PC Schedule" box 61. The date/time for the setting can be added by clicking the "Add" button 62 located close to the "Client PC Schedule" box 61, can be changed by clicking the "Edit" button 63, can be deleted by clicking the "Delete" button 64, can be sent to the managed PCs 2-4 simultaneously by clicking the "Send" button 65 (which will be described in detail later). The setting of the date/time is stored in the setting data file 26.

Figure 7:
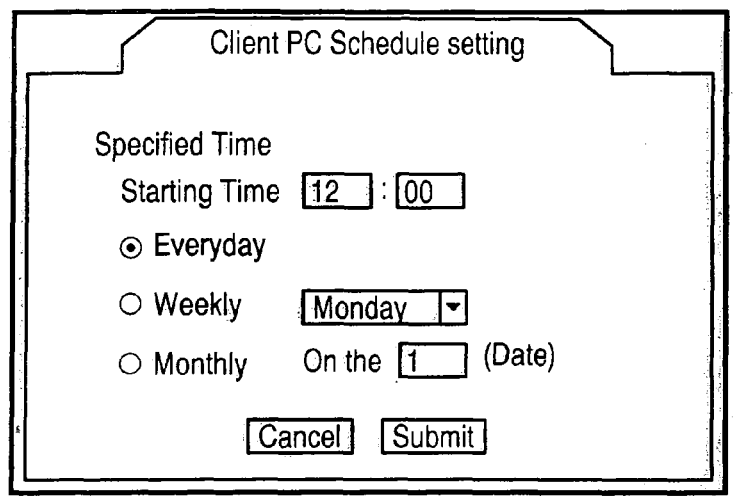
FIG. 7 shows a PC schedule setting page shown on the browser.

When the "Add" button 62 or "Edit" button 63 is clicked, a managed PC schedule setting page shown in FIG. 7 is displayed, and the user can input schedule setting such as everyday, once a week, once a month etc. Passage of ten minutes from the managed PC schedule is managed using the timer provided to the managing PC 1.

The log obtaining procedure in S213 will be described in detail with reference to FIG. 13.

When the log obtaining procedure is initiated, the managing PC 1 obtains, from the managed PC list, un-processed managed PC information (S301). The managed PC list is a list displayed in the managed PC list box 66 within the PC information display page shown in FIG. 5. All the managed PCs indicated in the managed PC list are subject to be processed in S301 one by one. The managed PC list 66 include ON/OFF mark box, "Client PC Name" box 68, "IP Address" box 69, "Location" box 70, "Contact" box 71 and "Status" box 72.

Next, with respect to a managed PC of which the information is received in S301, process determines whether a validation flag is ON (S303). The validation flag is a flag the user arbitrarily set to ON or OFF, and is referred to when the user selects a managed PC from which the user intends to obtain information, from among the managed PC displayed in the managed PC list box 66.

When the validation flag is ON, a black circle is indicated in the ON/OFF mark box 67 in the managed PC list box 5. When the validation flag is ON, the black circle is removed. ON/OFF status of the validation flag can be changed by selecting a managed PC by clicking the managed PC, and then, clicking the "Log ON/OFF" button 73 in the PC information display page shown in FIG. 5.

When the status of the managed PC subject to be processed is OK (S305: YES), process transmits a log requesting command to the address of the managed PC (S307). As a result, on the managed PC side, in S173, the log, which is the printer information is transmitted to the managing PC 1. The managing PC 1 adds the transmitted log to the file (S309), and process proceeds to S311.

In S311, process determines whether all the managed PCs are processed, and when there remain unprocessed managed PC(s) (S311: NO), process returns to S301. With this configuration, while the unprocessed managed PC remains, steps S301-S311 are repeated, and the managed PCs are processed one by one.

When all the managed PCs are finally processed (S311: YES), the log file output in S309 is converted into a CSV file (S313). The CSV file is a file configured such that data (alphanumerical character strings) is arranged using a comma as delimiter. The CSV file has high versatility and is widely used in various applications such as spreadsheet software because of its relatively simple data structure. The log converted into the CSV file is, for example with use of a commercial spreadsheet software, displayed in the log display page as shown in FIG. 4.

Further, the managing PC 1 executes a procedure for converging the file in accordance with the format setting of the log (S351). The procedure in S315 will be described in detail with reference to FIG. 15.

Figure 15:
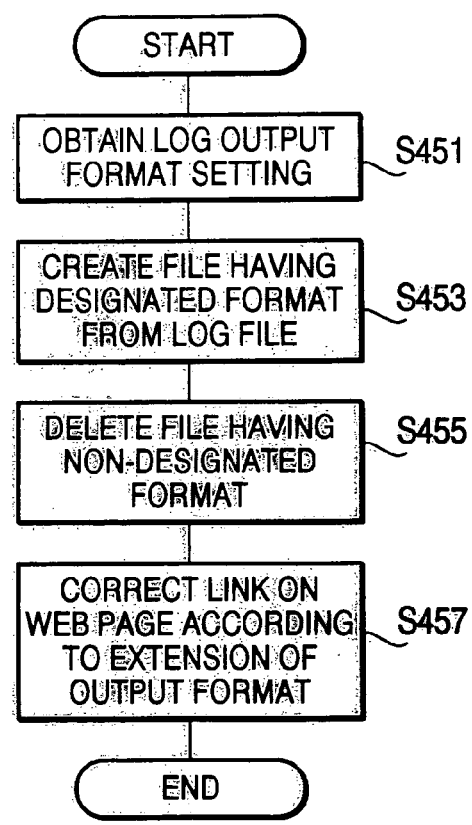
FIG. 15 is a flowchart illustrating a format command converting procedure.

When the procedure shown in FIG. 15 is initiated, the managing PC 1 obtains a log output format specification (S451). In the log output format specification, the user can specify, on the log setting page, any one of items "HTML", "CSV" and "TXT" using a radio button in the "File Type" box 75.

In accordance with the log output format specification, the managing PC 1 creates a file having the specified output format based on the log file output in S313 (S453).

When "HTML" is specified, tags, which are well-known control character strings, are added. Accordingly, the created file (HTML file) can be displayed appropriately using the web browser 41. When "CSV" is specified, since the log file output in S313 is the "CSV" file, the file is copied as it is. When the "TXT" is specified, commas in the CSV file are replaced with tabs.

Next, the managing PC 1 deletes a file which does not have the specified format (S455). It should be noted that, when the setting in the "File Type" box 75 on the log setting page shown in FIG. 3 has been changed, the file which was created in accordance with the format previously designated, remains without being overwritten. Therefore, when the output format has been changed, the file having the previously specified format is deleted in S455.

Then, the link in the web page is modified in accordance with the extension corresponding to the output format (S457). In the present embodiment, the web pages to be corrected are the log setting page shown in FIG. 3 and the PC information display page shown in FIG. 5. The links set to character strings "LocalPrinter Log" 76 and 77 are modified in accordance with the extension of the output file.

With this change, on the client side (e.g., on the managed PC 2), by displaying the revised page and clicking the character strings "Local Printer Log" 76 and 77 on the page, the linked pages (i.e., the files output in S453) can be transmitted to the client. The file delivered to the client is displayed on the screen or downloaded and stored, in accordance with the setting at the client.

Figure 13:
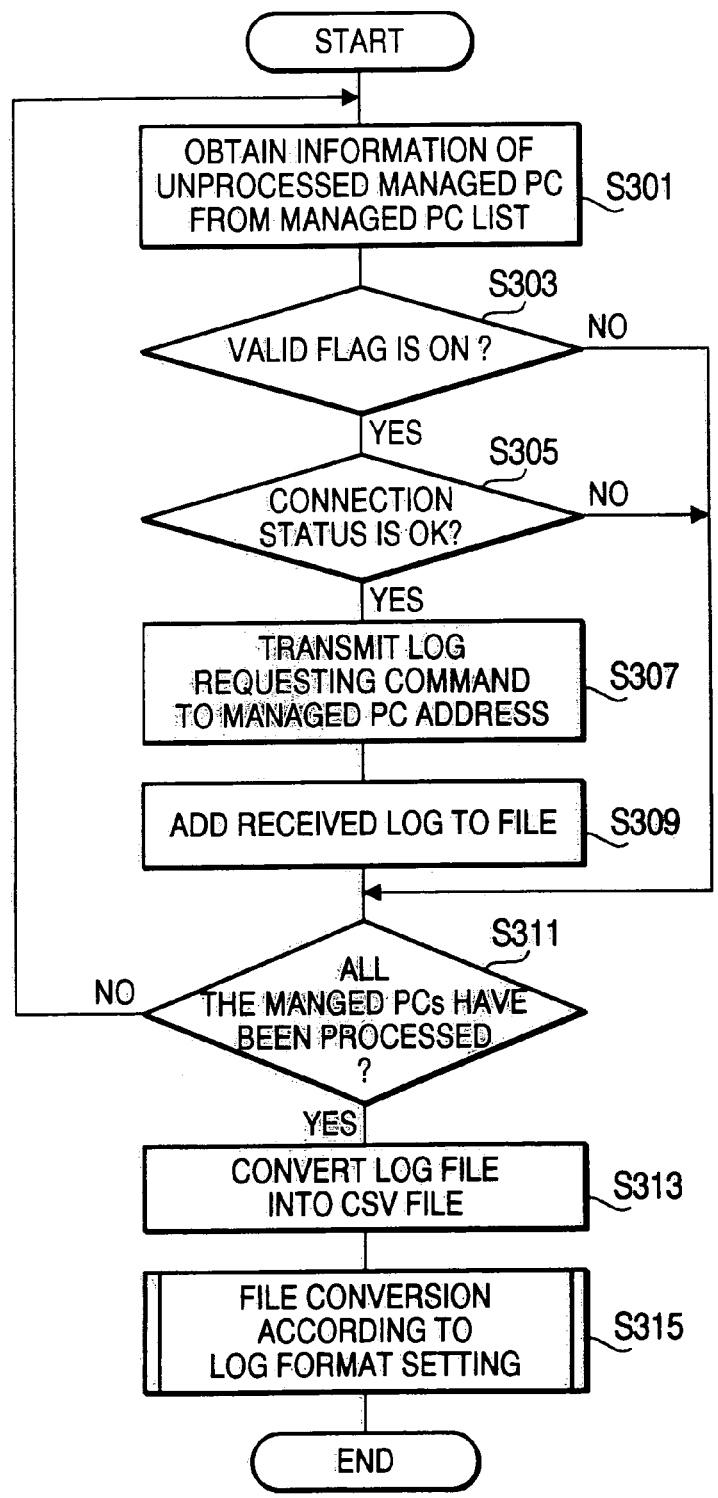
FIG. 13 is a flowchart of a log obtaining procedure.

When steps S451-S457 are finished, which means step S315 in FIG. 13 is finished, the operation in S213 of FIG. 11 is finished.

When S213 is finished, as shown in FIG. 11, the managing PC 1 determines whether all the logs have been obtained (S215). When all the logs have been obtained (S215: YES), process returns to S201. When there is one or more logs (S215: NO), the retry time is set to be thirty minutes after (S217) and process returns to S201. In S217, the retry time set in S217 is managed by the managing PC 1 using a time. It should be noted that the retry time set in S217 is referred to in S203, and S205.

The procedure to obtain the log in S213 is executed when the one of the aforementioned four conditions is satisfied while steps S201-S211 are executed. When none of the four conditions are satisfied, the managing PC 1 determines whether a schedule setting transmission button is clicked (S221). The schedule setting transmission button in the embodiment is a "Send" button 65 on the PC information display page shown in FIG. 5. When the user clicks the "Send" button on the page using the mouse, process regards that the schedule setting transmission button is clicked.

Figure 14:
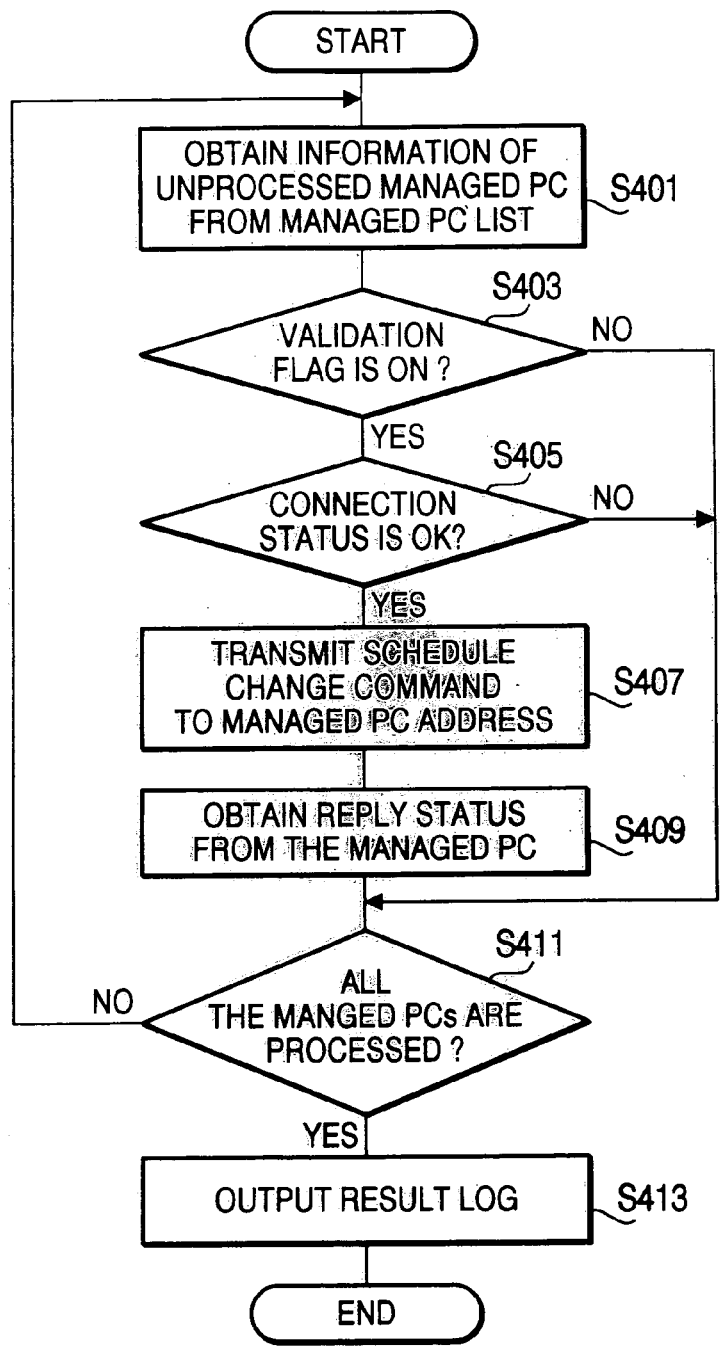
FIG. 14 is a flowchart illustrating a schedule changing command transmitting procedure.

When the schedule setting transmission button is clicked (S221: YES), a schedule changing command transmission procedure is executed (S223), which is illustrated in FIG. 14 in detail.

When the schedule changing command transmission procedure is initiated, the managing PC 1 obtains the PC information of an unprocessed PC form the managed PC list (S401) The managed PC list is, as aforementioned, a list in the managed PC list box 66 on the PC information display page shown in FIG. 5, and all the managed PCs are subject to be processed one by one.

Process determines, in S403, whether the validation flag is ON with respect to the managed PC of which the information is obtained in S401. The flag is the same one as described in connection with the procedure in S303. When the validation flag of the subject managed PC is ON (S403: YES), process determines whether the connection status is OK (S405). The connection status is same as that described in connection with the procedure in S305.

When the connection status of the managed PC subject to be processed is OK (S405: YES), process transmits the schedule change requesting command to the address of the managed PC (S407). As a result, on the managed PC side, with the procedure in S177, process changes the schedule setting of the printer management monitor 33, and returns the response status to the managing PC 1. The managing PC 1 obtains the response status from the managed PC (S409), then process proceeds to S411.

When the validation flag of the managed PC is OFF (S403: NO) or when the connection status of the managed PC subject to be processed is NG (S405: NO), process proceeds to S411 without executing steps S407 and S408.

In S411, process determines whether all the managed PCs have been checked. When one or more unprocessed managed PCs remain (S411: NO), process returns to S401. Thus, until all the managed PCs are processed, steps S401-S411 are repeated so that the managed PCs are selected and processed one by one.

When all the managed PC have been processed (S411: YES), process outputs a result recording log (S413), and finishes the procedure shown in FIG. 14. The results recording log is data for recording the operational status of the managing PC 1.

When steps S401-S413 are finished, S223 shown in FIG. 11 is finished, and process returns to S201 (FIG. 11).

When the schedule setting transmitting button is not clicked (S221: NO), process determines whether the format setting of the log has been changed (S227). The format setting of the log can be changed by selecting one of the radio buttons for "HTML", "CSV" and "TXT" indicated in the "File Type" box 75 on the log setting page shown in FIG. 3. When the selected format has been changed, process determines that the format setting has been changed in S227.

When the format setting has been changed (S227: YES), the managing PC 1 executes the format converting procedure (S229). The format converting procedure is shown in FIG. 15 and is described above, accordingly description there of will not repeated herein. After the format converting procedure is finished, process returns to S201.

When the format setting of the log has not been changed (S227: NO), process determines whether a port number transmission button has been clicked (S233). The port number transmission button is the "Send" button 79 located close to the "Port Number" box 78 on the PC information display page shown in FIG. 5. By inputting a new port number in the "Port Number" box 78 and clicking the "Send" button 79, process determines that the port number transmission button has been clicked.

When the port number transmission button has been clicked (S233: YES), a port number change command transmitting procedure is executed (S235).

Figure 16:
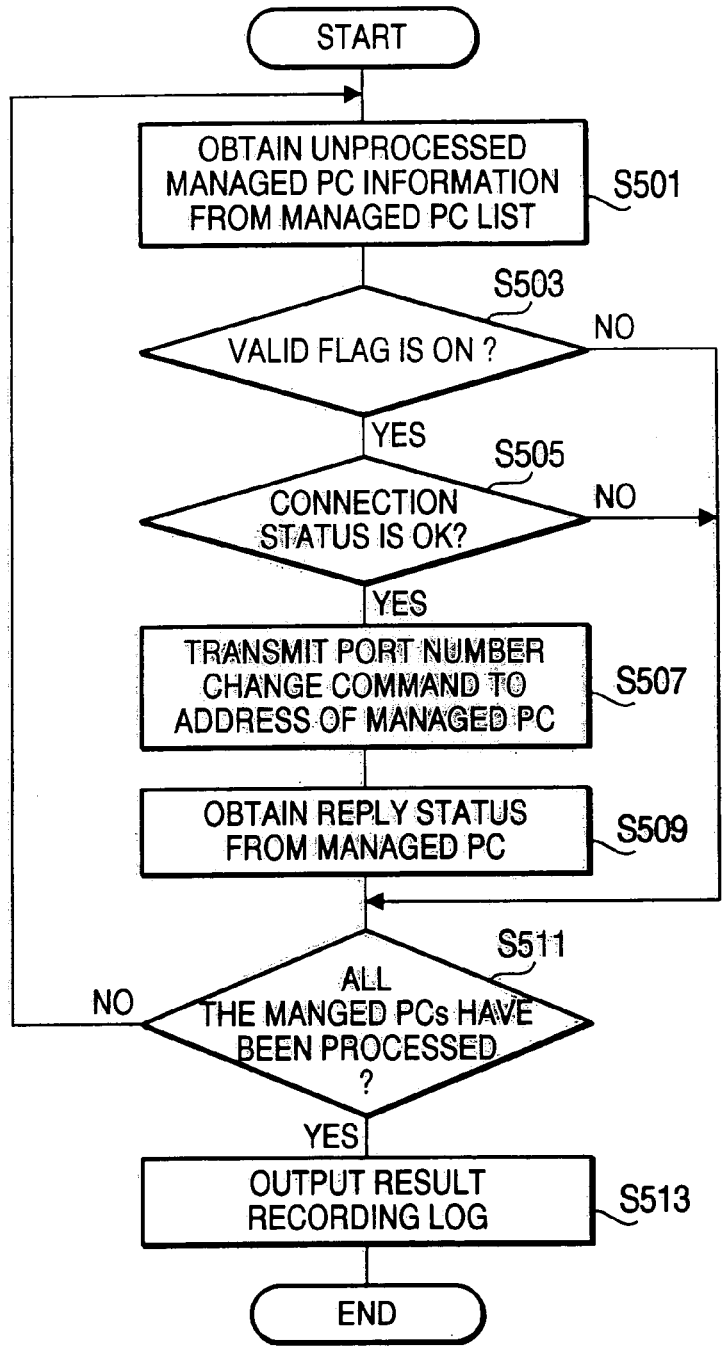
FIG. 16 is a flowchart illustrating a port number changing command transmitting procedure.

FIG. 16 is a flowchart illustrating the port number change command transmitting procedure executed in S235 of FIG. 11.

When the port number change command transmitting procedure is initiated, the managing PC 1 obtains unprocessed managed PC information from the managed PC list (S501). As described above in connection with steps S301 and S401, the managed PC list is a list indicated in the managed PC list box 66 in the PC information display page shown in FIG. 5, and all the managed PCs are subject to be processed one by one in S501.

Next, with respect to the managed PC selected in S501, process determines whether the validation flag is ON (S503). The validation flag is the same as mentioned in S301 and S401. When the validation flag of the managed PC which is subject to be processed is ON (S503: YES), process determines whether the connection status is OK (S505). The connection status is the same as that described in connection with steps S305 and S405.

When the connection status of the managed PC subject to be processed is OK (S505: YES), process transmits the port number change requesting command to an address of the managed PC (S507). As a result, in the managed PC side, by the procedure in S181, the port number is changed and a reply status is transmitted to the managing PC 1. The managing PC 1 receives the reply status from the managed PC (S509), and process returns to S511.

When the validation flag of the managed PC subject to be processed is OFF (S503: NO), or the connection status of the managed PC is NG (S503: YES; S505: NO), process proceeds to S511 without executing S507 and S509.

In S511, process determines whether all the managed PCs have been processed. When one of more managed PCs have not been processed (S511: NO), process returns to S501. With this control, when there are unprocessed managed PCs, steps S501-S511 are repeated so that the managed PCs are processed one by one.

When all the managed PCs have finally been processed (S511: YES), the result recording log is output (S513). The result recording log is for recording the operational status of the managing PC 1.

When steps S501-S513 are finished, S235 of FIG. 11 is finished. Then, the managing PC 1 applies the change of the port number to the managing PC 1 (S237). By the above operation, the managed PC to which the port number change requesting command has been sent and the managing PC can perform the data communication using the same port number. When step S237 is finished, process returns to S201.

When the port number transmission button has not bee clicked (S233: NO), process determines whether the managing PC name transmission button has been clicked (S241). The managing PC name transmission button is the "Send Server Name" button 56 on the PC information display page shown in FIG. 5. When the "Send Server Name" button 56 has been clicked, process determines that the managing PC name transmission button has been clicked.

When the managing PC name transmission button has been clicked (S241: YES), a managing PC name change command transmitting procedure is executed (S243), which will be described in detail referring to FIG. 17.

Figure 17:
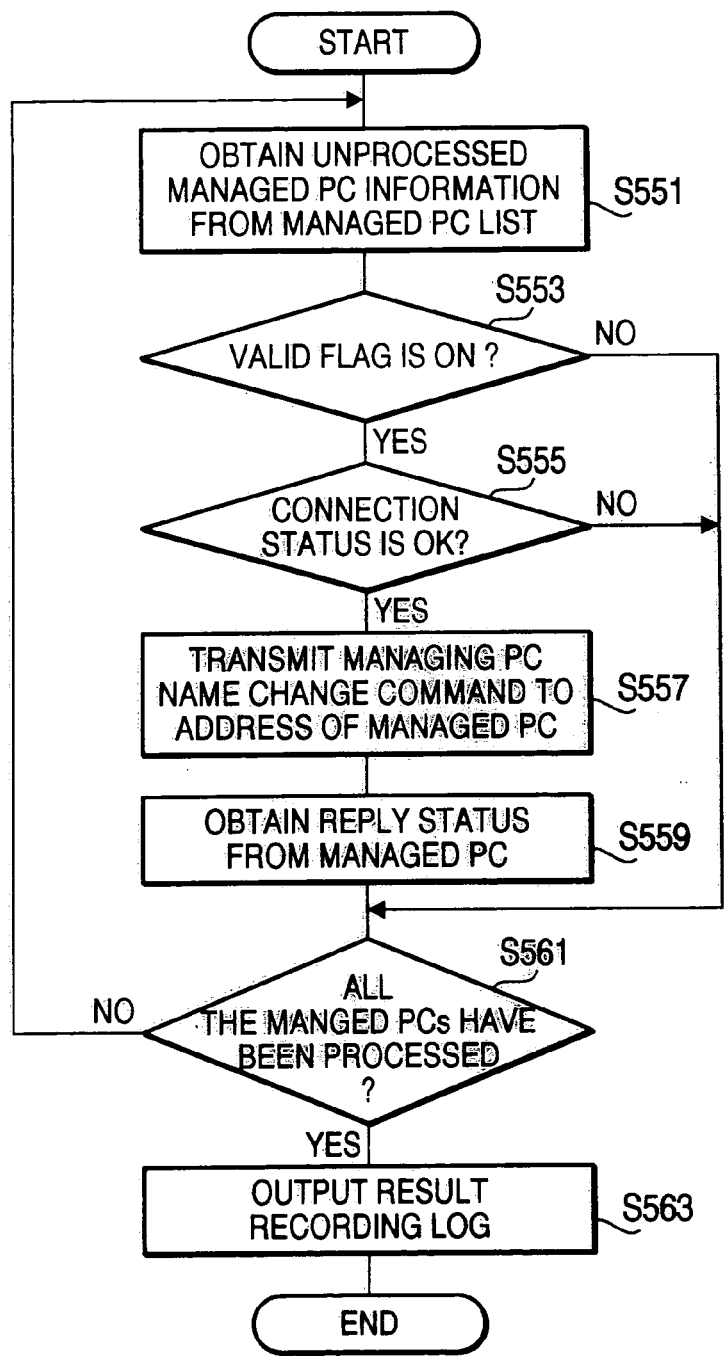
FIG. 17 is a flowchart illustrating a managing PC name changing command transmitting procedure.

FIG. 17 is a flowchart illustrating the managing PC name change command transmitting procedure. When the procedure is initiated, the managing PC 1 obtains the unprocessed managed PC information form the managed PC list (S551). The managed PC list is a list indicated in the managed PC list box 55 on the PC information display page shown in FIG. 5 as aforementioned in connection with steps S301, S401 and S501. All the managed PCs indicated in the list are subject to be processed one by one in S551.

Next, for the managed PC, whose information is obtained in S551, process determines whether the validation flag is ON (S553). The validation flag is the same as that described in connection with steps S303, S403 and S503. When the validation flag of the managed PC subject to be processed is ON (S553: YES), process determines whether the connection status is OK (S555). The connection status is the same as that described in connection with steps S305, S405 and S505.

When the connection status of the managed PC subject to be processed is OK (S555: YES), process transmits the managing PC name change requesting command to the address of the managed PC (S557). The, the managed PC changes the managing PC name in the procedure of S185 and returns a reply status to the managing PC. The managing PC 1 receives the reply status form the managed PC (S559), and process returns to S561.

When the validation flag of the managed PC subject to be processed is OFF (S553: NO), or when the connection status of the managed PC subject to be processed is NG (S555: NO), process proceeds to S561 without executing S557 and S559.

In S561, process determines whether all the managed PCs have been processed. When one or more managed PCs have not been processed (S561: NO), process returns to S551. Thus, when there are unprocessed managed PCs, steps S551-S561 are repeated so that the managed PC is processed one by one.

When all the managed PCs are finally processed (S561: YES), the result recording log is output (S563), and the procedure shown in FIG. 16 is terminated. The result recording log is for recording the operational status of the managing PC 1.

When step S551-S563 have been finished, S234 in FIG. 11 is finished, and process returns to S201.

When managing PC name transmitting button has not been clicked (S241: NO), process proceeds to S247 shown in FIG. 12, where process determines whether an Add button has been clicked. The Add button is an "Add" button 81 close to the "Client PC" box 80 on the PC information display page shown in FIG. 5. When the user has been clicked the "Add" button 81, process determines that the Add button has been clicked.

When the Add button has been clicked (S247: YES), process executes a procedure of transmitting an information requesting command to one address (S249), which will be described below.

Figure 18:
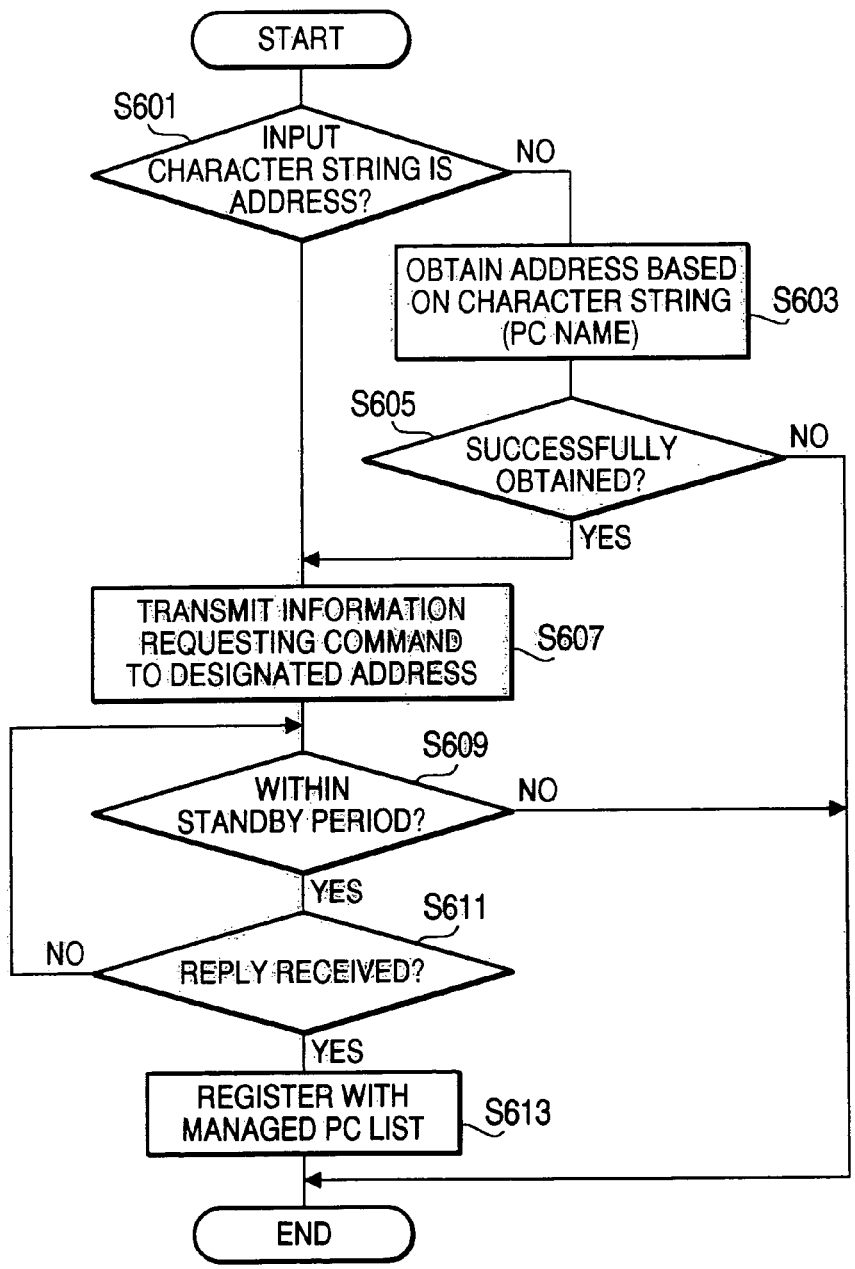
FIG. 18 is a flowchart illustrating a procedure transmitting information request command to one address.

FIG. 18 is a flowchart illustrating the procedure of transmitting an information requesting command, which is executed in S249 of FIG. 12. When the procedure is initiated, the managing PC 1 determines whether the character string input in the "Client PC" box 80 is an address (S601). Whether the character string represents the address or not is determined by examining whether the expression of the character string matches the expression of a logical address used on the network. In the present embodiment, as the address, an IP address for the TCP/IP network. Therefore, in S601, process examines whether the character string as input includes four numeral strings each having one through three digits, delimited with periods.

When the character string is no the address (S601: NO), process determines that the character string represent the managed PC name, and obtains the address based on the character string (i.e., the PC name) in S603. For obtaining the address, process transmits an inquiry to a name server (not shown) on the network, and obtains the address included in a response from the name server. It should be noted that the PC name transmitted to the name server is the character string the user input in the "Client PC" box 80, and may not be the actual PC name on the network. In such a case, an error response is transmitted from the name sever, and process fails to obtain the address.

Accordingly, the managing PC 1 determines whether the address is successfully obtained (S605). When the address has been successfully obtained (S605: YES), process proceeds to S607. When process determines that the input character string represents the address (S601: YES), process also proceeds to S607.

In S607, the information requesting command is transmitted to the designated address (S607). Then, within a standby time period (S601: YES), process examines whether a reply is received from the designated address (S611). When the reply has not been received (S611: NO), process returns to S609, and repeats S609-S611.

When the reply has been received (S611: YES), process registers the received PC information with the managed PC list (S613), and terminates the procedure shown in FIG. 18. When the standby time period has expired during repetition of S609-S611, the procedure is terminated, step S613 being not executed.

When the address has not been successfully obtained (S605: NO), process terminates the procedure without executing S607-S613.

It should be noted that, in S611, the reply from the designated address is received only when an operating managed PC exists at the designated address, and the managed PC is configured to recognize the PC 1 as the managing PC. In this case, on the managed PC side, the procedure of S169 is executed, and as a result, the replay from the designated address reaches the managing PC 1.

When steps S601-S613 area finished, S249 of FIG. 12 is finished. Then, process returns to S201 shown in FIG. 11.

When the Add button has not been clicked (S247: NO), process determines whether a Refresh button has been clicked (S253). The Refresh button is the "Status Refresh" button 74 on the PC information display page shown in FIG. 5. When the user clicks the "Status Refresh" button 74 with the mouse, process determines that the Refresh button has been clicked.

When the refresh button has bee clicked (S253: YES), process executes a procedure for transmitting the information requesting command to the address of the list (S255). The procedure will be described in detail with reference to FIG. 19.

Figure 19:
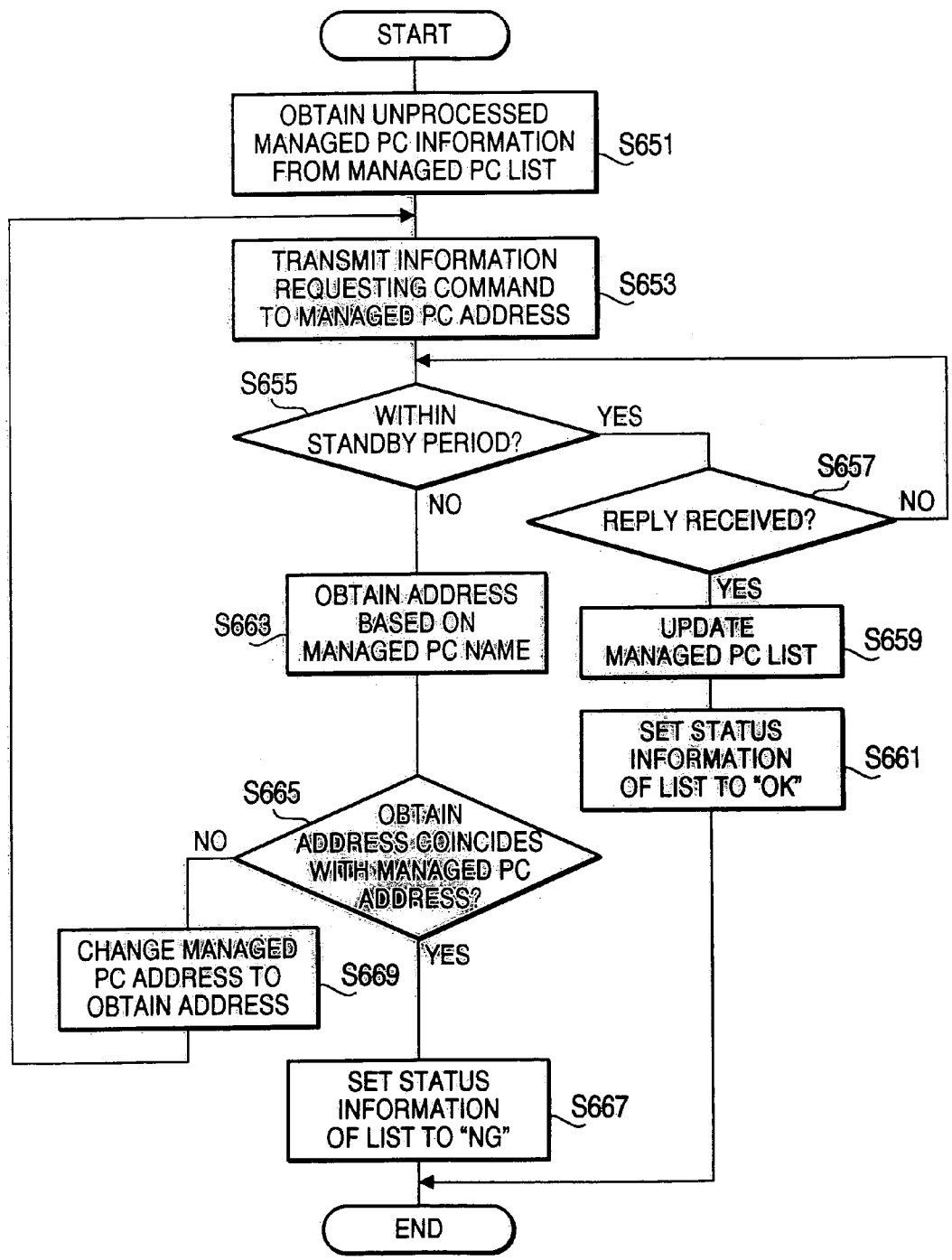
FIG. 19 is a flowchart illustrating a procedure transmitting information request command to addresses on a list.
Figure 20:
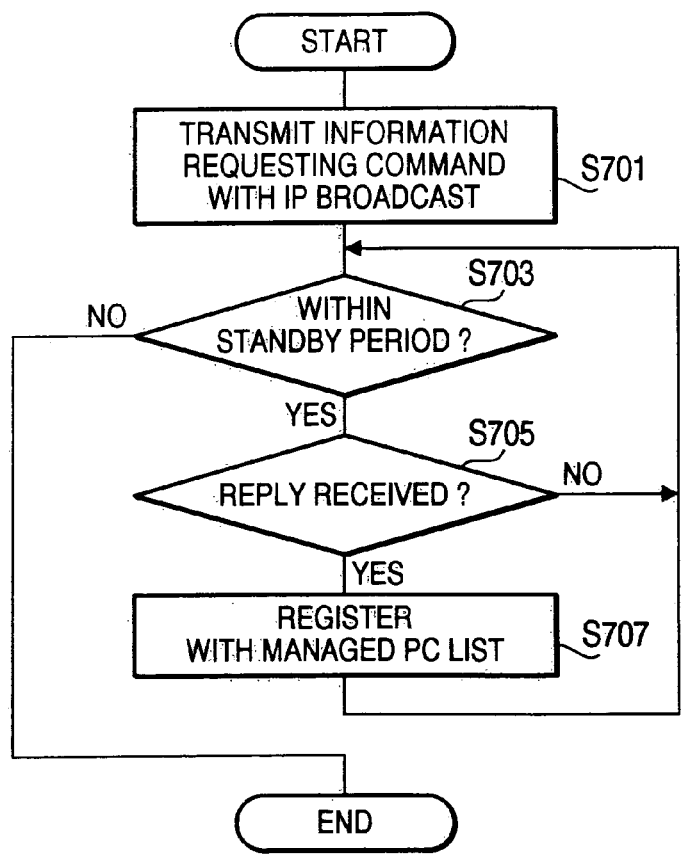
FIG. 20 is a flowchart illustrating a first managed PC detecting procedure.
Figure 21:
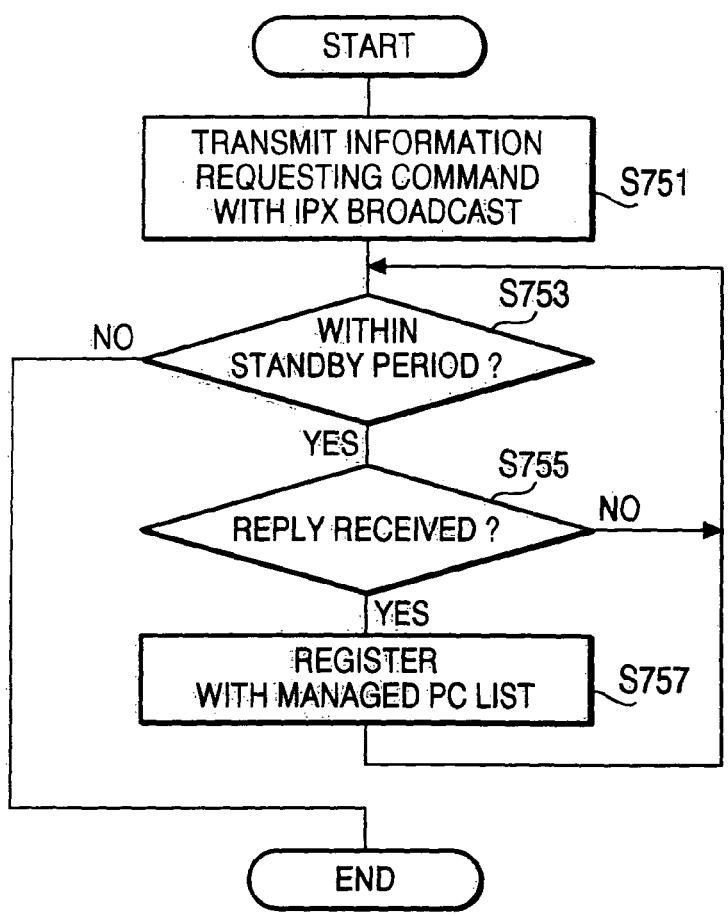
FIG. 21 is a flowchart illustrating a second managed PC detecting procedure.

FIG. 19 is a flowchart illustrating the procedure of transmitting the information requesting command to the address.

When the procedure of FIG. 19 is initiated, the managing PC 1 obtains the unprocessed PC information from the managed PC list (S651). the managed PC list is a list as shown in FIG. 5, and all the managed PCs on the list are subjected to be processed one by one.

Next, the managing PC 1 transmits the information requesting command to the address obtained from the managed PC list (S653). The address obtained from the managed PC list is the "IP Address" box of the managed PC box 66 on the PC information display page shown in FIG. 5.

Thereafter, with a standby time period (S655: YES), process determines whether a reply is received from the designated address (S657). When there is no reply from the designated address (S657: NO), process returns to S655, and repeats steps S655 and S657.

Whet process receives the replay from the managed PC during the repetition of S655 and S657 (S657: YES), process updates the managed PC list in accordance with the PC information as received (S659).

It should be noted that, the reply from the managed PC is received when the managed PC is operating, and the managed PC is configured to recognize the PC 1 as the managing PC. In this case, in the managed PC, step S169 is executed, and as a result, the reply from the managed PC reaches the managing PC 1. In S659, in accordance with the PC information included in the reply from the managed PC, the displayed contents in the "Client PC Name" box 68, "IP Address" box 69, "Location" box 70, and "Contact" box 71 indicated in the managed PC list box 66 are updated.

Thereafter, the Status information of the list is set to "OK" (S661), and the procedure of FIG. 19 is terminated. As a result of S661, in the "Status" box 72 indicated in the managed PC list box 66, "OK" is displayed.

While steps S655-S657 are repeated, when the standby time period has expired (S655: NO), the address is obtained based on the managed PC name obtained from the managed PC list (S659). The managed PC name obtained form the managed PC list is the PC name displayed on the "Client PC Name" box 68 in the managed PC list box 66 on the PC information display page shown in FIG. 5.

When the address is obtained, an inquiry is transmitted to the name server (not shown) on the network, and obtains the address included in the reply transmitted from the name server. Since the PC name transmitted to the name server may not be currently operating, or if it is operating, the address on the network may have been changed. Therefore, the managing PC 1 determines whether the address obtained from the name server and the address obtained from the managed PC list are the same (S665).

When both addresses are the same (S665: YES), the managed PC is regarded not to be currently operation since there is not reply from the managed PC although the information requesting command has been transmitted in S653, and a reply was not received during the repletion of steps S655-S657. In this case, the Status information on the list is set to "NG" (S667), and the procedure is terminated. As a result of execution of S667, "NG" is displayed in the "Status" box 72 indicated on the managed PC list box 66.

When the addresses are different (S665: NO), it is regarded that the address has been changed since the address actually used on the network and the address recorded in the managed PC list are different although the managed PC names are the same. Therefore, in such a case, the address of the managed PC recorded in the managed PC list is changed to the address obtained in S659 (S669). Thereafter, process returns to S653, and executes steps S653-S667 with respect to the updated address. In this case, when the managed PC corresponding to the updated address is currently operating, process proceeds to S661, while process proceeds to S667 when the managed PC is not operating. In either case, the procedure is terminated.

When the steps S651-S669 are finished, S255 in FIG. 12 is finished. Thereafter, process returns to S201 of FIG. 11.

When the Refresh button has not been clicked (S253: NO), process determines whether a discovery button has been clicked (S259). The discovery button is the "Discover" button 83 in a discovery setting page shown in FIG. 6. When the "Discover" button 83 is clicked by the user, process determines that the discovery button has been clicked. The discovery setting page shown in FIG. 6 appears when the "Discover" button 84 in the PC information display page shown in FIG. 5 is clicked.

When the discovery button has not been depressed (S259: NO), process does nothing, and returns to S201 of FIG. 11. When the discovery button has been clicked (S259: YES), process determines whether a IP broadcast is designated (S261). Designation of the IP broadcast is executed on the discovery setting page shown in FIG. 6. When one (i.e., "IP Broadcast" box) of three check boxes, which can be selected individually, and are provided in the "Discovery Method" box 85, process determines that the IP broadcast is designated.

When the IP broadcast is designated (S261: YES), a managed PC detecting procedure I is executed (S263). The procedure will be described in detail with reference to FIG. 20.

When the managed PC detecting procedure I is initiated, the managing PC 1 transmits information requesting command with an IP broadcast without designating an address (S701). If the current time is within a standby time period (S703: YES), process determines whether a reply from a certain address is received (S705). When there is no reply (S705: NO), process returns to S703. When there is reply from a certain address (S705: YES), process registers the received PC information with the managed PC list (S707), and process returns to S703. As a result, within the standby time period (S703: YES), steps S703-S707 are repeated. During the repetition of steps S703-S707, if the PC information is received from one of more managed PCs, all of the one of more managed PCs will be registered with the managed PC list. When the standby time period has expired (S703: NO), the procedure is terminated.

When steps S701-S707 are finished, S263 of FIG. 12 is finished, and process proceeds to S267, or when the IP broadcast has not been designated (S261: NO), process proceeds to S267.

In S267, process determines whether an IPX broadcast is designated. Designation of the IPX broadcast is made in the discovery setting page shown in FIG. 6. When "IPX Broadcast" is checked in the "Discovery Method" box 85 in the discovery setting page, process determines that the IPX broadcast is designated.

When the IPX broadcast is designated (S267: YES), managed PC detecting procedure II is executed (S269). The procedure will be described in detail with reference to FIG. 21.

When the managed PC detecting procedure II is initiated, the managing PC 1 transmits information requesting command with an IP broadcast without designating an address (S751). If the current time is within a standby time period (S753: YES), process determines whether a reply from a certain address is received (S755). When there is no reply (S755: NO), process returns to S753. When there is reply from a certain address (S755: YES), process registers the received PC information with the managed PC list (S757), and process returns to S753. As a result, within the standby time period (S753: YES), steps S753-S757 are repeated. During the repetition of steps S753-S757, if the PC information is received from one of more managed PCs, all of the one of more managed PCs will be registered with the managed PC list. When the standby time period has expired (S753: NO), the procedure is terminated.

When steps S751-S757 are finished, S269 of FIG. 12 is finished, and process proceeds to S273. When IP broadcast has not been designated (S267: NO), process proceeds to S273.

In S273, process determines whether an IP unicast is designated. Designation of the IP unicast is made in the discovery setting page shown in FIG. 6. When "IP Unicast(IP List)" is checked in the "Discovery Method" box 85 in the discovery setting page, process determines that the IP Unicast is designated.

When steps S751-S757 are finished, S269 of FIG. 12 is finished, and process proceeds to S273, or when the IPX broadcast has not been designated (S267: NO), process proceeds to S273.

In S273, process determines whether the IP unicast has been designated. Designation of the IP unicast is made by checking the "IP Unicast(IP List)" in the "Discovery Method" box 85 on the discovery setting page shown in FIG. 6.

Figure 22:
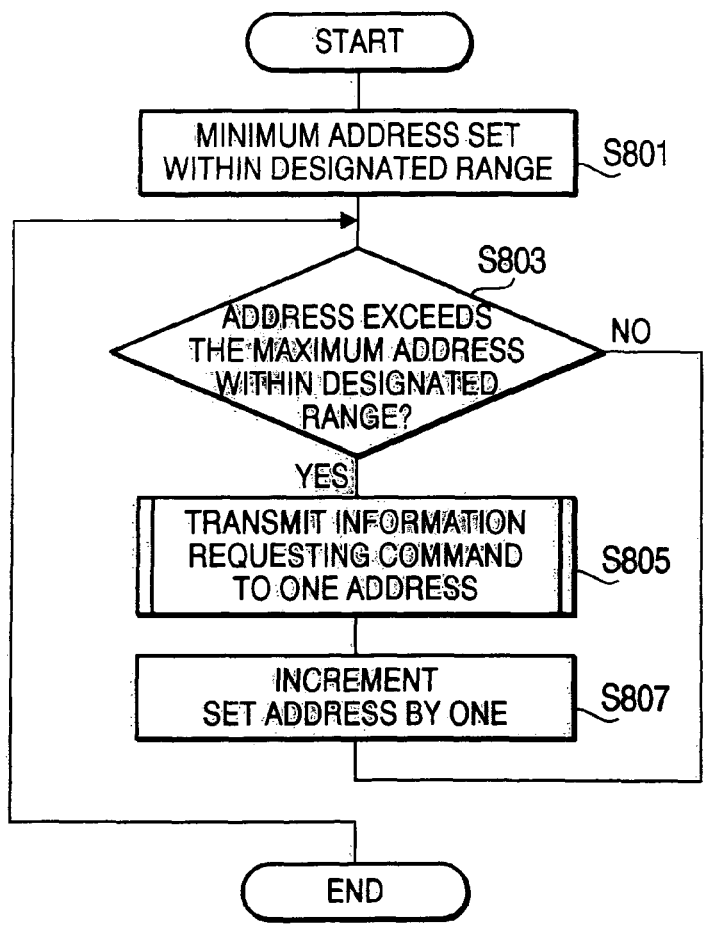
FIG. 22 is a flowchart illustrating a third managed PC detecting procedure.

When the IP unicast is designated (S273: YES), the managed PC detecting procedure III is executed (S275). FIG. 22 shows a flowchart illustrating the managed PC detecting procedure III.

When the managed PC detecting procedure III is initiated, the managing PC 1 set the minimum address within a designated range as a target address (S801). The designated range is displayed in the designated range display box 87 indicated in the "IP Unicast(IP List)" box 86. In this box, two IP addresses are displayed as hyphenated. In this procedure, the two IP addresses are defined as the minimum address and maximum address, and the process is executed for all the addresses between the minimum and maximum addresses.

Next, process determines whether the target address exceeds the maximum address within the designated range (S803). When the target address does not exceeds the maximum address (S803: NO), process executes a procedure for transmitting an information requesting command to an address set as the target address (S805). The procedure in S805 is the same as the procedure shown in FIG. 18. Since the steps S601-S613 of the procedure shown in FIG. 18 are described above, description thereof will not be repeated herein.

When S805 is finished, the address set as the target address is incremented by one. (S807), and process returns to S803. With this control until the target address exceeds the maximum address within the designated range (S803: NO), steps S803-S807 are repeated, and the addresses within the designated range are processed one by one. When the target address exceeds the maximum address within the designated range (S803: YES), the procedure shown in FIG. 22 is terminated.

When steps S801-S807 are finished, S275 of FIG. 12 is finished, and process returns to S201 shown in FIG. 11. When the IP unicast is not designated (S273: NO), process also returns to S201.

With the above described procedures, the managing PC 1 is capable of obtaining the PC information and printer information from the managed PCs, and managing the obtained information. Further, the PC information and the printer information the managing PC 1 manages includes items commonly included in both information, and by determining the contents of the common items of the information of the PC information and the printer information, correspondence between the managed PCs and the printers can be known. This information (i.e., the correspondence information: information from which the correspondence between the managed PCs and the printers is known) can be delivered to the managed PC 2 or the information display PC 5 in accordance with the designated format (i.e., HTML format, CSV format and txt format) designated by the managed PC 2 or the information display PC 5 upon access request from the managed PC or the information display PC 5.

Incidentally, the managing PC also has a following function.

To the PC functioning as the managed PC, one or more printers are locally connected. Further, the managed PC is implemented with the printer management agent 31 and the print management monitor 33. These program modules can be downloaded from the managing PC 1.

When these program modules are installed in a client (a client PC which is to function as the managed PC), for example, by use of a web browser to display the PC information page as shown in FIG. 5, and click a character string "Download" 90 on the page using the mouse.

To the character string "Download" 90, a link to an install program for installing the printer management agent 31 and the printer management monitor 33 are set. When the user clicks the character string "Download" 90, the function of the web browser operates so that an install program file is downloaded from the management PC 1 to the client PC. After the program file is downloaded, the install program automatically executes to install the program modules in the client PC. Thus, in the client PC, the printer management agent 31 and the printer management monitor 33 operate.

As a result, the printer management monitor 33 obtains the printer information from the printers locally connected to the client PC, and the printer management agent 31 functions in a standby state so that the a request from the managing PC 1 is accepted anytime.

When the client PC operates in the above state, by detecting the client PC using the "Discover" button 84 described above in the PC information page shown in FIG. 5, which is displayed in the web browser, with the procedure described above, the information request command is transmitted from the managing PC 1 to the client PC. Then, in response to the request, when the client PC returns the PC information and the printer information to the managing PC 1, the managing PC creates the PC information page reflecting the latest information.

Thus, in the client PC, when the log display page shown in FIG. 4 and/or the PC information page shown in FIG. 5 is re-displayed using the function of the web browser, the information regarding the client PC and the printer which are locally connected to the client PC are displayed.

That is, when the client PC can make use of the web server function provided by the managing PC 1, with a relatively simple operation, the printer management agent 31 and the printer management monitor 33 can be installed. Accordingly, such a client PC can function as the managed PC immediately.

As described above, according to the imaging device information management system, in the managed PCs 2-4, the printer management monitor 33 obtains the printer information from the printers 11-16. In the managing PC 1, the printer management server 21 obtains the PC information from the managed PCs 2-4. Further, the printer management agent 31 provides the printer information obtained by the printer management monitor 33 to the managing PC 1. The printer information is obtained by the printer management server 21 from the managed PCs 2-4. The printer management server 21 creates information indicating correspondence between the managed PCs 2-4 and the printers 11-16 as shown in the log display page shown in FIG. 4, based on the obtained PC information and the printer information, and stores the correspondence information in a file stored in the HDD 23.

Accordingly, the managing PC 1 can manage the correspondence between the managed PCs 2-4 and the printers 11-16. In each of the PC information shown in FIG. 24 and the printer information shown in FIG. 23, a computer name and a network address are included. Using the computer name and the network address as a key to link the PC information and the printer information, information indicative of correspondence between the managed PC and the local printers can be generated. By storing such information and managing the same, information indicative of the correspondence between the managed PCs and the printers can be provided to the users.

Further, since the printer management server 21 creates the log display page that indicative of the correspondence between the managed PCs and the printers 12-16, and outputs the correspondence as a displayable file (e.g., a web page file). The user of a PC other than the managing PC 1 can also view the correspondence between the managed PCs 2-4 and the printers 11-16 using the web browser.

It is possible to create the PC information display page shown in FIG. 5 for all the managed PCs 2-4 on the network, and to have the user to select one or more PCs from among the listed managed PCs 2-4. Then, the managing PC 1 can create the log display page as shown in FIG. 4, which can be displayed on the managed PC 2 or the information display PC 5. Therefore, the information of the managed PCs which the user intends to view can be displayed.

On the PC information display page shown in FIG. 5 has a hyperlink to the log display page shown in FIG. 4. Therefore, a condition where the PC information display page is displayed can easily be moved to a condition where the log display page is displayed.

The managing PC 1 recognized the presence of the managed PCs 2-4 referring to the managed PC list, and the printer information is obtained only from the managed prints 2-4 whose presence is confirmed. Therefore, the printer information can be obtained quickly.

In the above-described embodiment, the printer management server 21 of the managing PC 1 transmits the schedule setting information to the managed PCs 2-4 simultaneously, and the printer management agent 31 sets a schedule for obtaining the printer information from the printers 11-16. Therefore, it is unnecessary to set the schedule in individual managed PCs 2-4. That is, by transmitting the setting information from the managing PC 1, the schedule setting in all the managed PCs 2-4 can be completed.

The managing PC 1 obtains the printer information from the managed PC 2 in accordance with a schedule. If the managing PC 1 fails to obtain the printer information, it retries to obtain the printer information at least once in addition to the scheduled attempt. For example, when the managing PC 1 was unable to access the managed PCs 2 and 3 since they were powered OFF, the printer information may be obtained from the managed PCs 2 and 3, at a later time.

Since the managing PC 1 is scheduled to obtain the printer information fro the managed PCs 2-4 ten minutes later than the schedule of the managed PCs 2-4 obtaining the printer information from the printers 11-16. Therefore, the managing PC 1 can obtain the printer information immediately after the managed PCs 2-4 obtained the printer information fro the printers 11-16. In other words, the managing PC 1 can obtain the latest printer information. In the above-described embodiment, the schedule of the managing PC 1 for obtaining the information is ten minutes later than the schedule of the managed PCs 2-4 to obtain the printer information from the printers 11-16. The time difference need not be limited to ten minutes, rather it should be modified to a suitable value according to the size and processing capacity of the system.

The managing PC 1 is capable of outputting the log display page as shown in FIG. 4 in accordance with any one of the file formats (HTML, CSV and TXT) designated in the log setting page shown in FIG. 3. Therefore, when the user controls to display the log display page, the user may use usable application software since at least one of the file formats may likely be supported.

Further, the hyperlinks included in the log setting page shown in FIG. 3 and the PC information display page shown in FIG. 5 are rewritten in accordance with the file format (HTML, CSV or TXT) designated on the log setting page shown in FIG. 3, a problem of link decay will not occur, and with use of the hyperlinks, the user can move to a page represented by a link, or download a file represented by a link.

Further, the managed PCs 2-4 recognize, by a PC name, a predetermined PC as the managing PC, and a request for the printer information, a request to set the schedule, a request to change the port number and the like will not be accepted if they are transmitted from a PC other than the recognized managing PC.

Further, in the managing PC 1, the printer management server 21 request nodes in the network for reply, and detects the managed PCs 2-4 based on the replies to the requests. Further, the managing PC 1 obtains the PC information included in the replies from the managed PCs 2-4. Thus, the managing PC 1 can detect the managed PCs on the network dynamically, and mange the printers 11-16 locally connected to the managed PCs 2-4.

Furthermore, according to the first embodiment, the managing PC 1 and the managed PCs 204 obtain the printer information at different timings independent from each other. Further, the obtained printer information is stored in the HDD (non-volatile storage). Therefore, even through the managed PCs 2-4 are once powered OFF, if they are powered ON at a timing when the managing PC 1 requests, the printer information can be transmitted to the managing PC 1.

It should be noted that the invention need not limited to the above-described exemplary embodiment, and various modifications can be made without departing the scope of the invention.

For example, in the above-described first embodiment, the managing PC 1 creates the web page data and delivers the same so that the managed PC 2 and the information display PC 5 can display the provided information and operates the managing PC 1. Optionally or alternatively, input device and display device of the managing PC 1 may be used so that the information is displayed and/or operation is instructed on the managing PC 1.

In the above-described modified case, the managing PC 1 may not create and deliver the web page data, but dedicated software installed in the managing PC 1 may be used so that the display device provided to the managing PC 1 is used for displaying the information.

In the embodiment described above, the obtained printer information is converted to "HTML" data, "CSV" data or "TXT" data, and then stored in the managing PC 1 as the log page. Optionally, the obtained printer information may be transmitted as an e-mail message. In such a case, the printer information may be sent as a body of the e-mail message, or an attached file having a format of "HTML", "CSV" or "TXT".

When the e-mail transmission is implemented, it is convenient if GUI is employed to input various setting including the e-mail address for the e-mail transmission.

For example, as indicated in the log setting page shown in FIG. 3, by providing "Send Log Report Mil" check box 92, "Send Mail Address" box 93, "SMTP Server Address" box 94, "From Address" box 95, and the system is configured such that when the "Send Log Report Mail" is checked, the e-mail is created and transmitted. In this case, the destination of the e-mail message is the address set in the "Send Mail Address"

box 93, a sender of the e-mail is the address set in the "From Address" box 95, and the e-mail is transmitted using a mal server represented by the "SMTP Server Address" box 94.

With the above configuration, even a user (e.g., a service person of a maker of the printer) who is in a location from which the managing PC 1 cannot be directly accessed (i.e., the printer management server 21) can receive and check the printer information.

In the above-described embodiment, the port number and the managing PC name are transmitted from the managing PC 1 to the managed PCs 2-4, and the transmitted data is set in each of the managed PCs 2-4. The configuration may be enhanced so that further data, e.g., "Location" data and "Contact" data (which is the data displayed in the "Location" box 70 and "Contact" box 71 on the PC information display page shown in FIG. 5) may be transmitted from the managing PC 1 to the managed PCs 2-4, and is set at the managed PCs 2-4. With this configuration, the location information, and the contact information of the managed PCs 2-4 can be set without directly operating the managed PCs 2-4, individually.

Hereinafter, an information transmission system according to a second embodiment will be described with reference to FIGS. 25-37.

Figure 25:
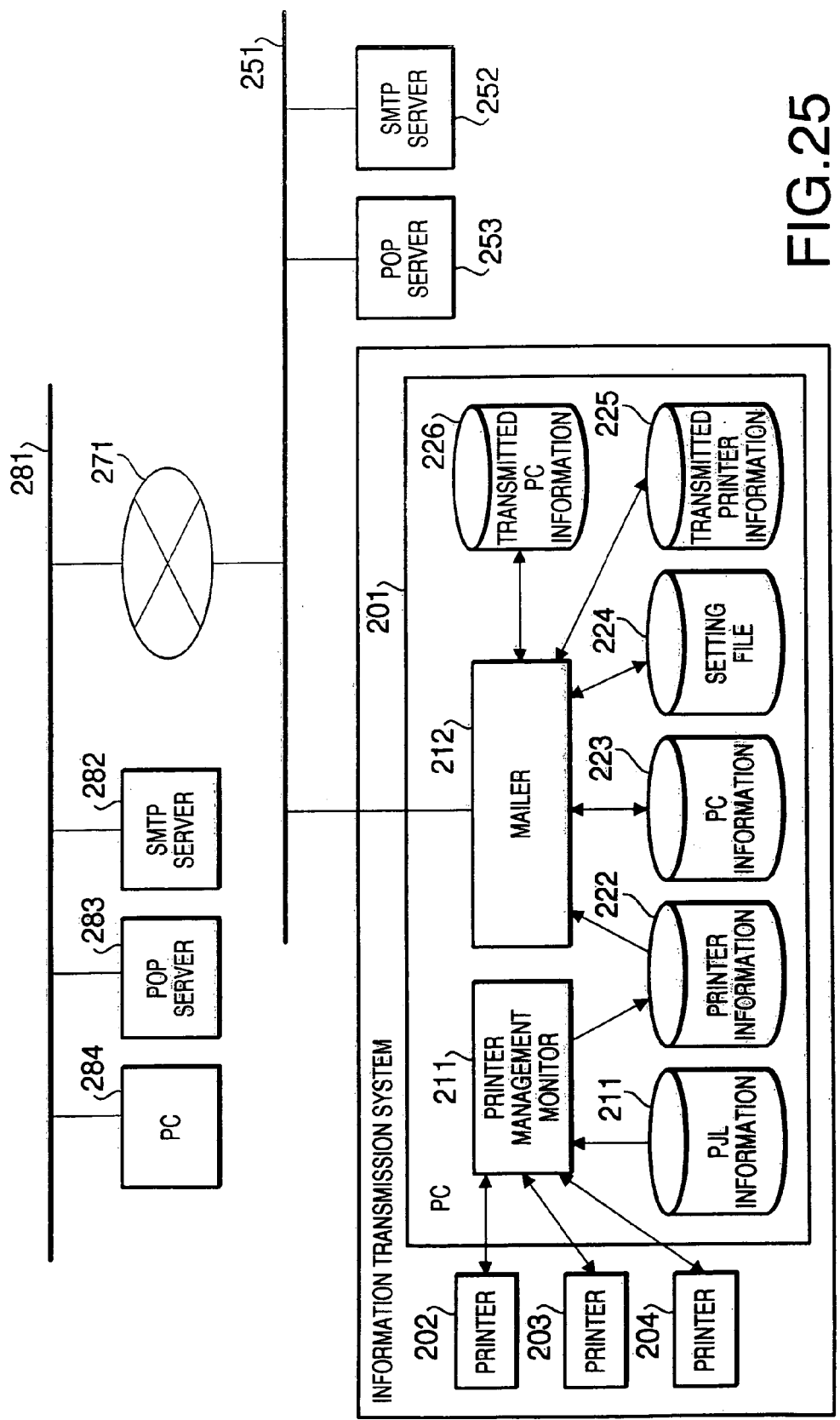
FIG. 25 is a block diagram showing a configuration of an information transmission system according to a second embodiment.

FIG. 25 is a block diagram showing a configuration of an information transmission system 2000 according to a second embodiment. In FIG. 25, external devices/system, which are outside of the information transmission system 2000, are also indicated for convenience of explanation.

As shown in FIG. 25, the information transmission system 2000 includes a PC (personal computer) 201 and a plurality of printers 202-204 connected to the PC 1.

The PC 201 has a control unit including CPU, ROM and RAM, an input unit including keyboard and pointing device, an output unit including a display, and an auxiliary storage unit including a non-volatile storage such as a hard disk. The PC 201 is implemented with an OS (e.g., Windows®, Linux® or MacOS®). Basic functions commonly used by applications are provided by the OS. The basic functions include input/output function such as input through the keyboard and an image output, and an access function enabling the access to a main memory, hard disk and the like. The functions provided by the OS are well-known, and will not be described herein. In the following description, it is assumed that Windows® is employed as the OS of the PC 201.

The printers 202-204 are compliant with the PJL. The printers 202 and 203 are connected to USB ports of the PC 201, and the printer 204 is connected to a parallel port of the PC 201.

The OS implemented in the PC 201 has a multitask function, which executes a plurality of procedures in a timeshared and parallel manner. With this multitask function, various functions are realized by software. In particular, according to the second embodiment, a printer management monitor 211 and a mailer 212 function on the PC 201. In the auxiliary storage (i.e., hard disk) of the PC 201, as files to which the printer management monitor 211 and the mailer 212 access, a PJL command file 221, a printer information file 222, a PC information file 223, a setting file 224, a transmitted printer information file 225 and a transmitted PC information file 226 are stored.

The printer management monitor 211 is a software module which obtains the printer information from the printers 202-204 by retrieving a PJL command from the PJL command file 221 in the PC 201 and providing the retrieved PJL command to the printers 202-204, and stores the printer information in the printer information file 224.

In the PJL command file, a plurality of PJL commands are written, and all the PJL command are provided to each of the printers 202-204. As a result, from the printers 202-204, a plurality of items of the printer information respectively corresponding to the plurality of PJL commands are returned, which are stored in the printer information file 222.

The printer information file 222 includes a plurality of records each includes a plurality (in this embodiment, nine) of items ("Printer.No", "PrinterName", "Port Name", "ROM Version", "Ser.No", "DrumLife", "Pagecount", "Jam count" and "Toner Change") of printer information. The number of records is the same as the number (three, in the embodiment shown in FIG. 25) of the printers connected to the PC 201.

"Printer.No" represents a serial number assigned to the printers 201-204 locally connected to the PC 201. "Port Name" represents input/output port name to which each printer 202-204 are connected. "ROM Version" represents a version number of the ROM of each of the printers 202-204. "Ser.No" represents serial numbers assigned to the printers 202-204. "Drum Life" represents remaining usable count of the drums of the printers 202-204. "Jam count" represents the number of occurrences of a paper jam in each of the printers 202-204. "Toner Change" represents the number of toner exchanges in each of the printers 202-204.

The mailer 212 is a software module that obtains the printer information stored in the printer information file 222 and the PC information stored in the PC information file 223, creates an e-mail message including the correspondence information indicative of the correspondence between the PC 201 and the printers 202-204 based on the obtained information, and then transmits the e-mail message.

The PC information file 223 includes a plurality of items of the PC information regarding the PC 201. For example, according to the second embodiment, the items include "IP Address", "PC name", "Location", "Contact" and "Note". The five items of the PC information are stored in the PC information file 223.

"IP Address" represents a numerical character string indicating a logical address, on the network, assigned to the PC 201. "PC name" represents a name (a character string) for identifying the PC 201 on the network. "Location" is a location information (which is a character string) of the PC 201. "Contact" represents administrator information of the PC 201, and according to the second embodiment, "Contact" represents a telephone number (numerical character string) of the administrator. "Note" represents item which can store an arbitral character string, which is used to store information other then the information for the other four times.

The setting file 224 includes setting data defining operational conditions of the mailer 212. The transmitted printer information file 225 stores a copy of the printer information file 222. The transmitted PC information file 226 stores a copy of the PC information file 223. These files will be described in detail later in connection with the operation of the mailer 212.

The PC 201 is configured to transmits e-mail messages using an SMTP server, and receives e-mail messages using a POP server. The SMTP server and the POP server can be located anywhere as far as connection with the PC 201 can be established. In the embodiment, the PC 201 is connected to a LAN (Local Area Network) 251, and an SMTP server 252 and a POP server 253 are provided on the LAN 251 as shown in FIG. 25.

Destinations of e-mail messages could have a variety of configurations. In the second embodiment, it is assumed that between the PC 201 and the destination of the e-mail message, there is the Internet 271, and at the destination, there are SMTP server 282, POP server 283 and PC 284, which are connected through a LAN 281 as shown in FIG. 25.

An e-mail message transmitted from the PC 201 is transmitted to the SMTP server 252 through the LAN 251. Then, the e-mail message is transmitted to the POP server 283, through the Internet 271, by the SMTP server 252. The PC 284 obtains the e-mail message from the POP server 283 as it accesses the POP server 283. The e-mail message transmitted from the PC 284 is firstly transmitted to the SMTP server 282 through the LAN 281. Then, the e-mail message is transmitted to the POP server, through the Internet 271, by the SMTP server 282. By accessing the POP server 252, the PC 201 obtains the e-mail message from the POP server 253.

Next, operation of the information transmission system 2000 will be described in detail.

FIG. 28 is a flowchart illustrating a printer investigating procedure executed by the printer management monitor 211. The printer investigating procedure is initiated when the PC 201 is powered ON, and is repeatedly executed until the PC 201 is powered OFF.

When the printer investigating procedure is initiated, the PC 201 waits until the current time equals to the time point set to a timer (S2101: NO). When the current time becomes equal to the time set to the timer (S2101: YES), process selects (S2105) one of the printers which have not transmitted a command file from among the printers 202-204, which are locally connected to the PC 201. Then, process transmits a PJL command retrieved from the PJL command file 221 to the selected printer (s2107). Thereafter, process receives (reads back) a reply transmitted form the target printer, and stores the printer information included in the reply into a file (i.e., the printer information file 222) (S2109).

Steps S2105-S2109 are repeated for all the printers 202-204 sequentially. When the command file has not been transmitted to all the printers 202-204 (S2111: NO), process returns the S2105, and repeats the steps described above for the next printer. When the command file has been transmitted to all the printers 202-204 (S2111: YES), process returns to S2101, and waits until the current time becomes equal to the time set to the timer.

With the above procedure, in the printer information file 222 stored in the PC 201, every time when the current time equals to the time set to the timer, the printer information of the printers 202-204 is stored.

Next, an information transmitting procedure executed by the mailer 212, in the PC 201, will be described.

In order to execute the information transmitting procedure, the user is required to set a transmission method, and information regarding the PC 201 preliminarily. In the embodiment, the setting can be made on the PC 201 by an interactive setting operation using a GUI (Graphical User Interface).

Specifically, when the user performs an operation regarding the setting of the information transmission procedure on the PC 201 (e.g., for staring a setting of the mailer 212), a setting screen as shown in FIG. 29 is displayed on the display of the PC 201.

On the setting screen shown in FIG. 29, by radio buttons 101 at the item of "Mail Type", the user can select the type of the e-mail from among an file attachment type [CSV(MIME)] and a text type [Plain Text]. IN the information transmitting procedure described later, an e-mail having the format selected on the setting screen is created and transmitted.

In the "Location" box 103 at the "Client Information", the user can input an arbitrary character string. In the "Contact" box 105, a character string representing a telephone number to contact the administrator can be input, and in "Note" box 107, the user can input arbitrary character string which might be useful for identifying the PC 201.

At the item of "Send Mail", a check box 111 is provided. By inputting/deleting a check in the check box 111, settings of the items of the "Send Mail" setting becomes valid/invalid. In the "Send Mail Address" box 113, the user can input an address of the destination of an e-mail message. In the "SMTP Server Address" box 115, an address (domain name) of the SMTP server (in the embodiment, SMTP server 252) to be used for transmitting e-mail messages. In the "From Address" box 117, a mail address which is indicated as a sender of an e-mail message can be input.

The "Send Log Status" button 121 is for performing a manual instruction of the e-mail transmission. When the user clicks on the "Send Log Status" button 121 (or operates a short cut key for the same function), the e-mail message is created immediately and transmitted.

At the item of the "Schedule Setting", a schedule display box 123, "Add" button 125, "Edit" button 127, "Delete" button 129, "Auto Send (Latest Date & Time)" check box 131, and "Auto Send (Latest Data)" check box 133 are provided.

The schedule display box 123 is an are that displays currently set auto transmission schedules. The "Add" button 125 is clicked when a new auto-transmission schedule is to be created. The "Edit" button 127 is clicked when the currently set schedule is edited (modified). The "Delete" button 129 is clicked when the currently set schedule is to be deleted.

In the schedule display box 123, a plurality of auto-transmission schedules are displayed, one of which is highlighted. When the "Edit" button 127 or the "Delete" button 129 is clicked, the highlighted schedule is edited or deleted.

When the "Add" button 125 or the "Edit" button 127 is clicked, the PC 201 displays a schedule setting window as shown in FIG. 30. On the schedule setting window shown in FIG. 30, the user can select [Specified Time] for transmitting the e-mail at a specified time, or [Specified Cycle] for transmitting the e-mail at every elapse of a specified interval.

When the e-mail message is to be transmitted at a specified time, the user can input a starting time in a "Starting Time" box 163. Further, the user can select a transmission cycle from among [Everyday], [Weekly] and [Monthly]. When the transmission cycle of [Weekly] is selected, with use of a dropdown 167, a day of the week when the transmission is done can be displayed and selected. When the transmission cycle of [Monthly] is selected, the user can input a date in a date input box 169. When the transmission is done at every specified interval, the user can input an cycle (hour) in the interval input box 171.

When the above settings have been input, the user click on a "Submit" button 173 when the input settings are to be reflected, while the user click on a "Cancel" button 175 when the input settings are not to be reflected and the setting operation is cancelled.

When the "Submit" button 173 is clicked, the input data on the schedule setting window is recorded in the setting file 224, and the setting window shown in FIG. 29 is displayed again. When the "Cancel" button 175 is clicked, the data set in the schedule setting window is cancelled, and the setting window shown in FIG. 29 is displayed.

At the item of the "Schedule Setting" shown in FIG. 29, when the "Auto Send (Latest Date & Time)" check box 131 is checked, the e-mail is transmitted when the date and time of the printer information file 222 have been changed. When the "Auto Send (Latest Data)" check box 133 is checked, the e-mail message is transmitted when the contents of the printer information file 222 or the PC information file 223 has been updated.

That is, the schedules indicated in the schedule display box 123 are transmitted whether the file is updated or not, while when the "Auto Send (Latest Date and Time)" check box 13 is checked, the file is transmitted when the date of the file (time stamp) has been updated, while when the "Auto Send (Latest Data)" check box is checked, the file is transmitted when the contents of the file has been updated.

At the item of the "Receive Setting Mail", a check box 135 is provided. By inputting/deleting a check mark in the check box 135, the settings of the "Receive Setting Mail" item become valid/invalid.

In a "Pop Server Address" box 137 at the item of the "Receive Setting Mail", the user can input the address (domain name) of the POP server (in the embodiment, POP server 253) to be used for receiving e-mail messages. In a "Mail Account Name" box 139, a mail account necessary to designate a predetermined mail box from among a plurality of mail boxes managed by the POP server can be input. In an "Account Password" box 141, a password necessary for accessing the mail box specified by the mail account setting is input.

When the above settings have been input, the user click on a "Submit" button 151 when the input settings are to be reflected, while the user click on a "Cancel" button 153 when the input settings are not to be reflected and the setting operation is cancelled.

When the "Submit" button 151 is clicked, the input data on the schedule setting window is recorded in the PC information file 223 and the setting file 224, and the recorded data will be referred to in the information transmission procedure described later. When the "Cancel" button 153 is clicked, the data set in the schedule setting window is cancelled.

Among the items set in the setting window, the data input in the "Location" box 103, "Contact" box 105 and "Note" box 107 at the "Client Information" item are stored in the PC information file 223 as part of the PC information, and the other items are stored in the setting file 224.

On the premise that the above settings have been made in advance, the mailer 212 of the PC 201 executes an information transmitting procedure.

FIG. 31 is a flowchart illustrating the information transmitting procedure executed by the mailer 212.

When the procedure shown in FIG. 31 is initiated, the PC 201 stores the current status of the PC 201 in the PC information file 232 (S2201). It should be noted that in S2201, the IP address assigned to the PC 201 and its computer name are stored in the PC information file 223 as the current PC status. With this step, items "IP address" and "PC name" in the PC information file 223 are recorded.

Next, the PC 201 determines whether the current time is the time point set to the timer (S2203). On the setting window shown in FIG. 29, the auto-transmission schedule displayed in the schedule display box 123 is stored in the setting file 224. Before the procedure shown in FIG. 31 is initiated, the PC 201 obtains the setting of the auto-transmission schedule from the setting file 224, and calculates the next transmission time point, and set the time point to the timer. In S2203, when the current time is equal to the time point set to the timer in S2201 (S2203: YES), process proceeds to S2221.

When the current time has not reached the time point set to the timer (S2203: NO), the PC 201 determines whether the transmission button has been clicked on the GUI (S2205). The transmission button is the "Send Log Status" button 121 shown in FIG. 29. When the user has clicked on the transmission button (S2205: YES) process proceeds to S2221.

When the transmission button has not been clicked on the GUI (S2205: NO), the PC 201 determines whether an update notification is to be done (S2207). Specifically, in S2207, process determines whether the "Auto Send (Latest Date & Time)" check box 131 is checked. When the check box 131 is checked (S2207: YES), process determines whether the date (time stamp) of the printer information file 222 has been updated (S2209). In step S2209, process compares the date and time of the printer information file 222 with the transmitted printer information file 225. When the former has later date and time than the latter (S2209: YES), process proceeds to S2221.

When the update notification is not checked (S2207: NO) or when the date and time of the printer information file 222 have not been updated (S2209: NO), the PC 201 determines whether change notification is checked (S2211). That is, in S2211, process determines whether the "Auto Send (Latest Data)" check box 133 is checked. When the check box 1133 is checked (S2211: YES), the PC 201 determines whether there is a difference between the contents of the transmitted printer information file 225 and the contents of the printer information file 222 (S2213).

When there is a difference between the transmitted printer information file 225 and the printer information file 222 (S2213: YES), process proceeds to S2221. When there is no difference between the transmitted printer information file 225 and the printer information file 222 (S2213: NO), the PC 201 determines whether the contents of the transmitted PC information file 226 and the contents of the PC information file 223 (S2215). When there is a difference between the contents of the transmitted PC information file 226 and the contents of the PC information file 223 (S2215: YES), process proceeds to S2221.

During the above described procedure in S2203-S2215, when process moves to S2221, the PC 201 sets the destination of an e-mail message (S2221). The destination is the mail address input in the "Send Mail Address" box 113 in FIG. 29 and stored in the setting file 224. In step S2221, the mail address is retrieved from the setting file 224. Then, the PC 201 executes the transmission data creating procedure (S2223).

FIG. 32 is a flowchart illustrating the transmission data creating procedure.

When the transmission data creating procedure is initiated, the PC 201 copies the PC information file and the printer information file as transmission history data (S2301). Specifically, the PC 201 copies the printer information file 222, including the time stamp thereof, into the transmitted printer information file 225, and the PC information file 223, including the time stamp thereof, into the transmitted PC information file 226. With this procedure, even if the printer information file 222 or the PC information file 223 is updated, the contents of the printer information file 222 and the PC information file 223 which are transmitted by the e-mail are remained as the transmission history data (i.e., the transmitted printer information file 225 and the transmitted PC information file 226).

It should be noted that the transmitted printer information file 225 and the transmitted PC information file 226 are referred to when steps S2213 and S2215 are executed to determine whether the printer information file 222 and the PC information file 223 are updated.

Next, the PC 201 determines whether the "Mail Type" of the e-mail message to be created in the following steps is "CSV" (S2303). The "Mail Type" of the e-mail message to be created in the following steps is selected by the radio buttons 111 at the item of "Mail Type" in FIG. 29 and recorded in the setting file 224. Therefore, in step S2303, the PC 201 obtains the "Mail Type" from the setting file 224.

When the "Mail Type" is "CSV" (S2303: YES), the PC 201 opens a temporary file for transmission, which will be an attached file (S2305), and arranges the items of the PC information with commas therebetween, and writes the comma-separated items in one line in the file (S2307). Further, the PC 201 arranges the contents of the PC information in accordance with the comma-separated format, and writes the data in one line (S2309).

Further, the PC 201 arranges the items of the printer information with commas therebetween, and writes the same in one line in the file (S2311). Then, the contents of the printer information corresponding to one printer are arranged in one line in accordance with the comma-separated format, which are written in the file in one line (S2313).

The PC 201 determines whether information of all the connected printers has been written (s2315). When all the data has not been written (S2315: NO), process returns to S2313. In the second embodiment, three printers 202-204 are connected to the PC 201. Therefore, steps S2313-S2315 are repeated three times. While repeating steps S2313-S2315, every time when S2313 is executed, contents of the printer information corresponding to another printer are arranged in accordance with the comma-separated format, and are written in one line, in the temporary file.

When the information of all of the connected printers has been written (S2315: YES), the PC 201 prepares a file attaching type mail header (S2317), attaches the temporary file for transmission (S2319) and terminates the procedure shown in FIG. 32.

The e-mail created in steps S2305-S2319 includes a body as shown in FIG. 33A and an attached file as shown in FIG. 33B. In this case, the attached file shown in FIG. 33B is a CSV file, which is generally used and can be viewed using a commercial spreadsheet program.

When the "Mail Type" is not "CSV" (S2303: NO), the PC 201 prepares a plain text type mail header (S2321), reads out the PC information (items and contents), and writes the PC information in the body of the e-mail message to be transmitted. The printer information is also read out and written in the body of the e-mail message (S2325).

The PC 201 determines whether information of all the connected printers has been written (S2327). If the information of all the connected printers has not been written (S2327: NO), process returns to S2325. According to the second embodiment, three printers are connected to the PC 201. Thus, steps S2325-S2327 are repeated three times. During the repetition of steps S2325-S2327, every time when S2325 is executed, printer information (items and contents) for another printer is read out and is written in the body of the e-mail message. When information of all the connected printers has been written (S2327: YES), the procedure shown in FIG. 32 is terminated.

The e-mail message created in steps S2321-S2327 is as shown in FIG. 34 only has the body. In the body of the message, the PC information and the printer information are written. As shown in FIG. 34, the information are written such that, in each line, an item and its content are arranged with a comma therebetween. This format is not so general as the CSV format, however, it can easily be viewed using normal e-mail transmission/reception software. Accordingly, if a device such as a cell phone, which can transmit/receive e-mail messages, is used, the contents of the printer information and the PC information can be viewed easily.

When steps S2319 or S2327 is completed, S2223 of FIG. 31 is finished, and the PC 201 transmits, in S2225, the e-mail message created in S2223. The e-mail message is transmitted from the PC 201, through the LAN 251, to the SMTP server 252. Thereafter, with the function of the SMTP serer 252, the e-mail message is transmitted to the destination. When step S2225 is finished, process returns to S2201, and procedure starting from S2201 is repeated.

The above describes a case where the e-mail message is transmitted. When the change notification is not checked (S2211: NO), or when there is no difference between the contents of the transmitted PC information file 226 and the contents of the PC information file 223 (S2215: NO), process does not move to S2221, but the PC 201 executes a setting change procedure (S2231), which will be described below.

Figure 6:
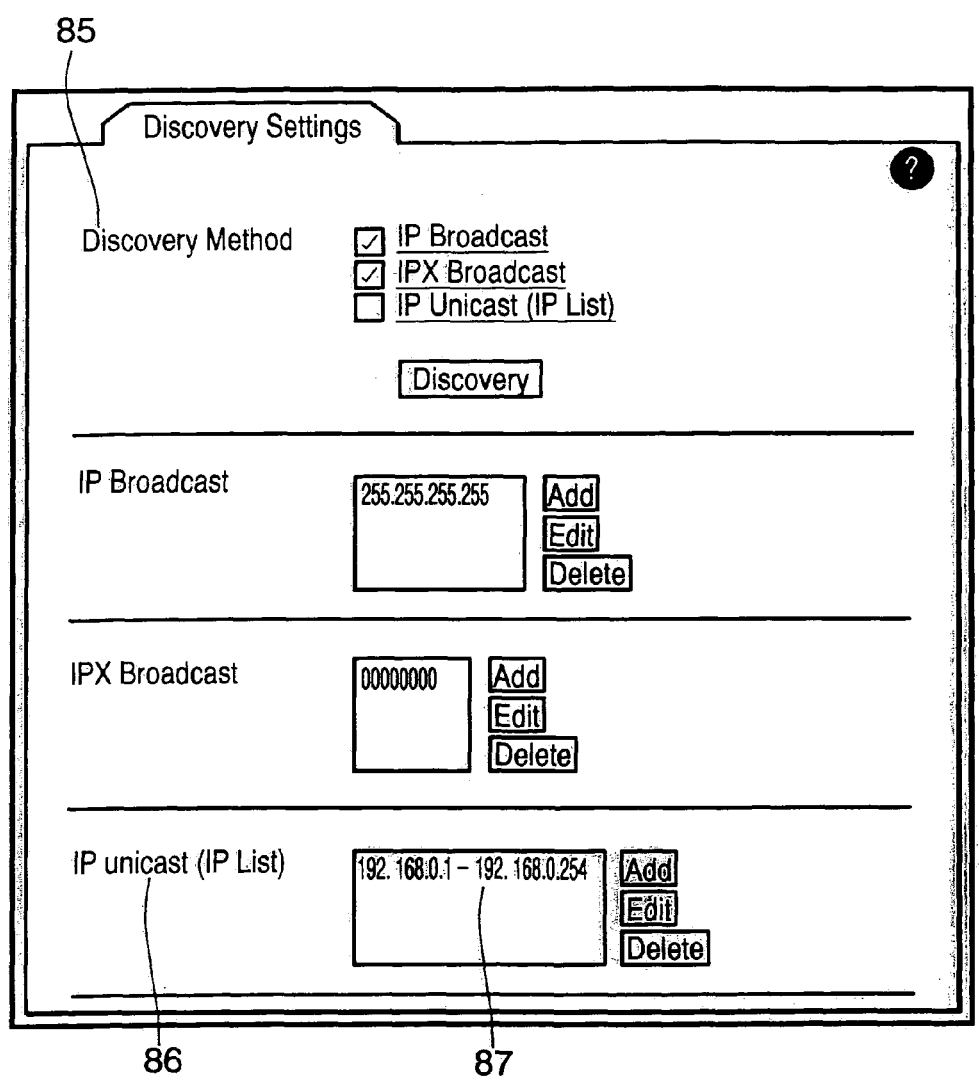
FIG. 6 shows a discovery setting page shown on the browser.

FIG. 35 is a flowchart illustrating the setting change procedure. When this procedure is initiated, the PC 201 determines whether a setting change has been made using the GUI (S2401). As described above, in the PC 201, when the user performs an operation related to the information transmitting procedure (e.g., an operation to start setting of the mailer 212), setting windows as shown in FIGS. 5 and 6 are displayed on the display of the PC 201. Then, the user inputs necessary data on the setting window to perform the operation related to the information transmitting procedure. It should be noted that display of the setting windows and input operation on the setting windows may be controlled by executing another program different from the mailer 212.

It is preferable that the PC information file 223 is handled only by the mailer 212. Then, it becomes less possible that the PC information is changed unintentionally. It is further preferable that the PC information is protected so that it can be changed only when the mailer 212 or a setting program is used. In view of the protection, it may be convenient that the print information is stored in a work memory or the mailer 212.

In the procedure in S2401, the PC 201 determines whether the change of the setting using the GUI is done. When the change has been made (S2401: YES), the setting input using the GUI is stored (S2403). As aforementioned, the items input in the "Location" box 103, "Contact" box 105, "Note" box 107 are stored, as apart of the PC information, in the PC information file 223. The other items are stored in the setting file 224.

In the meantime, with steps S2401-S2403, the setting change can be done using the GUI provided to the PC 201. In the present embodiment, the above-described change of the setting can be done using the e-mail message.

That is, when step S2403 is executed, the PC 201 accesses the POP server 253 and attempts to obtain an e-mail message addressed to the information transmission system 2000 (S2405). When the e-mail message is received (S2407: YES), the PC 201 memorizes the setting indicated in the e-mail message (S2409).

Incidentally, the e-mail message the PC 201 receives is, for example, the e-mail message transmitted from the PC 284. In PC 284, a setting change mail transmitting procedure is executed, which is shown in FIG. 36. As shown in FIG. 36, setting items are input in the mail text (S2501). Then, the mail address of the PC whose setting it to be changed is input (S2503). Then, in S2505, an e-mail message, which is created in accordance with the mail text and the mail address input in steps S2501 and S2503, is transmitted.

The e-mail message transmitted from the PC 284 is transmitted to the SMTP server 282. Then, the e-mail message is transmitted from the SMTP server 282 to the POP server 253. Then, in S2405, the PC 201 retrieves the e-mail message from the POP server 253.

The e-mail message transmitted from the PC 284 to the PC 201 contains the setting items which are written in accordance with a predetermined format as shown in FIG. 37. The contents of the e-mail message are substantially the same as those input through the GUI. However, in view of security, the items of the "Receive Setting Mail", which can be input in the GUI, cannot be changed through the e-mail message.

In S2409, when the e-mail message as shown in FIG. 37 is received, the body of the e-mail message is read line by line and analyze the same to extract the items and setting contents. Then, similar to a case where the input is made through the GUI, the extracted setting contents are stored in the PC information file 223 or the setting file 224, depending on the items.

When the procedure in S2409 is finished, S231 of FIG. 31 is finished. Thus, process returns to S2201, and the procedure beginning from S2201 is repeated. It should be noted that the above-described information transmitting procedure is repeated at a frequency of once in one through five minutes.

As understood from the above, according to the information transmission system, the user can recognize the information regarding the printers 202-204 from the e-mail message transmitted to the destination. Further, the user can know the correspondence between the printers 202-204 with the PC 1 to which the printers 202-204 are connected. Accordingly, different from a system in which only the information regarding the printers is transmitted, the user can recognize that the printers 202-204 are connected to the PC 201. Further, such a correspondence information between the PC 201 and the printers 202-204 is transmitted using the e-mail message, different from a system in which information is exchanged between computers on the same network, the information can be received at any location if the e-mail message can be received.

Further, the correspondence information can be written in the body of the e-mail or can be provided as an attached file, depending on the setting. Accordingly, when the information is written in the body of the e-mail message, the user who uses a mailer which does not handle the attached file or a cell phone can view the information. When the attached file is provided, by use of a generally used spreadsheet program or the like, the information can be viewed in accordance with an easily viewable format.

In the PC information of the correspondence information, the "Location" information, the administrator information, the "Contact" information, Arbitrary description, and the "Note" which are optionally input by the user. Thus, in comparison with a case where only the necessary information such as "IP address" and "PC name" is employed, even a user who is not so skilled in the network setting can easily identify the PC corresponding to the PC information from among a plurality of PCs on the network. In particular, when the location information is available, the user can go to the location where the PC is placed. Since the administrator information is included, the user of the PC can contact the administrator. Further, the PC information includes the "IP address" and "PC name", the user who is skilled in the network setting can identify the PC based on such information.

According to the embodiment, the correspondence information can be transmitted at an arbitrarily set timing (e.g., a timing according to the user-set schedule, a timing when the printer information file 222 is updated, a timing when the contents of the printer information file 222 is changed, a timing when the contents of the PC information file 223 is updated, a time when the user instructs the transmission using the GUI (when the user clicks on the "Send Log Status" button 121 in FIG. 29)). Therefore, by setting the timing the user thinks necessary, the correspondence information can be transmitted by e-mail at a desired timing.

When the PC 201 operates as the mailer 121, it does not obtains the printer information directly from the printers 202-204 but obtains the printer information from the printer information file 222. Therefore, when the printers 202-204 are busy or powered OFF, the PC 201 can obtain the printer information being affected by the operating status of the printers 202-204.

It should be noted that the above-described second embodiment is an exemplary embodiment, and the configuration of the information transmission system can be embodied and/or modified in various ways.

For example, in the second embodiment, the CSV file is created as the file containing the correspondence information, and the CSV is attached to an e-mail message. However, the invention does not limit the type of the attached file, and the CSV file can be replaced with another file having a different format such as an HTML file. In such a case, the HTML file can be viewed by the browser which supports the HTML file format.

In the embodiment described above, the administrator information includes a telephone number to contact the administrator. This may be modified such that the administrator information includes an e-mail address.

Further, in the above-described embodiment, the procedures constituting the information transmitting procedure are executed in a predetermined order. However, the invention need not to be limited to execute the procedures in the described order. That is, the procedures that do not cause a problem even if the order thereof is changed can be executed in a desired order.

Some examples will be shown.

S2231 shown in FIG. 31 need not be executed at the timing indicated in the flowchart shown in FIG. 31. Specifically, if the setting change procedure of S2231 is executed when steps S2203-S2225 for a series of procedures beginning from the determination whether the mail transmission is necessary to the transmission of the e-mail, the e-mail may have unintended contents. Therefore, it is not preferable to execute the setting change procedure in such a timing. In particular, when the e-mail transmission is determined (e.g., S2203, S2204, S2207-S2209, S2211-S2213, S2211-S2215), it is not preferable to change the setting (i.e., a procedure similar to S231) until the e-mail message is transmitted in S2225.

Therefore, in order to avoid execution of the setting change procedure at an unintentional timing, step S2231 is located at the indicated position in FIG. 31. However, if the execution is done at a timing excluded from the above undesirable timing, the procedure of S2231 may be located at different position in FIG. 31.

Further, if execution of the setting change at the above-indicated undesirable timing can be prevented (e.g., if the files are protected so that the setting cannot be changed during the undesirable period), the setting change procedure may not be executed in the flowchart shown in FIG. 31, but may be executed in a procedure (e.g. a procedure executed in parallel with the procedure shown in FIG. 31 by the multitask function provided by the OS) different from that shown in FIG. 31.

In FIG. 31, steps S2203, S2205, S2207 and S2207 need not be executed in this order, and the order can be arbitrarily changed. So are the steps S2213 and S2215.

Step S2201 in FIG. 31 need not be executed at a timing as indicated in the flowchart. The procedure may be executed at any timing before the PC information is written in the body of the e-mail or in the attached file in S2307 and S2323 of FIG. 32.

In the embodiment, however, in S2215, the PC information file 223 and the transmitted PC information file 226 are compared. Therefore, the PC information file 223 should be updated at this stage. Further, in S2301 of FIG. 32, the PC information file 223 is copied to the transmitted PC information file 226. Therefore, the PC information file 223 should be updated at this stage. Accordingly, in the embodiment, step S2201 is executed at a timing as shown in FIG. 31 since the PC information file 223 should be updated before S2215 and S2301 are executed. In other words, if a relationship with S2215 and S2301 are considered, S2201 can be executed at arbitrary timing before S2307 and S2323 area executed.

Further, S2301 shown in FIG. 32 need not be executed at a timing indicated in FIG. 32. According to the embodiment, however, when S2213 and S2215 are executed, the transmitted printer information file 225 and transmitted PC information file 226 are referred to. Therefore, S2301 should be done beforehand.

For example, S2301 is executed after the mail transmission in S2255 is successfully done, it is convenient since the transmitted printer information and transmitted PC information corresponding to the successful mail transmission can be stored.

In the first embodiment shown in FIG. 1, the printer management monitor 33 and the printer management agent 31 are provided as separate modules. In the second embodiment shown in FIG. 25, the printer management monitor 211 and the mailer 212 are provided as separated modules. Therefore, a printer having the printer management monitor 33 or 211 can function as either the managed PC 2 or the data transmitting system (PC 201) if the printer management agent 31 or the mailer 212 is added. Therefore, for example, by exchanging a module that can output the printer information to outside, e.g., the printer management agent 33 or mailer 212, the printer can be configured to provide the user-desired printer information.

Further, a program configuration realizing a function of communicating with other devices through a communication port is generally different for a different OS. On the other hand, except for the program configuration intrinsic to the OS, programs which can be used regardless of the OS are generally used (e.g., JAVA programs). Therefore, by separating the printer management monitor 33 (or 211) that includes programs for a function to communicate with other devices via the communication port from the printer management agent 31 of the mailer 212 that does not include such programs, thereby enabling the printer management agent 31 or the mailer 212 to operate on anyone of a plurality of different OSs, developing efficiency with respect to the management PC 2 and/or the information transmitting system 201 (PC 201) will be improved.

FIGS. 38A and 38B show the printer management agent 31 and the mailer 212 realized by JAVA virtual machines, respectively. In these examples shown in FIGS. 38A and 38B, the printer management agent 31 and the mailer 212 are provided as JAVA programs. Specifically, the function of the printer management agent 31 or the mailer 212 is provided as JAVA byte code, which is an intermediate language created by compiling a source program written in JAVA programming language. Then, the thus created JAVA byte code is executed by the JAVA virtual machine, which is provided corresponding to the OS and CPU in the environment where it is implemented, thereby functioning as the desired module.

It should be noted that the invention should not be limited to the above configuration where the printer management monitor 33 (or 211) is provided separately from the printer management agent 31 of the mailer 211.

In the above-described embodiments, the network printer information obtained from the network printers is displayed on the top page shown in FIG. 2, while the local printer information obtained from the PCs which are connected with local printers is displayed on the log display page shown in FIG. 4. This configuration meets the demand of the user of the management PC to treat the network printer information and the local printer information separately. The invention, however, should not be limited to such a configuration, and both the network printer information and the local printer information may be displayed on the same screen, as shown in FIG. 39. This alternative configuration meets a demand of the user to view the local printer information and network printer information on the same screen to grasp the entire condition.

The present disclosure relates to the subject matters contained in Japanese Patent Applications No. 2003-365154, filed on Oct. 24, 2003, and No. 2004-024090, filed on Jan. 30, 2004, which are expressly incorporated herein by reference in their entireties.

What is claimed is:

1. A system including a managing computer device, a managed computer device and at least one first imaging device, the managing computer device and the managed computer device being directly connected to a network, the at least one first imaging device not being directly connected to the network, and the managed computer device being directly connected to the at least one first imaging device, wherein:

the managed computer device is connected to obtain device information of the at least one first imaging device from the at least one first imaging device, and configured to transmit the device information of the at least one first imaging device and the device information of the managed computer device to the managing computer device, the managing computer device stores device information of one or more managed computer devices connected to the network, the managing computer device being configured to display a list concerning the managed computer devices connected to the network based on the stored device information, the managing computer device is configured to:
store first schedule information defining a timing at which the managed computer device obtains the device information from the at least one first imaging device;

store access information for each of the managed computer devices, the access information representing whether each of the managed computer devices included in the list of the managed computer devices is accessible;

automatically judge whether a predetermined period has passed from the timing indicated by the first schedule information if the managing computer device stores the first schedule information;

judge, for each of the managed computer devices, whether the access information indicates that each of the managed computer devices is accessible if it is judged that the predetermined period has passed from the timing indicated by the first schedule information;

transmit a request for obtaining device information of the at least one first imaging device to the managed computer device corresponding to the access information, which is judged to indicate that the managed computer device is accessible when the access information indicates that the managed computer device is accessible, the request for obtaining the device information being not transmitted to the managed computer device corresponding to the access information judged to indicate that the managed computer device is not accessible;

receive the device information of the at least one first imaging device from the managed computer device to which the request for obtaining the device information is transmitted;

generate a device list of the at least one first imaging device based on a combination of the device information received from the managed computer device and the stored device information of the managed computer devices; and display the generated device list of the at least one first imaging device when one of the managed computer devices included in the list is selected, and if the selected managed computer device is a device that has been judged as an accessible device, the managing computer device requests the selected managed computer device for the device information, while if the selected managed computer device is a device that has been judged as an inaccessible device, the managing computer device does not request the selected managed computer device for the device information.

2. The system according to claim 1, wherein:
the device information of the at least one first imaging device includes a plurality of items, and the device information of the managed computer device includes a plurality of items,
there exists at least one item included in the device information of the at least one first imaging device such that the item is not included in the device information of the managed computer device, and there exists at least one item included in the device information of the managed computer device such that the item is not included in the device information of the at least one first imaging device, the plurality of items included in the device information of the managed computer device include at least identification information of the managed computer device on the network, and
the plurality of items included in the device information of the at least one first imaging device include at least one of information about usage statuses of consumable substances equipped in the at least one first imaging device, identification information of the at least one first imaging device, the identification information uniquely identifying the at least one first imaging device, and connection information of the at least one first imaging device with respect to the managed computer device.

3. The system according to claim 1, wherein:
the managing computer device includes a Web server function, and
a second managed computer device having a Web browser function connected to the network is able to display the list on a browser of the second managed computer device by accessing the Web server function of the managing device.

4. The system according to claim 1, wherein:
a plurality of first imaging devices are connected to the managed computer device through a local network, and
the managed computer device is configured to obtain pieces of device information of all of the plurality of first imaging devices connected to the managed computer device, and configured to transmit all the pieces of obtained device information to the managing computer device in response to a single request for device information transmitted from the managing computer device.

5. The system according to claim 1, wherein:
a plurality of managed computer devices are connected to the network, and
the managing computer device is configured to obtain, from all of the managed computer devices selected from the plurality of managed computer devices, pieces of device information of the first imaging devices connected to the respective selected managed computer devices, and the managing computer device is configured to display the pieces of device information of the first imaging devices connected to the respective selected managed computer devices obtained from the respective selected managed computer devices as a single device list.

6. The system according to claim 1, wherein:
the system further includes a second imaging device directly connected to the network,
the managing computer device is configured to obtain device information of the second imaging device directly from the second imaging device, and
the managing computer device is configured to obtain a set of device information of the at least one first imaging device and device information of the managed computer device through the managed computer device.

7. The system according to claim 6, wherein:
when a program installed on the managing computer device is executed, the managing computer device is configured to display a device information list concerning a group of second imaging devices, and
the managing computer device is configured to display a device information list concerning a group of first imaging devices directly connected to respective managed computer devices, when a predetermined button which is different from the device information list is selected.

8. The system according to claim 7, wherein the managing computer device is configured to display the device information list concerning the group of the first imaging devices such that IP addresses of the managed computer devices directly connected to the first imaging devices are displayed in the device information list concerning the group of the first imaging devices in association with respective pieces of device information of the first imaging devices.

9. The system according to claim 1, wherein the managed computer device is configured to obtain the device information of the at least one first imaging device from the at least one first imaging device with a printer command.

10. The system according to claim 1,
wherein the managing computer device is configured to:
store second schedule information designating a timing at which the managing computer device transmits a request for the device information to the managed computer device separately from the first schedule information;
judge whether a current time meets the timing indicated by the second schedule information;
judge whether the access information of each of the managed computer devices in the list indicates an accessible state when it is judged that the current time meets the timing indicated by the second schedule information;
transmit a request for obtaining device information of the at least one first imaging device to the managed computer device corresponding to the access information which is judged to indicate that the managed computer device is accessible when the access information indicates that the managed computer device is accessible;

judge whether current time meets a timing predetermined period from the timing indicated by the first schedule information when it is judged that the current time does not meet the timing indicated by the second schedule information;

judge whether the access information of each of the managed computer devices in the list indicates an inaccessible state when it is judged that the predetermined period has passed from the timing indicated by the first schedule information;

transmit a request for obtaining device information of the at least one first imaging device to the managed computer device corresponding to the access information which is judged to indicate that the managed computer device is accessible when the access information indicates that the managed computer device is accessible, the request for obtaining the device information being not transmitted to the managed computer device corresponding to the access information judged to indicate that the managed computer device is not accessible.

11. The system according to claim 1,
wherein the managing computer device is configured to:
output a user interface used to receive a user operation to designate a timing at which the managed computer device obtains the device information from the first imaging device;
request the managed computer device to set a timing at which the managed computer device obtains the device information from and store the first schedule information designating the timing at which the managed computer device obtains the device information from the first imaging device when the managed computer device receives the user operation to designate the timing at which the managed computer device obtains the device information from the first imaging device, after outputting the user interface;
output a user interface used to designate a timing at which the managing computer device obtains the device information from the managed computer device; and
store the second schedule information designating the timing at which the managing computer device obtains the device information from the managed computer device when the managing computer device receives the user operation to designate the timing at which the managing device obtains the device information from the managed computer device, after outputting the user interface.

12. The system according to claim 1,
wherein the managing computer device is configured to:
output a user interface used to receive a user operation to designate whether each of the managed computer devices in the list is to be accessible or inaccessible;
store access information representing that the managed computer device is accessible, in association with the managed computer device to which the received user operation is directed, when the managing computer device receives the user operation instructing to set the managed computer device accessible after outputting the user interface; and
store access information representing that the managed computer device is inaccessible, in association with the managed computer device to which the received user operation is directed, when the managing computer device receives the user operation instructing to set the managed computer device inaccessible after outputting the user interface.

13. The system according to claim 1,
the managing computer device is further configured to:
for each of the plurality of managed computer devices as listed, store the access information representing that the managed computer device is accessible when the reply to the request transmitted to the managed computer device is received therefrom in association with the managed computer device which transmitted the reply, and store the access information representing that the managed computer device is not accessible when a reply to the request transmitted to the managed computer device is not received therefrom in association with the managed computer device which is to transmit the reply;
output a user interface used to receive a user operation to instruct transmission of a request to the managed computer device;
transmit a request to the managed computer device at a timing independent of the timing represented by the second schedule information or the predetermined period has passed from the timing indicated by the first schedule information when a user operation to instruct transmission of the request to the managed computer device after outputting the user interface; and
store the access information representing that the managed computer device is accessible when the replay to the request transmitted to the managed computer device is received, and store the access information representing that the managed computer device is not accessible when a replay to the request transmitted to the managed computer device is not received.

14. The system according to claim 1,
wherein the access information includes first access information and second access information; and
wherein the managing computer device is configured to:
output a user interface used to receive a user operation to designate whether each of the managed computer devices in the list is to be accessible or inaccessible; and
store the first access information representing that the managed computer device is accessible, in association with the managed computer device to which the received user operation is directed, when the managing computer device receives the user operation instructing to set the managed computer device accessible after outputting the user interface, and store the first access information representing that the managed computer device is inaccessible, in association with the managed computer device to which the received user operation is directed, when the managing computer device receives the user operation instructing to set the managed computer device inaccessible after outputting the user interface;
for each of the plurality of managed computer devices as listed, store the second access information representing that the managed computer device is accessible when the replay to the request transmitted to the managed computer device is received therefrom in association with the managed computer device which transmitted the reply, and store the second access information representing that the managed computer device is not accessible when a replay to the request transmitted to the managed computer device is not received therefrom in association with the managed computer device which is to transmit the reply;

output a user interface used to receive a user operation to instruct transmission of a request to the managed computer device;

transmit a request to the managed computer device at a timing independent of the timing represented by the second schedule information or the timing predetermined period after the timing represented by the first schedule information when a user operation to instruct transmission of the request to the managed computer device after outputting the user interface;

store the second access information representing that the managed computer device is accessible when the replay to the request transmitted to the managed computer device is received, and store the second access information representing that the managed computer device is not accessible when a replay to the request transmitted to the managed computer device is not received;

store second schedule information representing a timing at which the managing computer device transmits a request for the device information to the managed computer device separately form the first schedule information, the managing computer device being further configured to:

judge, whether a current time meets the timing represented by the second schedule information;

judge, for each of the managed computer devices in the list, whether the first access information represents the managed computer device is accessible and the second access information represents the managed computer device is accessible when the current time meets the timing represented by the second schedule information, and request he managed computer device of which the first access information represents the managed computer device is accessible and the second access information represents the managed computer device is accessible for the device information; and judge, for each of the managed computer devices in the list, whether the first access information represents the managed computer device is accessible and the second access information represents the managed computer device is accessible when the current time is before the timing represented by the second schedule information but at a timing at which the predetermined period has passed from the timing indicated by the first schedule information, and request the managed computer device of which the first access information represents the managed computer device is accessible and the second access information represents the managed computer device is accessible for the device information.

15. The system according to claim 1, wherein the managing computer device judges whether each of the managed computer devices included in the list of the managed computer devices is accessible and stores results in association with the managed computer devices.

16. A method of operating a system that includes a managing computer device, a managed computer device and at least one first imaging device, the managing computer device and the managed computer device being directly connected to a network, the at least one first imaging device not being directly connected to the network, and the managed computer device being directly connected to the at least one first imaging device, the method comprising:

obtaining device information via the managed computer device of the at least one first imaging device from the at least one first imaging device, and transmitting the device information of the at least one first imaging device and the device information of the managed computer device to the managing computer device;

storing via the managing computer device information of one or more managed computer devices connected to the network;

displaying a list via the managing computer device concerning the managed computer devices connected to the network based on the stored device information;

storing first schedule information via the managing computer device defining a timing at which the managed computer device obtains the device information from the at least one first imaging device;

storing access information via the managing computer device for each of the managed computer devices, the access information representing whether each of the managed computer devices included in the list of the managed computer devices is accessible;

automatically judging via the managing computer device whether a predetermined period has passed from the timing indicated by the first schedule information if the managing computer device stores the first schedule information;

judging via the managing computer device, for each of the managed computer devices, whether the access information indicates that each of the managed computer devices is accessible if it is judged that the predetermined period has passed from the timing indicated by the first schedule information;

transmitting via the managing computer device a request for obtaining device information of the at least one first imaging device to the managed computer device corresponding to the access information, which is judged to indicate that the managed computer device is accessible when the access information indicates that the managed computer device is accessible, the request for obtaining the device information being not transmitted to the managed computer device corresponding to the access information judged to indicate that the managed computer device is not accessible;

receiving via the managing computer device the device information of the at least one first imaging device from the managed computer device to which the request for obtaining the device information is transmitted;

generating via the managing computer device a device list of the at least one first imaging device based on a combination of the device information received from the managed computer device and the stored device information of the managed computer devices; and displaying via the managing computer device the generated device list of the at least one first imaging device when one of the managed computer devices included in the list is selected, wherein, if the selected managed computer device is a device that has been judged as an accessible device, the managing computer device requests the selected managed computer device for the device information, while if the selected managed computer device is a device that has been judged as an inaccessible device, the managing computer device does not request the selected managed computer device for the device information.

17. A non-transitory computer-readable medium storing a computer-executable program for a system that includes a managing computer device, a managed computer device and at least one first imaging device, the managing computer device and the managed computer device being directly connected to a network, the at least one first imaging device not being directly connected to the network, and the managed computer device being directly connected to the at least one first imaging device, the computer program comprising instructions for:

- obtaining device information via the managed computer device of the at least one first imaging device from the at least one first imaging device, and transmitting the device information of the at least one first imaging device and the device information of the managed computer device to the managing computer device;
- storing via the managing computer device information of one or more managed computer devices connected to the network;
- displaying a list via the managing computer device concerning the managed computer devices connected to the network based on the stored device information;
- storing first schedule information via the managing computer device defining a timing at which the managed computer device obtains the device information from the at least one first imaging device;
- storing access information via the managing computer device for each of the managed computer devices, the access information representing whether each of the managed computer devices included in the list of the managed computer devices is accessible;
- automatically judging via the managing computer device whether a predetermined period has passed from the timing indicated by the first schedule information if the managing computer device stores the first schedule information;
- judging via the managing computer device, for each of the managed computer devices, whether the access information indicates that each of the managed computer devices is accessible if it is judged that the predetermined period has passed from the timing indicated by the first schedule information;
- transmitting via the managing computer device a request for obtaining device information of the at least one first imaging device to the managed computer device corresponding to the access information, which is judged to indicate that the managed computer device is accessible when the access information indicates that the managed computer device is accessible, the request for obtaining the device information being not transmitted to the managed computer device corresponding to the access information judged to indicate that the managed computer device is not accessible;
- receiving via the managing computer device the device information of the at least one first imaging device from the managed computer device to which the request for obtaining the device information is transmitted;
- generating via the managing computer device a device list of the at least one first imaging device based on a combination of the device information received from the managed computer device and the stored device information of the managed computer devices; and
- displaying via the managing computer device the generated device list of the at least one first imaging device when one of the managed computer devices included in the list is selected,
- wherein, if the selected managed computer device is a device that has been judged as an accessible device, the managing computer device requests the selected managed computer device for the device information, while if the selected managed computer device is a device that has been judged as an inaccessible device, the managing computer device does not request the selected managed computer device for the device information.

* * * * *